(12) United States Patent
Butler et al.

(10) Patent No.: US 11,492,053 B2
(45) Date of Patent: Nov. 8, 2022

(54) ROTATABLE AERODYNAMIC FAIRING SYSTEM

(71) Applicant: FlowBelow Aero, Inc., Round Rock, TX (US)

(72) Inventors: Joshua Butler, Austin, TX (US); Kyle Walker, Austin, TX (US); Joseph Peter Martin, Austin, TX (US)

(73) Assignee: FLOWBELOW AERO, INC., Round Rock, TX (US)

( * ) Notice: Subject to any disclaimer, the term of this patent is extended or adjusted under 35 U.S.C. 154(b) by 22 days.

(21) Appl. No.: 17/139,858

(22) Filed: Dec. 31, 2020

(65) Prior Publication Data

US 2021/0197902 A1 Jul. 1, 2021

Related U.S. Application Data

(63) Continuation of application No. 16/049,367, filed on Jul. 30, 2018, now Pat. No. 10,882,571.

(60) Provisional application No. 62/538,791, filed on Jul. 30, 2017.

(51) Int. Cl.
*B62D 35/00* (2006.01)

(52) U.S. Cl.
CPC ......... *B62D 35/001* (2013.01); *B62D 35/008* (2013.01)

(58) Field of Classification Search
CPC .... B62D 35/00; B62D 35/001; B62D 35/008; B62D 35/02; B62D 37/02
See application file for complete search history.

(56) References Cited

U.S. PATENT DOCUMENTS

| | | | |
|---|---|---|---|
| 1,072,907 | A | 9/1913 | Brooks |
| 1,173,434 | A | 2/1916 | Johnson |
| 1,827,662 | A | 10/1931 | Maas |
| 2,059,045 | A | 10/1936 | Seymour |
| 2,190,117 | A | 3/1939 | Griffith |
| 2,538,839 | A | 1/1951 | Limberg |

(Continued)

FOREIGN PATENT DOCUMENTS

| | | |
|---|---|---|
| DE | 29922043 U1 | 8/2000 |
| DE | 102010063263 A1 | 6/2012 |

(Continued)

OTHER PUBLICATIONS

Notice of Allowance for U.S. Appl. No. 16/657,824, dated Jul. 19, 2021, 6 pgs.

(Continued)

*Primary Examiner* — Gregory A Blankenship
(74) *Attorney, Agent, or Firm* — Sprinkle IP Law Group

(57) ABSTRACT

One embodiment comprises a fairing assembly adapted to couple to a vehicle, the assembly comprising: a support arm mountable to a frame rail of a vehicle and a fairing adapter adapted to mount a fairing to the support arm. The fairing adapter is rotatably coupled to the support arm and is rotatable from a first orientation corresponding to an aerodynamic position to a second orientation corresponding to a first access position. The fairing adapter may also be rotatable to a third orientation corresponding to a second access position. The assembly further comprises a releasable lock to lock the fairing adapter in the first orientation and releasable to allow the fairing adapter to rotate to the second orientation or the third orientation.

20 Claims, 34 Drawing Sheets

(56) References Cited

U.S. PATENT DOCUMENTS

| | | |
|---|---|---|
| 2,579,048 A | 12/1951 | Paul |
| 2,605,119 A | 7/1952 | Earnest |
| 2,715,430 A | 8/1952 | Lindeman |
| 2,685,906 A | 8/1954 | Williams |
| 2,931,414 A | 4/1956 | Jankowski |
| 2,801,867 A | 8/1957 | Childreth |
| 2,869,929 A | 1/1959 | Hurd |
| 3,006,658 A | 10/1961 | Wenham et al. |
| 3,078,124 A | 2/1963 | Mulder |
| 3,092,420 A | 6/1963 | Baldwin et al. |
| 3,215,384 A | 11/1965 | Chambers |
| 3,276,502 A | 10/1966 | Walter |
| 3,276,503 A | 10/1966 | Kilmarx |
| 3,279,815 A | 10/1966 | Hutchens |
| 3,317,247 A | 5/1967 | Lamme |
| 3,350,113 A | 10/1967 | Graham |
| 3,367,722 A | 2/1968 | Miyanaga |
| 3,401,953 A | 9/1968 | Prohl |
| 3,582,108 A | 6/1971 | Carlton |
| 3,585,824 A | 6/1971 | Schenk et al. |
| 3,653,455 A | 4/1972 | Hetteen |
| 3,752,498 A | 8/1973 | Shea |
| 3,874,697 A | 4/1975 | Thompson |
| 3,918,764 A | 11/1975 | Lamme |
| 3,947,065 A | 3/1976 | Geiger |
| 3,954,281 A | 5/1976 | Juergens |
| 4,007,944 A | 2/1977 | Dingess |
| 4,138,129 A | 2/1979 | Morris |
| 4,169,608 A | 10/1979 | Logan |
| 4,180,230 A | 12/1979 | Sogoian |
| 4,205,861 A | 6/1980 | Roberts |
| 4,235,476 A | 11/1980 | Arvidsson |
| 4,334,694 A | 6/1982 | Iwanicki |
| 4,441,539 A | 4/1984 | Hulse |
| 4,582,107 A | 4/1986 | Scully |
| 4,619,303 A | 10/1986 | Bryan et al. |
| 4,627,631 A | 12/1986 | Sherman |
| 4,640,331 A | 2/1987 | Braun et al. |
| 4,641,698 A | 2/1987 | Bitoni |
| 4,678,017 A | 7/1987 | Schultz |
| 4,706,980 A | 11/1987 | Hawes et al. |
| 4,724,879 A | 2/1988 | Schultz et al. |
| 4,730,952 A | 3/1988 | Wiley |
| 4,735,428 A | 4/1988 | Antekeier |
| 4,744,399 A | 5/1988 | Magnuson et al. |
| 4,754,792 A | 7/1988 | Braun et al. |
| 4,761,040 A | 8/1988 | Johnson |
| 4,770,330 A | 9/1988 | Bondstead et al. |
| 4,784,430 A | 11/1988 | Biermacher |
| 4,836,568 A | 6/1989 | Preslik et al. |
| 4,860,579 A | 8/1989 | Beverly |
| 4,889,394 A | 12/1989 | Ruspa |
| 4,892,128 A | 1/1990 | Bartos |
| 4,895,199 A | 1/1990 | Magnuson et al. |
| 4,921,276 A | 5/1990 | Morin |
| 4,925,235 A | 5/1990 | Fingerle |
| 4,960,294 A | 10/1990 | Leonard |
| 4,961,611 A | 10/1990 | Patti |
| D312,609 S | 12/1990 | Preslik et al. |
| D312,810 S | 12/1990 | Preslik et al. |
| 4,974,909 A | 12/1990 | Patti et al. |
| 4,981,162 A | 1/1991 | Grenie |
| 4,984,851 A | 1/1991 | Hayano |
| 5,074,573 A | 12/1991 | Dick |
| 5,179,981 A | 1/1993 | Hickes et al. |
| 5,190,354 A | 3/1993 | Levy et al. |
| 5,192,108 A | 3/1993 | Richardson et al. |
| 5,238,268 A | 8/1993 | Logan |
| 5,240,039 A | 8/1993 | Colussi et al. |
| 5,257,822 A | 11/1993 | Metcalf |
| 5,263,770 A | 11/1993 | Goudey |
| 5,269,547 A | 12/1993 | Antekeier |
| 5,280,990 A | 1/1994 | Rinard |
| 5,286,049 A | 2/1994 | Khan |
| D345,332 S | 3/1994 | Roman |
| 5,294,189 A | 3/1994 | Price et al. |
| 5,324,099 A | 6/1994 | Fitzhugh |
| 5,332,280 A | 7/1994 | Dupont et al. |
| 5,340,154 A | 8/1994 | Scott |
| 5,358,313 A | 10/1994 | Polka |
| 5,366,278 A | 11/1994 | Brumfield |
| 5,375,882 A | 12/1994 | Koch, III |
| 5,380,028 A | 1/1995 | Ferris |
| 5,398,743 A | 3/1995 | Bartos |
| D361,974 S | 9/1995 | Hornik |
| 5,465,772 A | 11/1995 | Sartor |
| 5,490,342 A | 2/1996 | Rutterman et al. |
| 5,538,062 A | 7/1996 | Stech |
| 5,584,949 A | 12/1996 | Ingram |
| 5,623,777 A | 4/1997 | Hsiao et al. |
| D381,949 S | 8/1997 | Barrett, Jr. et al. |
| 5,659,989 A | 8/1997 | Hsiao et al. |
| D395,268 S | 6/1998 | Tucker |
| 5,769,979 A | 6/1998 | Naedler |
| 5,791,741 A | 8/1998 | Sheu |
| 5,833,254 A | 11/1998 | Bucho |
| 5,836,399 A | 11/1998 | Maiwald et al. |
| 5,850,727 A | 12/1998 | Fox |
| 5,871,335 A | 2/1999 | Bartlett |
| 5,884,981 A | 3/1999 | Ichikawa |
| 5,938,222 A | 8/1999 | Huang |
| 5,947,520 A | 9/1999 | McHorse |
| 6,045,195 A | 4/2000 | Okamoto |
| 6,070,893 A | 6/2000 | Thorndyke et al. |
| 6,070,908 A | 6/2000 | Skrzypchak |
| 6,105,645 A | 8/2000 | Ingram |
| 6,120,104 A | 9/2000 | Okamoto et al. |
| 6,152,469 A | 11/2000 | Gadowski |
| 6,219,987 B1 | 4/2001 | Trent et al. |
| 6,244,316 B1 | 6/2001 | Naedler |
| 6,367,841 B1 | 4/2002 | Matthew |
| 6,401,743 B1 | 6/2002 | Naedler |
| 6,412,799 B1 | 7/2002 | Schrempf |
| 6,416,112 B1 | 7/2002 | Trivits |
| 6,427,739 B1 | 8/2002 | Medsker |
| 6,431,605 B1 | 8/2002 | Miller et al. |
| 6,435,462 B2 | 8/2002 | Hawes |
| 6,443,492 B1 | 9/2002 | Barr et al. |
| 6,443,529 B1 | 9/2002 | Williams |
| 6,604,724 B2 | 8/2003 | Hawes |
| 6,648,373 B2 | 11/2003 | Hawes |
| 6,666,498 B1 | 12/2003 | Whitten |
| 6,698,482 B2 | 3/2004 | Hennig |
| 6,786,512 B2 | 9/2004 | Morin et al. |
| 6,857,709 B1 | 2/2005 | McLean et al. |
| 6,886,862 B2 | 5/2005 | Matthew |
| 6,979,050 B2 | 12/2005 | Browne et al. |
| 7,011,428 B1 | 3/2006 | Hand |
| 7,081,081 B2 | 7/2006 | Schutz et al. |
| 7,083,179 B2 | 8/2006 | Chapman et al. |
| 7,093,909 B1 | 8/2006 | Korpi et al. |
| 7,131,705 B1 | 11/2006 | DelVecchio et al. |
| 7,249,804 B2 | 7/2007 | Zank et al. |
| 7,466,049 B1 | 12/2008 | Vancea |
| 7,484,736 B2 | 2/2009 | Allemann et al. |
| 7,520,534 B2 | 4/2009 | Longchamp |
| 7,530,379 B1 | 5/2009 | Becker et al. |
| 7,547,076 B2 | 6/2009 | Necaise |
| D607,200 S | 1/2010 | Prater |
| 7,651,108 B2 | 1/2010 | Bonnaud et al. |
| 7,658,251 B2 | 2/2010 | James |
| 7,669,678 B2 | 3/2010 | Benedict et al. |
| 7,775,374 B1 | 8/2010 | Barker et al. |
| 7,775,604 B2 | 8/2010 | Chen |
| 7,806,464 B2 | 10/2010 | Cardolle |
| 7,909,343 B2 | 3/2011 | Archer et al. |
| 7,931,302 B2 | 4/2011 | Vaughn |
| 7,963,159 B2 | 6/2011 | Ingram et al. |
| 7,975,739 B1 | 7/2011 | Ingram |
| 8,011,848 B2 | 9/2011 | Sockman et al. |
| 8,028,732 B1 | 10/2011 | Ingram et al. |
| 8,118,329 B2 | 2/2012 | Braga |
| 8,251,436 B2 | 8/2012 | Henderson et al. |
| 8,342,595 B2 | 1/2013 | Henderon et al. |

(56) References Cited

U.S. PATENT DOCUMENTS

| | | | |
|---|---|---|---|
| 8,353,375 B2 | 1/2013 | James | |
| 8,382,210 B1 | 2/2013 | Fleck | |
| 8,424,956 B2 | 4/2013 | Stimel | |
| 8,517,474 B2 | 8/2013 | Salah | |
| 8,540,304 B2 | 9/2013 | Kint | |
| 8,567,802 B2 | 10/2013 | Barron | |
| 8,726,958 B2 | 5/2014 | Merrill | |
| 8,746,305 B2 | 6/2014 | Lloyd | |
| 8,747,084 B2 | 6/2014 | Richardson et al. | |
| 8,763,661 B2 | 7/2014 | Richardson | |
| 8,814,253 B1* | 8/2014 | Butler | B62D 25/163 296/180.4 |
| 8,870,275 B1 | 10/2014 | Schmidt | |
| 8,955,626 B2 | 2/2015 | Trueman | |
| 9,027,983 B2 | 5/2015 | Butler et al. | |
| 9,039,386 B2 | 5/2015 | Rcihardson et al. | |
| 9,039,392 B2 | 5/2015 | Richardson et al. | |
| 9,074,595 B2 | 7/2015 | Richardson | |
| 9,080,565 B2 | 7/2015 | Richardson | |
| 9,121,401 B2 | 9/2015 | Richardson | |
| 9,145,887 B2 | 9/2015 | Richardson | |
| 9,151,288 B2 | 10/2015 | Richardson | |
| 9,222,473 B2 | 12/2015 | Richardson | |
| 9,308,949 B1 | 4/2016 | Mihelic et al. | |
| 9,321,302 B2 | 4/2016 | Fleck | |
| 9,327,550 B2 | 5/2016 | Butler et al. | |
| 9,429,243 B2 | 8/2016 | Hessling et al. | |
| 9,604,157 B2 | 3/2017 | Richardson | |
| 9,637,184 B1 | 5/2017 | Bennett | |
| 9,663,157 B2 | 5/2017 | Butler et al. | |
| 9,815,506 B2 | 11/2017 | Vogel et al. | |
| 9,821,598 B2 | 11/2017 | Fleck | |
| 9,868,318 B2 | 1/2018 | Becker | |
| 10,252,755 B2 | 4/2019 | Butler et al. | |
| 10,293,872 B2 | 5/2019 | Butler et al. | |
| 10,343,450 B2 | 7/2019 | Butler et al. | |
| 10,482,565 B1 | 11/2019 | Chen | |
| 10,654,529 B2* | 5/2020 | Butler | B62D 35/001 |
| 10,710,649 B2 | 7/2020 | Butler et al. | |
| 10,882,571 B2* | 1/2021 | Butler | B62D 35/001 |
| 11,110,974 B2 | 9/2021 | Cosme | |
| 11,220,132 B2 | 1/2022 | Butler | |
| 11,254,373 B2 | 2/2022 | Butler | |
| 11,273,877 B2* | 3/2022 | Butler | B62D 35/008 |
| 11,352,073 B2 | 6/2022 | Butler | |
| 2002/0124926 A1 | 9/2002 | Colussi et al. | |
| 2004/0164539 A1 | 8/2004 | Bernard | |
| 2004/0238093 A1 | 12/2004 | Nelson et al. | |
| 2005/0133134 A1 | 6/2005 | Ingram et al. | |
| 2006/0179929 A1 | 8/2006 | Becker | |
| 2008/0257620 A1 | 10/2008 | Poulsen | |
| 2009/0273176 A1 | 11/2009 | Ulgen | |
| 2009/0283190 A1 | 11/2009 | Padula et al. | |
| 2010/0066123 A1 | 3/2010 | Ortega et al. | |
| 2010/0066155 A1 | 3/2010 | Seradarian et al. | |
| 2010/0117396 A1 | 5/2010 | Dayton | |
| 2011/0011656 A1 | 1/2011 | Poulsen | |
| 2011/0057410 A1 | 3/2011 | Eklund et al. | |
| 2011/0089748 A1 | 4/2011 | Grill et al. | |
| 2011/0101767 A1 | 5/2011 | Fleck | |
| 2011/0253851 A1 | 10/2011 | Di Franco | |
| 2011/0272963 A1 | 11/2011 | Henderson et al. | |
| 2011/0272964 A1 | 11/2011 | Henderson et al. | |
| 2012/0013146 A1 | 1/2012 | Wolf et al. | |
| 2012/0024445 A1 | 2/2012 | Wilson et al. | |
| 2012/0043803 A1 | 2/2012 | Grill | |
| 2013/0049320 A1 | 2/2013 | Smith | |
| 2013/0068361 A1 | 3/2013 | Flory et al. | |
| 2013/0076107 A1 | 3/2013 | Stames | |
| 2013/0087262 A1 | 4/2013 | Hennig | |
| 2013/0199685 A1 | 8/2013 | Nelson et al. | |
| 2014/0117712 A1* | 5/2014 | Butler | B62D 25/188 296/180.2 |
| 2014/0284994 A1 | 9/2014 | Polka | |
| 2015/0059946 A1 | 3/2015 | Keeney | |
| 2015/0151569 A1 | 6/2015 | Fleck | |
| 2015/0175089 A1 | 6/2015 | Reed | |
| 2015/0329152 A1 | 11/2015 | Baker et al. | |
| 2016/0096557 A1 | 4/2016 | Bassily et al. | |
| 2016/0141934 A1 | 5/2016 | Click | |
| 2016/0221388 A1 | 8/2016 | Van Oort | |
| 2016/0288590 A1 | 10/2016 | Hennig et al. | |
| 2016/0368545 A1 | 12/2016 | Vogel et al. | |
| 2017/0029044 A1 | 2/2017 | Senatro | |
| 2017/0129549 A1 | 5/2017 | Polgrean | |
| 2017/0166266 A1 | 6/2017 | Wall, II | |
| 2017/0240220 A1 | 8/2017 | Kron | |
| 2018/0072354 A1 | 3/2018 | Cosme et al. | |
| 2018/0104994 A1 | 4/2018 | Lin | |
| 2018/0370580 A1 | 12/2018 | Butler et al. | |
| 2019/0031251 A1 | 1/2019 | Butler et al. | |
| 2019/0061838 A1 | 2/2019 | Lee | |
| 2019/0193797 A1 | 6/2019 | Butler et al. | |
| 2019/0270335 A1 | 9/2019 | Butler | |
| 2020/0047824 A1 | 2/2020 | Butler | |
| 2020/0062048 A1 | 2/2020 | Bulter | |
| 2020/0114983 A1 | 4/2020 | Cosme et al. | |
| 2020/0164933 A1 | 5/2020 | Butler et al. | |
| 2020/0262493 A1 | 8/2020 | Butler | |
| 2020/0339201 A1 | 10/2020 | Butler | |
| 2021/0009209 A1 | 1/2021 | Senatro | |
| 2021/0139086 A1 | 5/2021 | Andrus | |
| 2021/0197902 A1* | 7/2021 | Butler | B62D 35/008 |
| 2022/0161594 A1 | 5/2022 | Butler | |
| 2022/0219761 A1 | 7/2022 | Urista | |

FOREIGN PATENT DOCUMENTS

| | | |
|---|---|---|
| EP | 542728 | 7/1988 |
| EP | 0 309 611 A1 | 4/1989 |
| EP | 0 310 130 A1 | 4/1989 |
| GB | 2348400 | 10/2000 |
| GB | 2524173 | 9/2016 |
| WO | WO 1997/48590 | 12/1997 |
| WO | WO 2004/062953 | 7/2004 |
| WO | WO 2008/100338 | 8/2008 |
| WO | WO 2009105623 | 8/2009 |
| WO | WO 2013/174410 | 11/2013 |
| WO | WO 2016/134847 | 9/2016 |
| WO | WO 2018/136529 | 7/2018 |

OTHER PUBLICATIONS

International Search Report and Written Opinion for International Application No. PCT/US18/41907, dated Dec. 20, 2018, 8 pgs.

European Search Report for European Patent Application No. 18832450.3, dated Mar. 10, 2021, 7 pgs.

Office Action for U.S. Appl. No. 16/466,268, dated Sep. 20, 2021, 13 pgs.

Office Action for U.S. Appl. No. 16/415,875, dated May 24, 2021, 7 pgs.

Notice of Allowance for U.S. Appl. No. 16/630,318, dated Apr. 6, 2022, 6 pgs.

Notice of Allowance for U.S. Appl. No. 16/415,875, dated Aug. 5, 2021, 4 pgs.

Notice of Allowance for U.S. Appl. No. 16/858,521, dated Aug. 9, 2021, 6 pgs.

Notice of Allowance for U.S. Appl. No. 15/553,893 dated Aug. 3, 2021, 2 pgs.

Notice of Allowance for U.S. Appl. No. 16/657,824, dated Nov. 3, 2021, 2 pgs.

Notice of Allowance for U.S. Appl. No. 16/415,875, dated Nov. 10, 2021, 4 pgs.

Extended European Search Report for Patent Application No. 21171821.8, dated Oct. 4, 2021, 8 pgs.

Notice of Allowance for U.S. Appl. No. 16/858,521, dated Dec. 14, 2021, 2 pgs.

Bresnan, Exterior Accessories, Drink Water Trailer Sales, May 11, 2012, Pembroke, MA, retrieved from http://www.drinkwaterts.com on Jul. 25, 2012, 23 pgs.

(56) References Cited

OTHER PUBLICATIONS

Truck Accessories, Council Hitch Truck Accessories, Council Bluffs, IA, retrieved from http://councilhitch.com/vehicle-accessories/truck-accessories/ on Jul. 24, 2012, 1 page.
AMP Research PowerStep™, AMP Research, 2011, Tustin, CA, retrieved from http://www.amp-research.com/products/truckaccessories/powerstep/ on Jul. 24, 2012, 6 pgs.
TrailBack Aluminium Running Boards, BuyAutoTruckAccessories.com, 2012, Clifton, NJ, retrieved from http://www.buyautotruckaccessories.com on Jul. 24, 2012, 2 pgs.
Discount Auto Parts Dee Zee Running Boards Car Truck SUV, Dee Zee, Inc., Des Moines, IA, retrieved from http://www.running-board.nedona.org on Jul. 24, 2012, 6 pgs.
Lund Trailrunner Extruded Aluminum Running Boards, JC Whitney, 2012, LaSalle, IL, retrieved from http://www.jcwhitney.com on Jul. 25, 2012, 3 pgs.
Endeavor Running Boards, 4WheelOnline.com, Tampa, FL, retrieved from http://4wheelonline.com/EndeavourRunningBoards.64146 on Jul. 28, 2012, 2 pgs.
DEFLECKTOR®, The First-Of-Its-Kind Aerodynamic Wheel Cover, A de F, Ltd., Birchwood, MN, retrieved from http://www.deflecktor.com/DeflecktorBrochure.pdf, 15 pgs.
International Search Report and Written Opinion for PCT Application No. PCT/US2012/046010, completed Sep. 11, 2012 and dated Oct. 1, 2012, 10 pgs.
Office Action for U.S. Appl. No. 13/452,249, dated Apr. 19, 2013, 11 pgs.
Truck Accessories, Council Hitch Truck Accessories, Council Bluffs, IA, retrieved from http://councilhitch.com/vehicle-accessories/truck-accessories/ on May 15, 2013, 5 pgs.
Office Action for U.S. Appl. No. 13/452,249, dated Sep. 9, 2013, 9 pgs.
International Preliminary Report on Patentability (Ch. I) for International Application No. PCT/US2012/046010, dated Jan. 23, 2014, 9 pgs.
International Search Report and Written Opinion for International Patent Application No. PCT/US13/68119, dated Jun. 5, 2014, 10 pgs.
Isuzu NPR Splash Shield/Mud Flap 1989-Up, Busbee's Trucks & Parts Product Information Page, BusbeeTruckParts's Photostream, Flickr, uploaded Nov. 12, 2010, retrieved from www.flickr.com/photos/busbeetruckparts/5169791014/in/photostream/ on Feb. 25, 2014, 1 pg.
Office Action for U.S. Appl. No. 14/070,294, dated Sep. 17, 2014, 8 pgs.
Extended European Search Report for Application No. EP 12811575.5, dated Mar. 4, 2015, 8 pgs.
Office Action for U.S. Appl. No. 13/545,100, dated Apr. 10, 2015, 15 pgs.
International Preliminary Report on Patentability (Ch. I) for Application No. PCT/US2013/068119, dated May 14, 2015, 7 pgs.
Office Action for U.S. Appl. No. 13/545,100, dated Sep. 21, 2015, 8 pgs.
Office Action for U.S. Appl. No. 14/666,019, dated Jul. 8, 2016, 7 pgs.
Extended European Search Report for Application No. EP 13851505.1, dated Oct. 14, 2016, 8 pgs.
Examination Report for Australian Application No. 2013337652, dated Jan. 13, 2017, 4 pgs.
Office Action for U.S. Appl. No. 15/082,996, dated Apr. 3, 2018, 25 pgs.
Office Action for Canadian Application No. 2,877,482, dated May 14, 2018, 4 pgs.
Office Action for U.S. Appl. No. 15/491,477, dated Aug. 14, 2018, 7 pgs.
Office Action for U.S. Appl. No. 15/553,893, dated Jul. 19, 2018, 7 pgs.
Office Action for U.S. Appl. No. 16/018,413, dated Sep. 18, 2018, 6 pgs.
Office Action for U.S. Appl. No. 15/082,996, dated Nov. 2, 2018, 6 pgs.
Office Action for U.S. Appl. No. 15/553,893, dated Feb. 25, 2019, 6 pgs.
Office Action for U.S. Appl. No. 16/290,631, dated Jun. 25, 2019, 7 pgs.
Office Action for European Patent Application No. 12811575.5, dated Jun. 28, 2019, 6 pgs.
VIGIA Tire Pressure Systems brochure, Colven, retrieved from http://www.vigia.ca/images/Pdf/Vigia_external_brochure.pdf, captured Nov. 5, 2017, 4 pgs.
Non-patent literature illustrating parts_hollow.jpg, Colven, retrieved from http://vigia.ca/webshop/images/categories/parts_hollow.jpg, captured Nov. 5, 2017, 1 pg.
International Search Report for PCT Application No. PCT/US17/60242, dated Mar. 1, 2018, 4 pgs.
Written Opinion for PCT Application No. PCT/US17/60242, dated Mar. 1, 2018, 6 pgs.
Office Action for U.S. Appl. No. 16/017,591, dated Sep. 4, 2019, 8 pgs.
Office Action for U.S. Appl. No. 16/290,631, dated Oct. 2, 2019, 9 pgs.
Notice of Allowance for U.S. Appl. No. 15/553,893, dated Sep. 10, 2019, 2 pgs.
Office Action for U.S. Appl. No. 16/049,367, dated Dec. 12, 2019, 8 pgs.
European Office Action for Patent Application No. 12811575.5 dated May 18, 2020, 5 pgs.
European Partial Search Report for Patent Application No. 17866894.3 dated Jun. 12, 2020, 12 pgs.
European Office Action for Patent Application No. 13851505.1, dated Jun. 12, 2020, 5 pgs.
Office Action for Canadian Patent Application No. 2890183, dated Jun. 25, 2020, 4 pgs.
Office Action for U.S. Appl. No. 16/049,367, dated Jul. 23, 2020, 8 pgs.
Office Action for U.S. Appl. No. 15/553,893, dated Apr. 16, 2020, 8 pgs.
Office Action for U.S. Appl. No. 15/553,893, dated Aug. 31, 2020, 9 pgs.
Office Action for U.S. Appl. No. 16/710,623, dated Oct. 6, 2020, 8 pgs.
Extended European Search Report for Patent Application No. 17866894.3, dated Oct. 9, 2020, 11 pgs.
Office Action for U.S. Appl. No. 16/415,875, dated Jan. 15, 2021, 14 pgs.
Office Action for European Patent Application No. 13851505.1, dated Feb. 10, 2021, 4 pgs.
Fleet Engineers Product Catalog 2017, Mud Flap Brackets, at pp. 51-66, retrieved Jan. 12, 2021 at <<https://fleetengineers.s3.amazonaws.com/uploads/2017/10/FE2017-ProdCat-101317-web.pdf>>, 228 pgs.
Office Action for U.S. Appl. No. 16/466,268, dated May 19, 2022, 8 pgs.
European Search Report for European Application No. 21216349.7, dated Jun. 15, 2022, 7 pgs.
Office Action for U.S. Appl. No. 16/874,060, dated Sep. 14, 2022, 7 pgs.

* cited by examiner

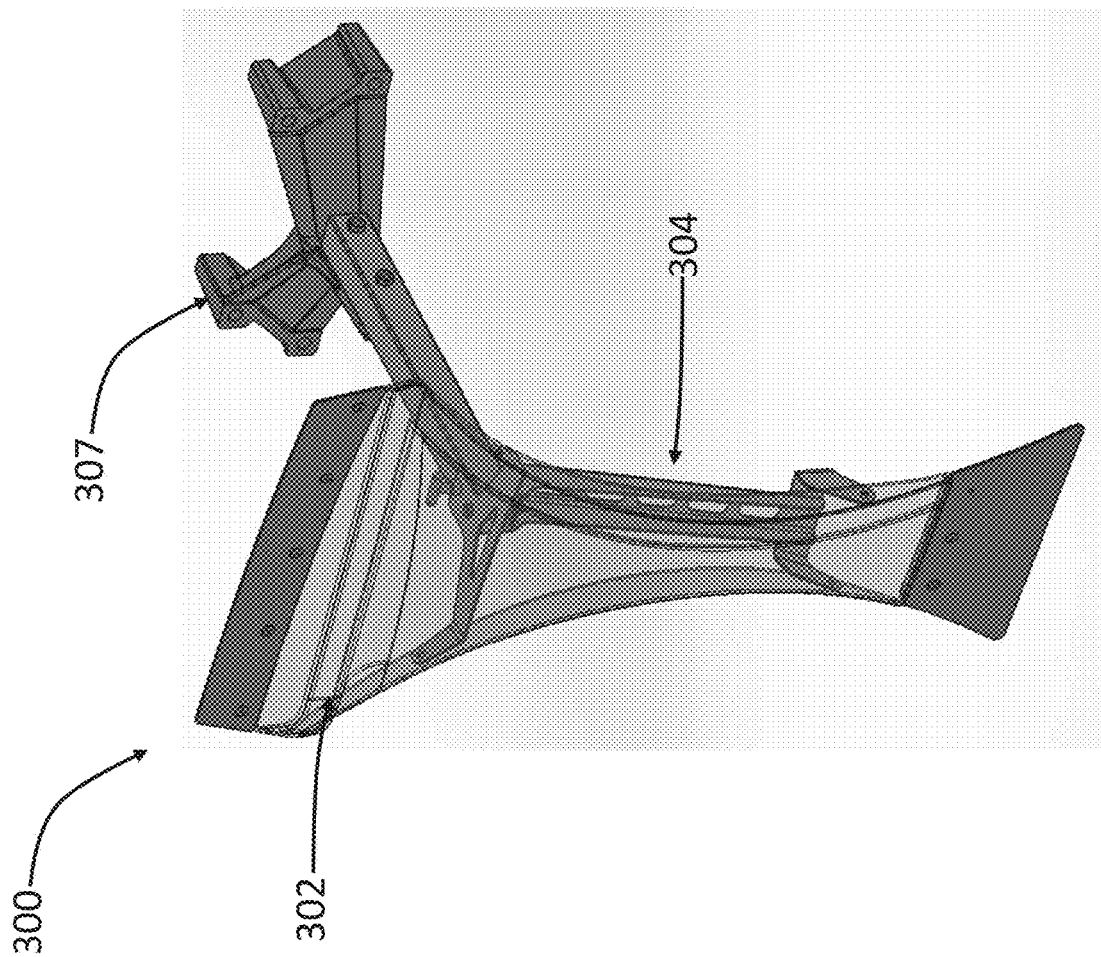

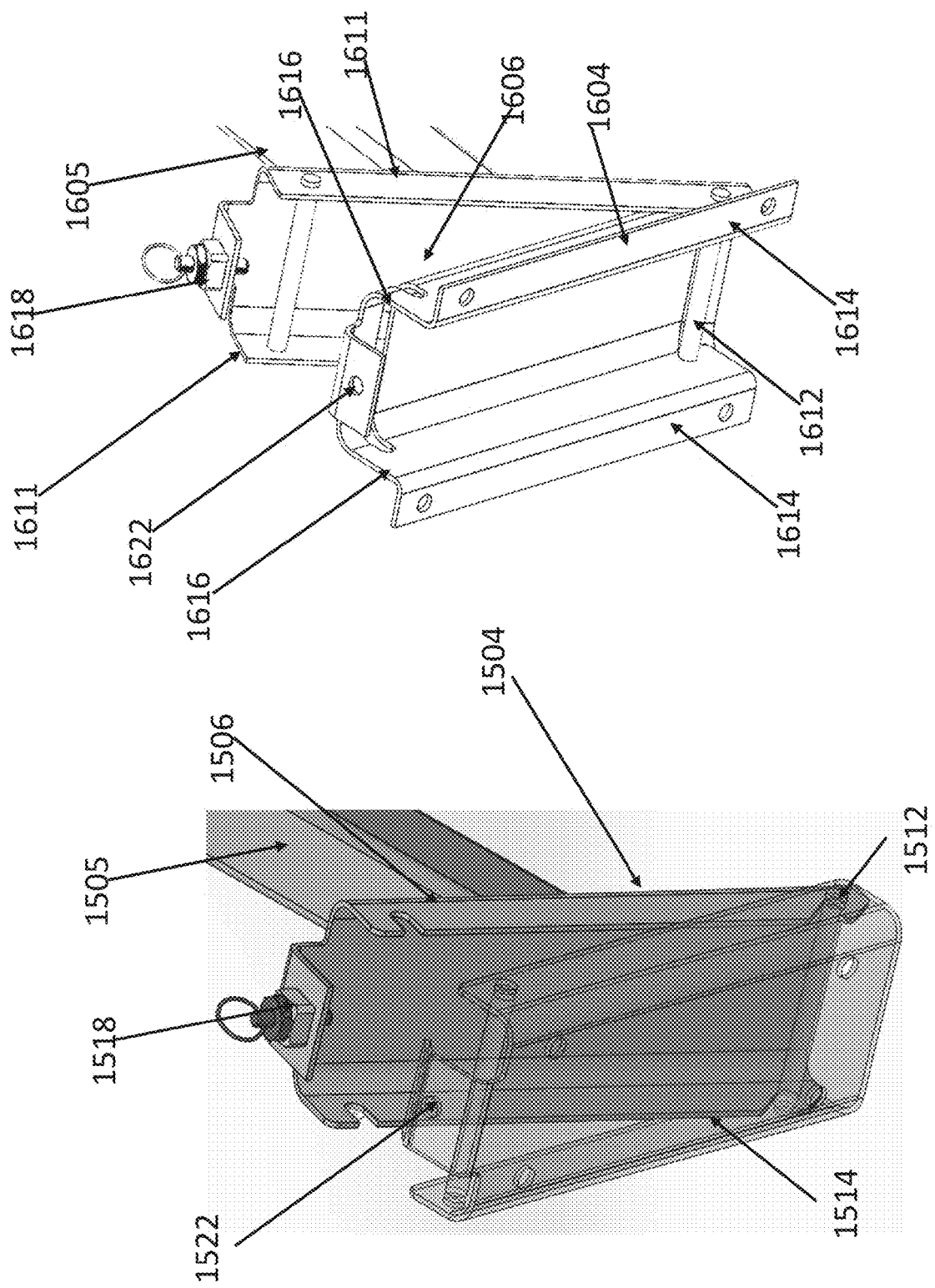

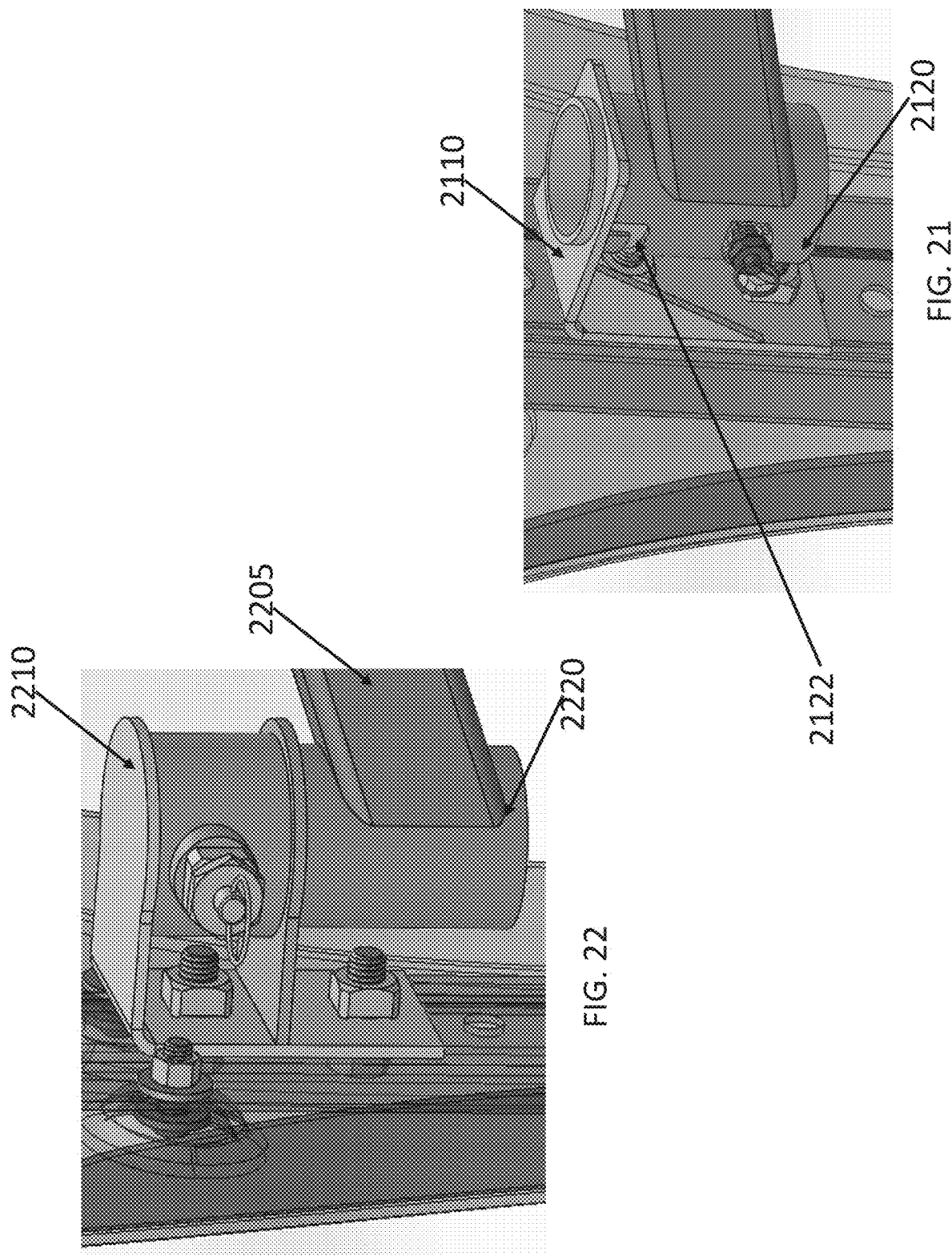

ROTATABLE AERODYNAMIC FAIRING SYSTEM

RELATED APPLICATIONS

This application is a continuation of and claims a benefit of priority under 35 U.S.C. 120 of U.S. patent application Ser. No. 16/049,367 filed Jul. 30, 2018, entitled "Rotatable Aerodynamic Fairing System," issued as U.S. Pat. No. 10,882,571, which claims the benefit of priority under 35 USC § 119(e) to U.S. Provisional Patent Application No. 62/538,791 filed Jul. 30, 2017, entitled "Aerodynamic System and Adjustable Fairings," which are fully incorporated by reference herein in their entireties for all purposes.

TECHNICAL FIELD

This disclosure relates to aerodynamic systems for vehicles. More particularly, this disclosure relates to aerodynamic fairings for vehicles such as tractor trailers. Even more particularly, this disclosure relates to systems for rotatable fairings.

BACKGROUND

Large vehicles such as semitrailer trucks may easily travel several thousand miles each month, including on highways and other routes which allow for higher speeds. Poor aerodynamics cause a decrease in fuel economy and an increase in operating cost.

Various types of aerodynamic systems have been devised for reducing vehicle drag, including fairings—that is, external panels or structures added to vehicles to increase streamlining and reduce drag—that are positioned to control airflow. U.S. Pat. Nos. 9,027,983 and 9,663,157, both of which are fully incorporated herein by reference for all purposes, describe aerodynamic fairing systems that include a quarter fender fairing assembly, a middle or tandem fairing assembly and a rear fairing assembly. The quarter fender fairing assembly mounts forward of the truck tractor's non-steered wheels, the tandem (or middle) fairing assembly mounts to the tractor between the tandem wheels and the rear fairing assembly mounts to the tractor behind the rear tandem wheels. Each fairing assembly includes a mounting arm that mounts to the tractor frame and one or more panels that mount to the support arm. The panels are shaped to produce a desired aerodynamic flow.

In practice, the fairings can make certain operations difficult for vehicle operators to perform. For example, fairings can make it difficult for a driver to install snow chains on tires or to reach the tractor frame.

SUMMARY OF THE DISCLOSURE

Embodiments described herein provide systems and methods for improving the aerodynamics of vehicles, including large vehicles that are commonly seen pulling cargo trailers on highways, and which are generally referred to as "semis," "18-wheelers," "tractor trailers," and the like. Embodiments may also be beneficial on other vehicles as well.

One embodiment comprises a fairing assembly adapted to couple to a vehicle, the assembly comprising: a support arm mountable to a frame rail of a vehicle and a fairing adapter adapted to mount a fairing to the support arm. The fairing adapter is rotatably coupled to the support arm and is rotatable from a first orientation corresponding to an aerodynamic position to a second orientation corresponding to a first access position. The fairing adapter may also be rotatable to a third orientation corresponding to a second access position. In some embodiments, the fairing adapter can also be removed by an operator for improved accessibility. In particular, in some embodiments, the fairing adapter can be dismounted from the support arm without tools. According to one embodiment, the fairing adapter is coupled to the support arm at a revolute joint. The assembly further comprises a manually releasable lock to lock the fairing adapter in the first orientation and releasable to allow the fairing adapter to rotate to the second orientation or the third orientation.

The fairing assembly can further comprise a fairing. The fairing can include an aerodynamic outer surface to direct flow in a rearward angle. The fairing is mounted to the fairing adapter and capable of being positioned in the aerodynamic position and the first access position. The fairing may also be capable of being positioned in a second access position. For example, according to one embodiment, the first access position may be behind the support arm and the second access position may be in front of the support arm.

According to one embodiment, the fairing assembly comprises a joint pin that passes through coaxial openings in the fairing adapter and support arm. More particularly, according to one embodiment, the fairing adapter comprises an upper horizontal plate and a lower horizontal plate and a distal portion of the support arm resides in a gap between the upper horizontal plate and the lower horizontal plate. The joint pin can pass through the first horizontal plate and the second horizontal plate. The fairing adapter can be rotatable relative to the support arm about the joint pin.

According to one embodiment, the releasable locking mechanism comprises a locking pin, such as a pop pin. The support arm may define a support arm first locking pin opening positioned to align with the locking pin when the fairing adapter is in the first orientation. The locking pin may advance into the support arm first locking pin opening to lock the fairing adapter in the first orientation. The support arm may define a second locking pin opening, the second locking pin opening positioned to align with the locking pin when the fairing adapter is in the second orientation. The locking pin may advance into the second locking pin opening to lock the adapter in the second orientation. The support arm may define a third locking pin opening, the third locking pin opening positioned to align with the locking pin when the fairing adapter is in the third orientation. The locking pin may advance into the third locking pin opening to lock the adapter in the third orientation.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein:

FIG. 3A is a diagrammatic representation of an outboard view of another embodiment of a fairing assembly;

FIG. 15 is a diagrammatic representation of one embodiment of a system for mounting a fairing to support arm;

FIG. 16 is a diagrammatic representation of one embodiment of a system for mounting a fairing to support arm;

FIG. 21 is a diagrammatic representation of one embodiment of a system for mounting a fairing to support arm;

FIG. 22 is a diagrammatic representation of one embodiment of a system for mounting a fairing to support arm;

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide systems and methods for improving the aerodynamics of vehicles, including large vehicles that are commonly seen pulling cargo trailers on highways, and which are generally referred to as "semis", 18-wheelers," "tractor trailers" and the like and may be beneficial on other vehicles as well.

More particularly embodiments provide fairing assemblies for vehicles. According to one embodiment, a fairing assembly comprises a support arm, a fairing adapter and a fairing. The support arm mounts to a vehicle frame at a proximate (inboard) end. The fairing adapter is rotatably coupled to the support arm at a distal (outboard) end. The fairing is mounted to the fairing adapter. The fairing adapter can be rotatable from a first orientation to a second orientation. The first orientation can correspond to the fairing being in an aerodynamic position. The second orientation can correspond to the fairing being in a first access position. The fairing adapter may also be rotatable to a third orientation. The third orientation can correspond to the fairing being in a second access position. A releasable locking mechanism locks the orientation of the fairing adapter relative to the support arm. The locking mechanism may be releasable by manual control such that an operator can rotate the fairing assembly, and hence the fairing, relative to the support arm. In some embodiments, the locking mechanism may allow the operator to lock the fairing adapter in multiple orientations relative to the support arm.

Figure 1A:
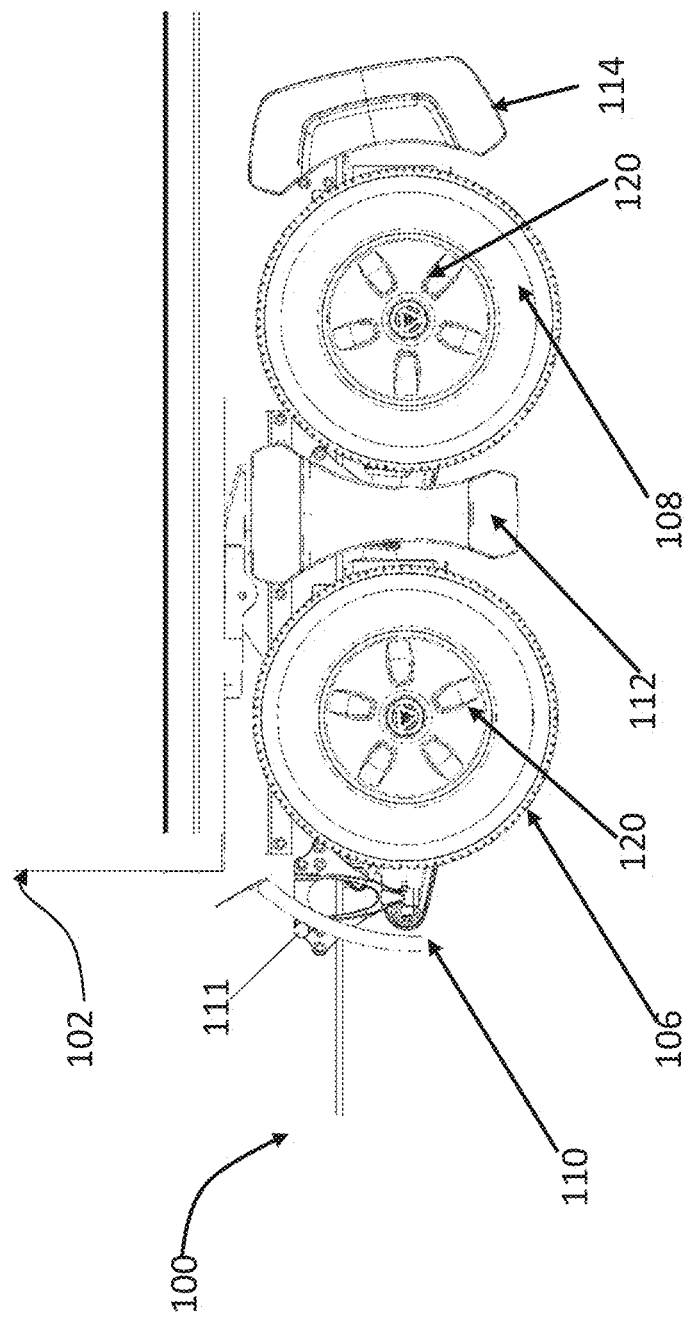
FIG. 1A is a diagrammatic representation of one embodiment of an aerodynamic system.
Figure 1B:
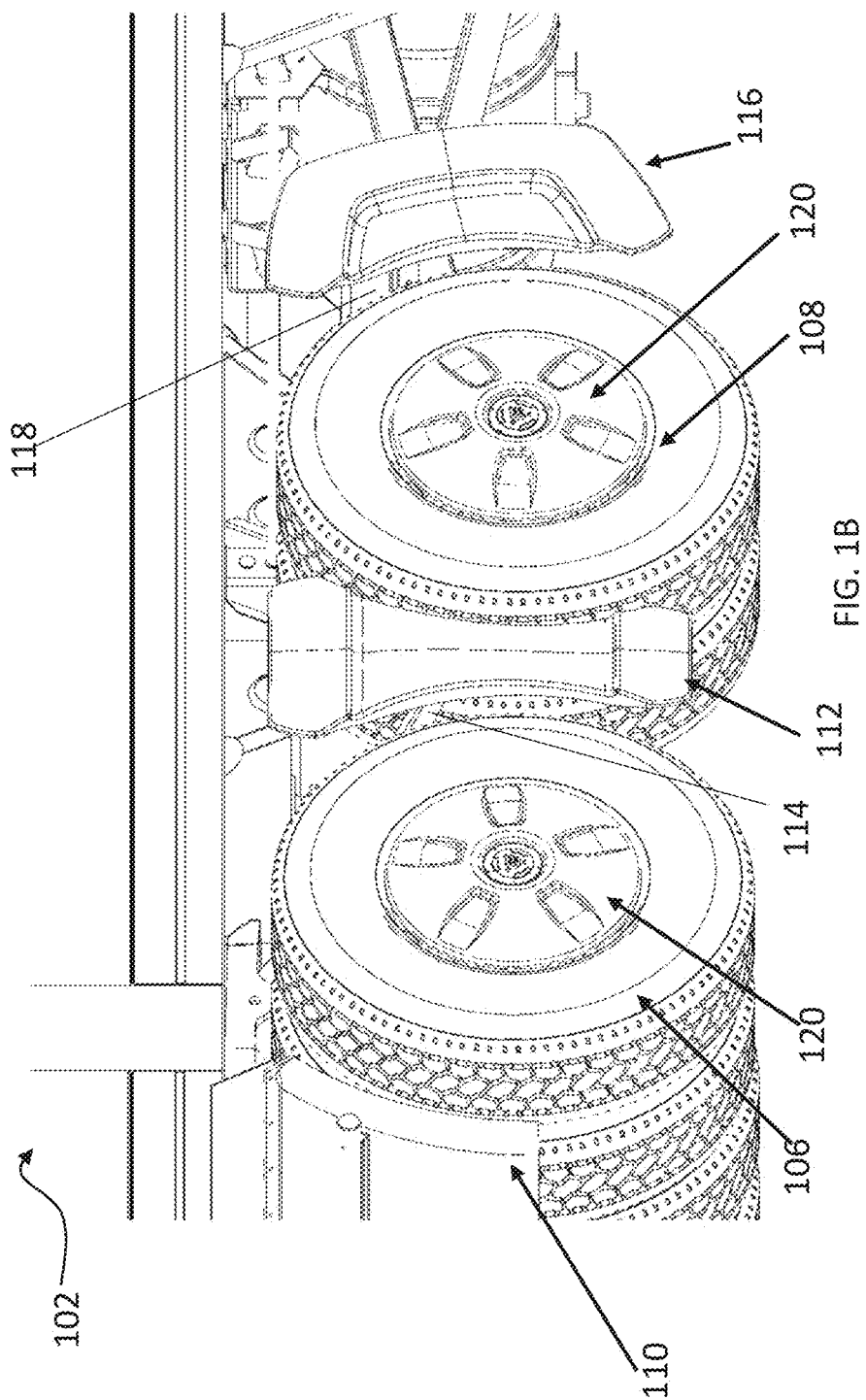
FIG. 1B is a diagrammatic representation of another view of the aerodynamic system of FIG. 1A.

FIG. 1A illustrates a side view of an aerodynamic system mounted to a truck tractor 100 and FIG. 1B illustrates another view of the aerodynamic system mounted to the truck tractor 100. A portion of trailer 102 is also depicted. In the illustrated embodiment, the truck tractor 100 includes forward tandem tires 106 and rear tandem tires 108. The aerodynamic system includes a quarter fender 110 mounted to a support arm 111 in front of front tandem wheels 106, a tandem or middle fairing 112 mounted to the tractor 100 by a support arm 114 that passes between the tandem tires 106, 108 and a rear fairing 116 mounted to the tractor 100 by a support arm 118 behind the rear tandem wheels 108.

A standard quarter fender 110 in a standard location is shown installed in the figures. An aerodynamic quarter fender fairing may also be used with the aerodynamic system (instead of or in addition to the standard quarter fender). In some embodiments, the aerodynamic system may include a quarter fender assembly as described in U.S. Pat. No. 8,814,253, entitled "Aerodynamic Quarter Fender Assembly and Construction Method," by inventors Joshua Butler, et al., which is fully incorporated as part of this disclosure for all purposes. Wheel covers 120 may provide a substantially smooth surface flush with an outer sidewall of the tires or may provide another aerodynamic profile. Examples of aerodynamic wheel covers are described in U.S. Patent Application Publication No. 2013/0015698, entitled "Aerodynamic Wheel Covers and Mounting Assemblies," by inventors Joshua Butler, et al., which is fully incorporated herein by reference in its entirety for all purposes. In another embodiment, the aerodynamic system may include a front fairing as described in U.S. Pat. No. 9,027,983, entitled "Aerodynamic System and Adjustable Fairings," by inventors Joshua Butler et al., which is hereby fully incorporated by reference herein in its entirety for all purposes.

The outboard side of fairing 112 forms an aerodynamic outboard surface between a leading edge and a trailing edge that promotes attached rearward flow (when the vehicle is moving forward). In some cases, the outboard surface directs the flow rearward or rearward and slightly inward or outward. The outer surface may have a variety of profiles including flat, curved outward toward the rear, or other profile. According to one embodiment, the leading edge may be curved to substantially conform to the shape of a tire forward fairing 112 and the trailing edge may have a curved shape to conform to the shape of tire to the rear of fairing 112. The middle fairing 112 may also contain other aerodynamic features such as vents, ribs, or other features, for reducing drag and controlling splash and spray, or providing ventilation for dissipating heat. Examples of middle fairings 112 include middle fairings as described in U.S. Pat. No. 9,027,983, entitled "Aerodynamic System and Adjustable Fairings," by inventors Joshua Butler et al., which is hereby fully incorporated by reference herein in its entirety for all purposes, a middle fairing as described in U.S. patent application Ser. No. 16/017,591, entitled "Aerodynamic Systems and Fairings with Fairing Caps," filed Jun. 25, 2018, by inventors Joshua Butler et al., which is hereby fully incorporated by reference herein in its entirety for all purposes, or other middle fairing.

Similarly, the outboard side of rear fairing 116 forms an aerodynamic outboard surface between a leading edge and a trailing edge that promotes attached rearward flow (when the vehicle is moving forward). The fairing outboard surface comprises an aerodynamic outer surface to direct flow in a rearward angle, including, but not limited to rearward and downward, rearward and upward, rearward and outward, rearward and inward and combinations thereof. According to one embodiment, the outboard surface of rear fairing 116 has a sufficient projected surface area (in view from the side of the vehicle) to promote attached flow. Examples of rear fairings 116 include, but are not limited to, mud flap fairings and rear fairings as described in U.S. Pat. No. 9,027,983, entitled "Aerodynamic System and Adjustable Fairings," by inventors Joshua Butler et al., which is hereby fully incorporated by reference herein in its entirety for all purposes or rear fairings as described in U.S. patent application Ser. No. 16/017,591, entitled "Aerodynamic Systems and Fairings with Fairing Caps," filed Jun. 25, 2018, by inventors Joshua Butler et al., which is hereby fully incorporated by reference herein in its entirety for all purposes.

In operation, airflow is directed around forward tandem tires 106 by a quarter fender fairing 110, passes by a first tire, passes over the outboard surface of middle fairing assembly 112, passes by a rear tandem tire 108 and passes over the outboard surface of rear fairing assembly 116. The aerodynamic system can facilitate a smooth transition behind tires 108 and extend the airflow in a direction substantially parallel with the outer sidewall of the tandem tires or direct the airflow out (i.e., away from the frame rail). Additionally, embodiments of an aerodynamic system may direct airflow parallel with the ground, in a downward direction or an upward direction as desired.

As can be seen in FIGS. 1A 1B, it may be difficult for a driver to put snow chains on the tandem tires or access the areas inboard of fairings 110, 112, 116. One or more of a front fairing or quarter panel fairing, middle fairing, rear fairing or other fairing may be mounted to a support arm in a manner that allow the fairing to be rotated to the front of or rear of the support arm, thus providing the operator with greater access to the adjacent tires and the areas inboard of the rotatable fairing. Embodiments may provide other mechanisms to allow access, such as making the fairing rotatable in other directions or easily removable. In the illustrated embodiments, below, the depicted fairings are examples of middle fairing 112 and may be shaped as discussed above with respect to middle fairing 112, as described in U.S. Pat. No. 9,027,983, entitled "Aerodynamic System and Adjustable Fairings," by inventors Joshua Butler et al., which is hereby fully incorporated by reference herein in its entirety for all purposes, or as described in U.S. patent application Ser. No. 16/017,591, entitled "Aerodynamic Systems and Fairings with Fairing Caps," filed Jun. 25, 2018, by inventors Joshua Butler et al., which is hereby fully incorporated by reference herein in its entirety for all purposes. It will be appreciated that middle fairings are used by way of example only and other types of fairings may be rotatably or removably coupled to support arms.

Figure 2A:
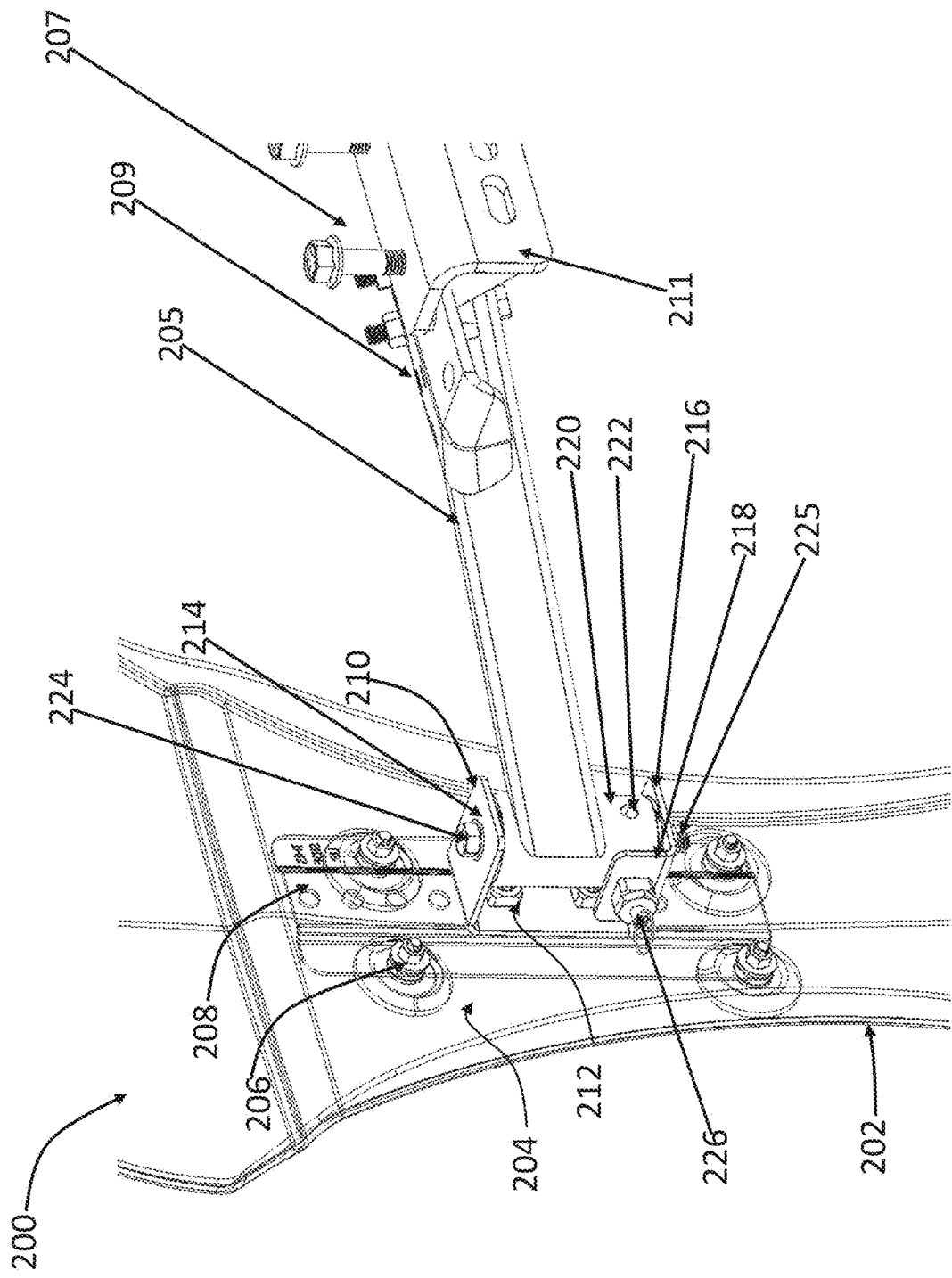
FIG. 2A is a diagrammatic representation of one embodiment of a fairing assembly with a fairing adapter in a first orientation.
Figure 2B:
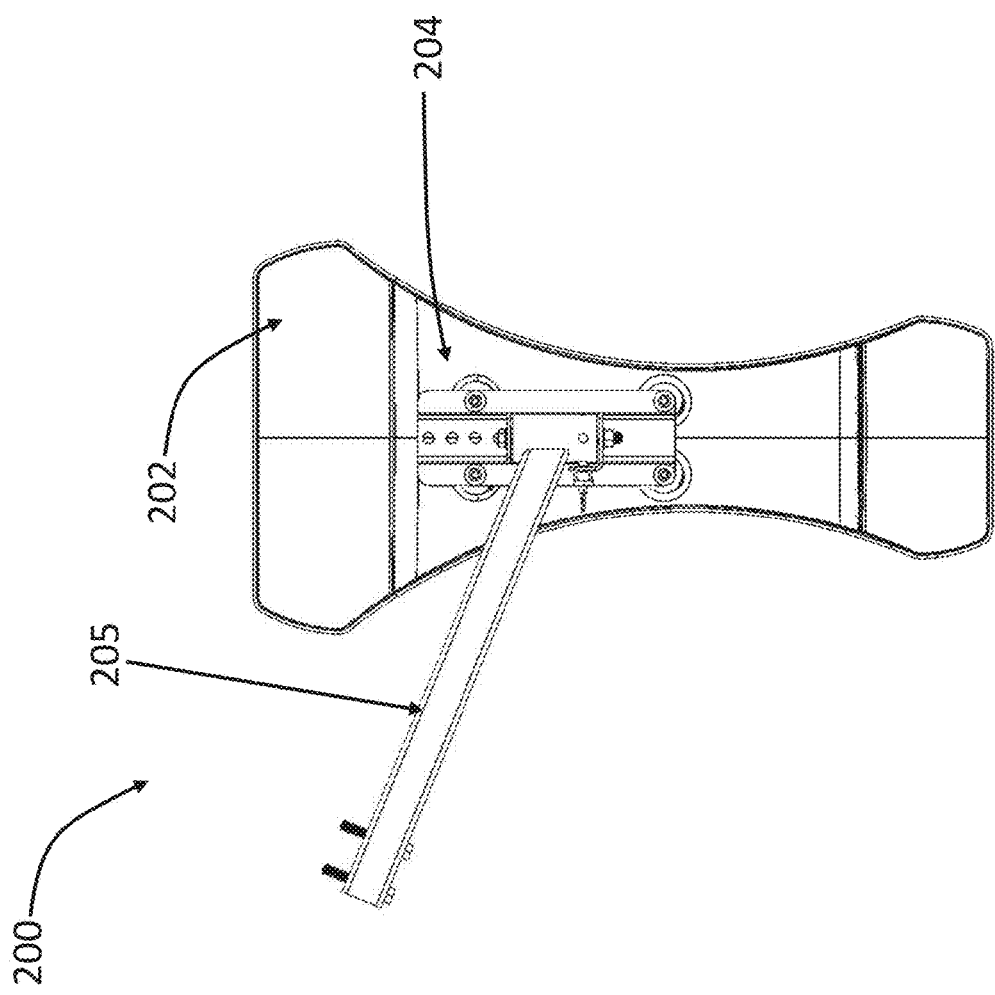
FIG. 2B is a diagrammatic representation of one embodiment of a fairing assembly with a fairing adapter in a second orientation.
Figure 2C:
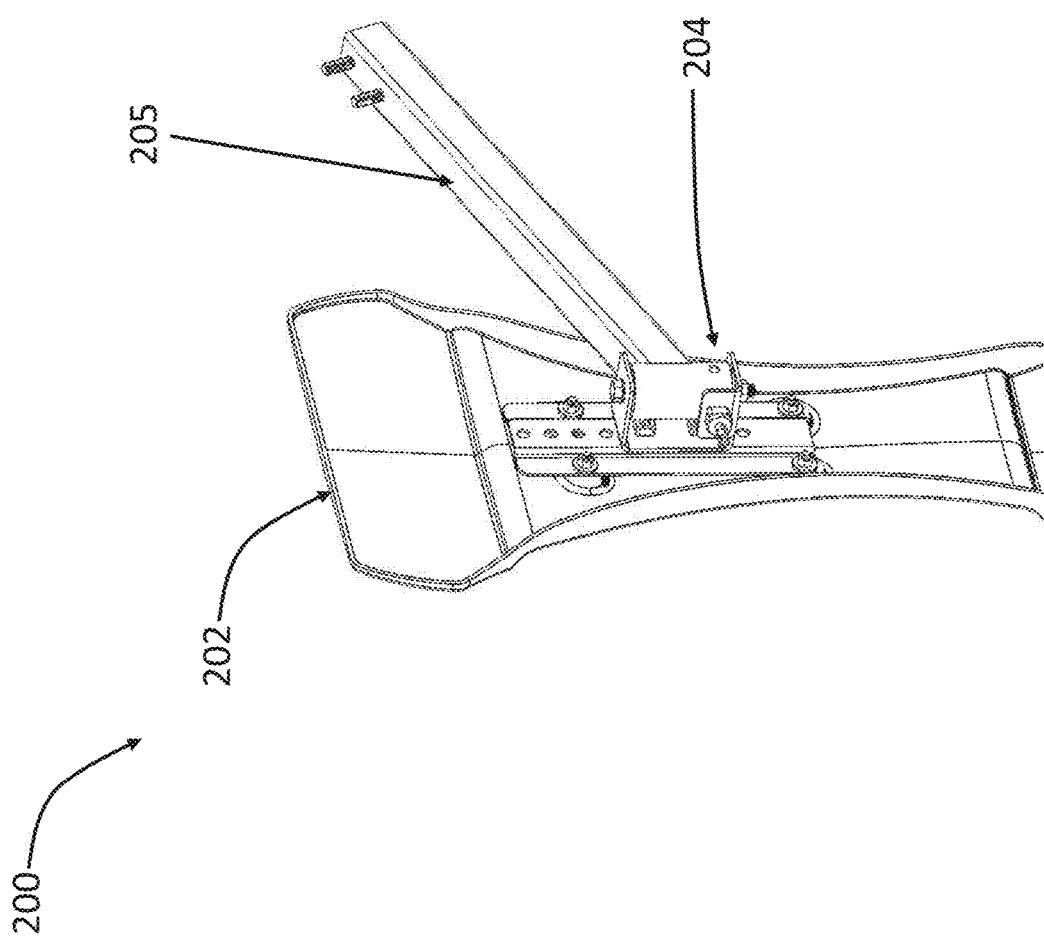
FIG. 2C is a diagrammatic representation of one embodiment of a fairing assembly with a fairing adapter in a third orientation.

FIG. 2A is an inboard oblique view of one embodiment of a fairing assembly 200 comprising a fairing 202 mounted to a fairing adapter 204 that is coupled to a support arm 205. In FIG. 2A, fairing adapter 204 is in a first orientation relative to arm 205. This orientation can correspond to an aerodynamic position of fairing 202. That is, the orientation of adapter 204 relative to arm 205 corresponds to the position that the fairing should be in as the vehicle is driven. FIG. 2B is an inboard oblique view of fairing assembly 200 with fairing adapter 204 in a second orientation relative to arm 205. This orientation corresponds to a first access position because the fairing is rotated to the back of arm 205. FIG. 2C is an inboard oblique view of fairing assembly 200 with the fairing adapter 204 in a third orientation relative to arm 205. This orientation corresponds to a second access position because the fairing is rotated to the front of arm 205. Rotating the fairing to the front or the back of the arm provides better access to areas that may have been previously obstructed by the fairing.

Arm 205 attaches to a vehicle at a proximate end ("proximate" used to refer to being closer the vehicle or inboard end) and supports a fairing 202 at a distal end ("distal" used to refer to being further away from the vehicle or outboard end). Support arm 205 may couple to a vehicle frame rail by bracket assembly 207 and to fairing 202 by adapter 204.

Bracket 207 can comprise a first portion 209 that extends generally parallel to arm 205 and a frame rail mount portion 211 that is angled a desired angle relative to first portion 209. Second portion 211 may be coupled to the frame rail of the vehicle in a desired position through welding, using connection members or according to another connection mechanism. Arm 205 may be connected to bracket 207 using connection members (e.g., bolts or other connection members) passing through holes in portion 209 and corresponding holes in arm 205, welding or other connection mechanism. Because of the difference in angle of first portion 209 and frame rail mount portion 211, arm 205 may extend laterally outward and be angled downward from the frame rail. In other embodiments, arm 205 may extend parallel to the ground.

According to one embodiment, adapter 204 includes an end plate 208 and joint bracket 210. End plate 208 connects to the joint bracket 210 using one or more connection members 212 (bolts, rivets, screws or other connection member), welding or other coupling mechanism. In the illustrated embodiment, end plate 208 includes openings for connection members 212 such that the vertical position of end plate 208 can be adjusted related to joint bracket 210 during assembly, thus allowing the mounting height of the fairing 202 to be selected.

End plate 208 is angled relative to the long axis of arm 205 so that the outboard surface of end plate 208 is generally vertically aligned in a longitudinal plane or an angle to the longitudinal. End plate may have openings that can receive mounting hardware 206, such as bolts or other connection members, for mounting fairing 202 to adapter 204. The openings may be threaded or non-threaded. According to one embodiment, nuts may be welded or otherwise attached to the inboard side of end plate 208 to provide threads.

Joint bracket 210, according to one embodiment, is a c-bracket that forms a recess between an upper portion 214 (e.g., an upper horizontal plate) and a lower portion 216 (e.g., a lower horizontal plate). A cylindrical distal portion 220 of arm 205 fits in the gap between the upper portion 214 and lower portion 216. Coaxial openings are provided in the joint bracket 210 (e.g., through the upper portion 214 and lower portion 216) and distal portion 220. A joint pin 224 passes through the openings to hold the adapter 204 and arm 205 together. The joint pin 224 is held in its position with the help of a collar 225. According to one embodiment, the joint pin 224 is a bolt and the collar 225 is a nut. The distal portion 220 of arm 205, adapter 204 and joint pin 224 form a revolute joint such that adapter 204 can rotate about an origin formed by joint pin 224. The adapter 204 or distal portion 220 of arm 205 may include an internal bushing, bearing, or other features to reduce friction during rotation or extend the life of the joint. For example, bushings like bushings 850 may be used (see FIG. 8B).

Fairing assembly 200 further comprises a releasable locking mechanism to selectively lock the joint so that the adapter 204, and hence fairing 202, is in a desired orientation relative to arm 205. In particular, the locking mechanism can lock the joint so that the fairing 202 is in an aerodynamic position. According to one embodiment, the joint is releasable via a manual control, such that the operator can place the fairing 202 at any desired orientation within a range by rotating it there. In some embodiments, the locking mechanism can be manually or automatically reengaged at other orientations to lock fairing in the desired orientation. For example, the locking mechanism may be engaged, in some embodiments, to lock fairing 202 in the first access position of FIG. 2B or second access position of FIG. 2C. In some cases, such as while operating the vehicle in the snow with tire chains, it may be advantageous to keep the fairing 202 locked in one of the access positions while the vehicle is in motion.

In the illustrated embodiment, the radially outer surface of distal portion 220 includes a plurality of spaced support arm locking pin openings 222 to receive a locking pin. Further, joint bracket 210 includes a wall 218 that extends upward from lower portion 216, the wall 218 having a pin opening through which locking pin 226 can pass. Locking pin 226 is positioned to align with spaced locking pin openings 222 as adapter 204 rotates about pin 224. When the locking pin opening through wall 218 aligns with a support arm locking pin opening 222, pin 226 can advance into the support arm locking pin opening 222 with which it is aligned to lock the joint. The locking pin 226 can be retracted to release the joint. According to one embodiment, locking pin 226 is a pop pin that comprises an internal spring that asserts a force to advance the pin 226 and thus cause the joint to automatically lock when the pin aligns with a support arm locking pin opening 222, assuming a force is not being asserted to retract pin 226.

According to one embodiment, support arm locking pin openings 222 are provided such that adapter 204 can be locked in a first orientation with fairing 202 in the aerodynamic position of FIG. 2A, a second orientation with fairing 202 in the first access position of FIG. 2B and a third orientation with fairing 202 in the second access position of FIG. 2C. Additional locking pin openings 222 may also be provided such that fairing 202 can be locked in a range of positions relative to arm 205. It may, for example, be preferable to select one of these positions for a certain aerodynamic benefit. In other embodiments, the fairing adapter is only lockable in an orientation corresponding to one or more aerodynamic positions, but not other positions. Further, in other embodiments, the fairing adapter may only be rotatable from the orientation corresponding to the aerodynamic position to one of in front of or behind the support arm. For example, in one embodiment, the joint may only allow rotation from FIG. 2A to the orientation of FIG. 2B. In another embodiment, the joint may only allow rotation from the orientation of FIG. 2A to the orientation of FIG. 2C.

Figure 3B:
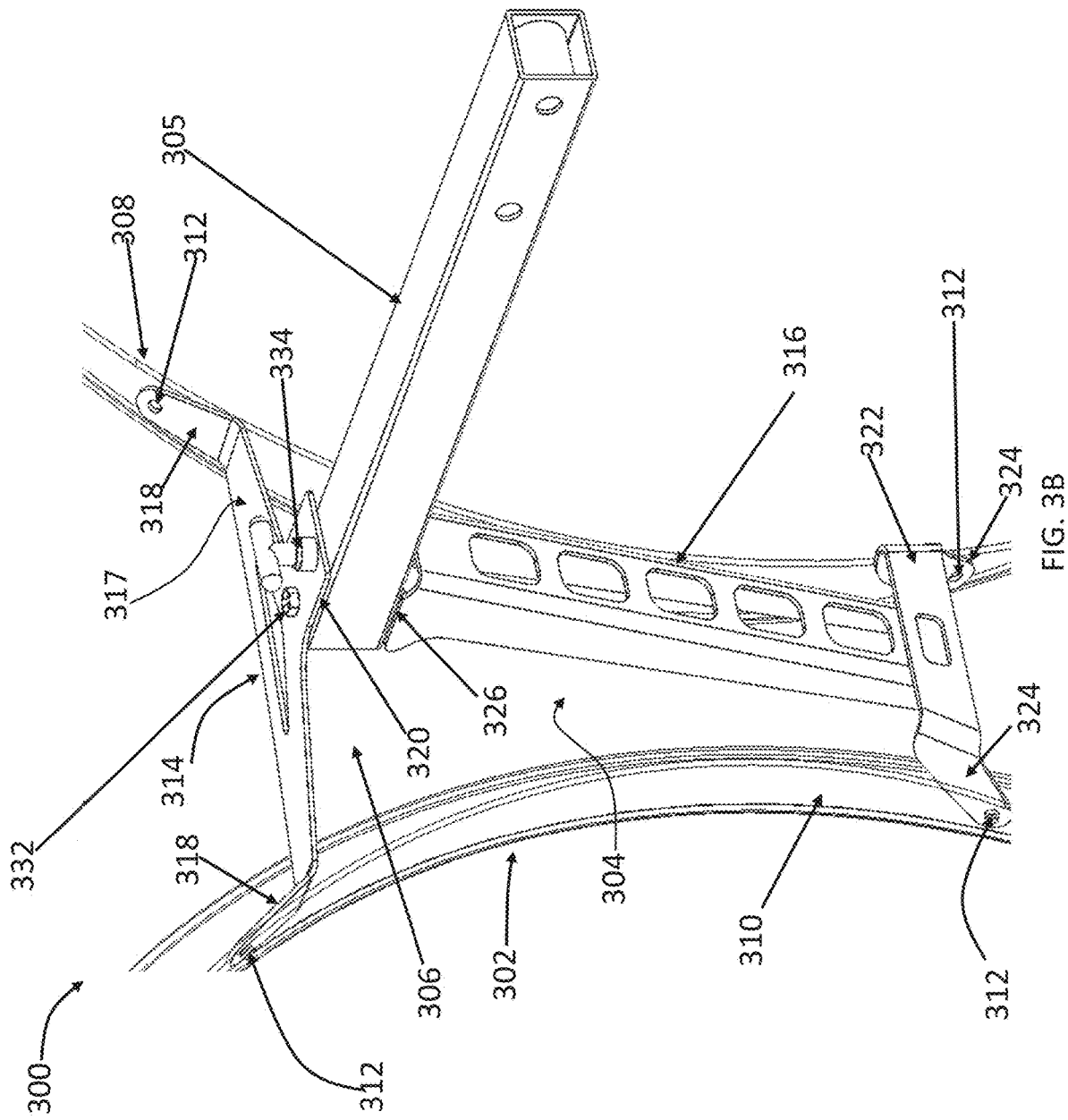
FIG. 3B is a diagrammatic representation of an inboard view of the embodiment of FIG. 3A.

FIG. 3A is an outboard oblique view of one embodiment of a fairing assembly 300. FIG. 3B is an inboard oblique view of fairing assembly 300. Fairing assembly 300 comprises a fairing 302 mounted to a fairing adapter 304 that is coupled to a support arm 305. In FIG. 3A and FIG. 3B, fairing 302 is in a first orientation relative to arm 305 corresponding to an aerodynamic position. Fairing 302 may be rotated to a first access position or a second access position.

Arm 305 attaches to a vehicle at a proximate end and supports a fairing at a distal end. Support arm 305 may couple to a vehicle frame rail by a bracket assembly 307, an example of which is illustrated in FIG. 3A, and to fairing 302 by adapter 304. In the embodiment illustrated, fairing assembly 300 is configured such that arm 305 will extend parallel to the ground. In other embodiments, fairing assembly 300 can be configured such that arm 305 extends out and downward. Bracket assembly 307 may be coupled to the frame rail of the vehicle in a desired position through welding, using connection members or according to another connection mechanism. Arm 305 may be connected to bracket 307 using connection members (e.g., bolts or other connection members) passing through holes in bracket 307 and corresponding holes in arm 305, welding or other connection mechanism.

Turning to FIG. 3B, fairing 302 includes an inboard surface 306. A front wall 308 and rear wall 310 extend inboard from inboard surface 306. Fairing 302 couples to adapter 304 at connection points 312 using connection members (bolts, rivets, screws or other connection member).

Adapter 304 includes an upper bracket 314 and a lower bracket 316. Upper bracket 314 includes a cross member 317 that extends between end walls 318 that abut the facing surfaces of front wall 308 and rear wall 310 of fairing 302. End walls 318 provide openings that can act as upper connection points 312. A portion 320 of upper bracket 314 provides a horizontal plate that extends over the distal portion of arm 305.

Lower bracket 316 includes a cross member 322 that extends between end walls 324 that abut the facing surfaces of front wall 308 and rear wall 310. End walls 324 provide openings that can act as lower connection points 312. A portion of lower bracket 316 extends upward to an upper portion 326 of lower bracket. Upper portion 326 of lower bracket 316 may comprise a wall (e.g., a horizontal plate) that extends under the distal portion of arm 305.

The distal portion of arm 305 fits in the gap between the portion 320 of upper bracket 314 and portion 326 of lower bracket 316. Coaxial openings are provided in portion 320, portion 326 and the distal portion of arm 305. A joint pin 332 passes through the openings to hold the adapter 304 and arm 305 together. The joint pin 332 is held in its position with the help of a collar (e.g., positioned under portion 326). According to one embodiment, the joint pin 332 is a bolt and the collar is a nut. Upper bracket 314, lower bracket 316, the distal portion of arm 305 and pin 332 form a revolute joint such that adapter 304 can rotate about an origin formed by joint pin 332. The adapter 304 distal portion of arm 305 may include an internal bushing, bearing or other features to reduce friction during rotation or extend the life of the joint.

Fairing assembly 300 further comprises a releasable locking mechanism to selectively lock the joint so that the adapter 304, and hence fairing 302, is in a desired orientation relative to arm 305. In particular, the locking mechanism can lock the joint so that the fairing is in an aerodynamic position. According to one embodiment, the joint is releasable via a manual control, such that the operator can place the fairing 302 at any desired orientation within a range by rotating it there.

In the illustrated embodiment, portion 320 includes a locking pin opening through which a locking pin 334 extends. The upper surface of the distal portion of arm 305 includes a support arm locking pin opening that aligns with the locking pin 334 when adapter 304 is in the orientation illustrated in FIG. 3 (e.g., when fairing 302 is in the aerodynamic position). When the support arm locking pin opening is aligned with the locking pin 334, locking pin 334 can advance into the locking pin opening of arm 305 to lock the joint. The locking pin 334 can be retracted to release the joint. According to one embodiment, locking pin 334 is a pop pin that comprises an internal spring that asserts a force to advance the pin 334 and thus cause the joint to automatically lock when the pin 334 aligns with the locking pin opening in arm 305, assuming a force is not being asserted to retract pin 334. Adapter 304, and hence fairing 302, may also be lockable in other positions relative to arm 305.

In the embodiment of FIG. 3, fairing 302 is movable from the aerodynamic position to a first access position and second access position. In other embodiments, the fairing may only be rotatable from the aerodynamic position to one of in front of or behind the support arm.

Figure 4:
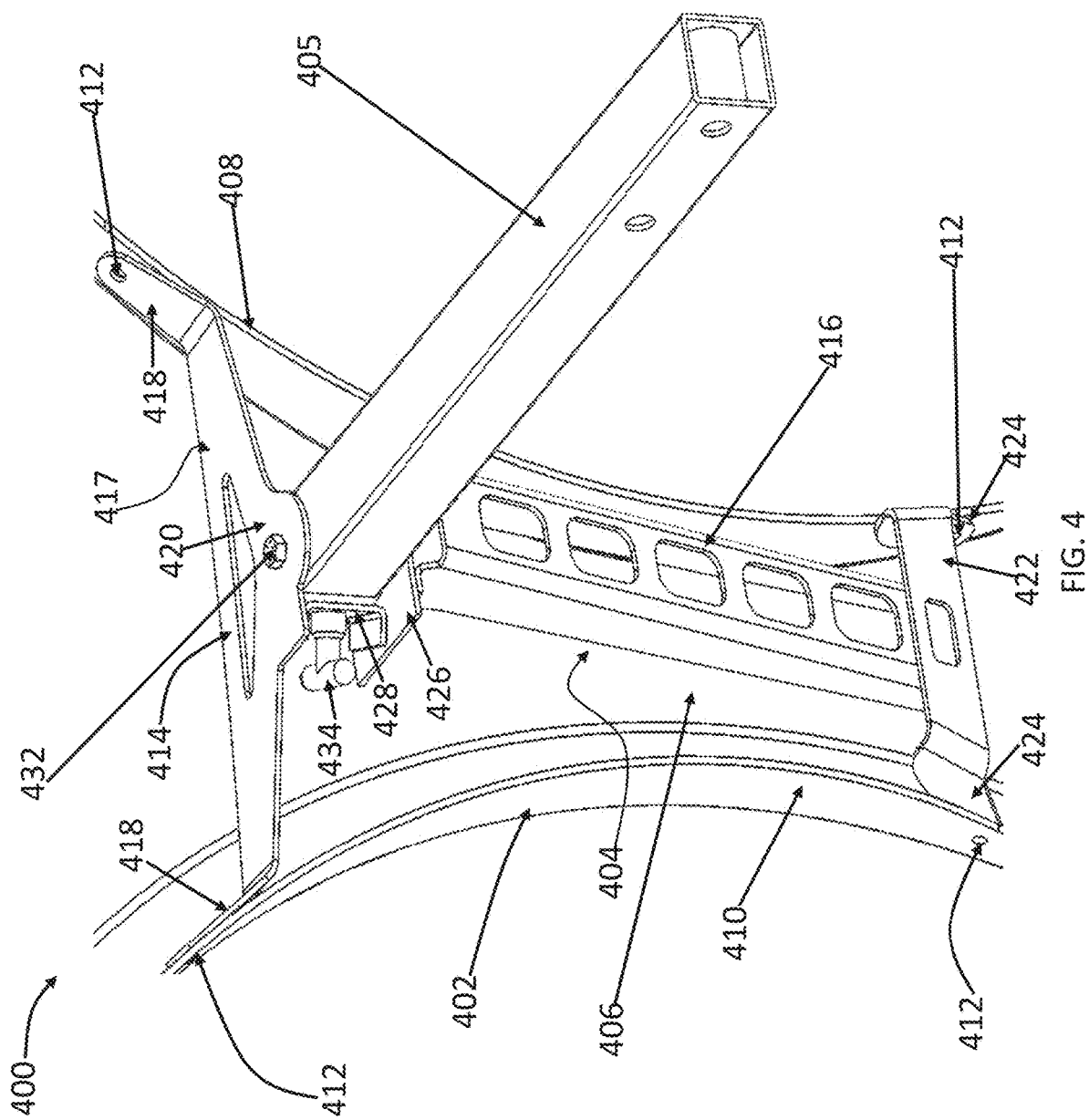
FIG. 4 is a diagrammatic representation of another embodiment of a fairing assembly.

FIG. 4 is an inboard oblique view of one embodiment of a fairing assembly 400 comprising a fairing 402 mounted to a fairing adapter 404 that is coupled to a support arm 405. In FIG. 4, fairing 402 is in a first orientation relative to arm 405 corresponding to an aerodynamic position. Arm 405 attaches to a vehicle at a proximate end and supports a fairing 402 at a distal end. Support arm 405 may couple to a vehicle frame rail by a bracket assembly (not shown) and to fairing 402 by adapter 404. In the embodiment illustrated, fairing assembly 400 is configured such that arm 405 will extend parallel to the ground. In other embodiments, fairing assembly 400 can be configured such that arm 405 extends out and downward.

According to one embodiment, fairing 402 includes an inboard surface 406. A front wall 408 and rear wall 410 extend inboard from inboard surface 406. Fairing 402 couples to adapter 404 at connection points 412 using connection members (bolts, rivets, screws or other connection member).

Adapter 404 includes an upper bracket 414 and a lower bracket 416. Upper bracket 414 includes a cross member 417 that extends between end walls 418 that abut the facing surfaces of front wall 408 and rear wall 410 of fairing 402. End walls 418 provide openings that can act as upper connection points 412. Cross member 417 may comprise a horizontal plate with a portion 420 that extends over the distal portion of arm 405.

Lower bracket 416 includes a cross member 422 that extends between end walls 424 that abut the facing surfaces of front wall 408 and rear wall 410. End walls 424 provide openings that can act as lower connection points 412. A portion of lower bracket 416 extends upward to an upper wall 426 of lower bracket. Upper portion 426 of lower bracket 416 extends under the distal portion of arm 405. Upper portion 426 of lower bracket 416 may comprise a wall (e.g., a horizontal plate) that extends under the distal portion of arm 405. An upwardly extending wall 428 extends up from the upper surface of upper portion 426.

The distal portion of arm 405 fits in the gap between the portion 420 of upper bracket 414 and portion 426 of lower bracket 416. Coaxial openings are provided in portion 420, portion 426 and the distal portion of arm 405. A joint pin 432 passes through the openings to hold the adapter 404 and arm 405 together. The joint pin 432 is held in its position with the help of a collar (e.g., positioned under portion 426). According to one embodiment, the joint pin 432 is a bolt and the collar is a nut. Upper bracket 414, lower bracket 416, the distal portion of arm 405 and pin 432 form a revolute joint such that adapter 404 can rotate about an origin formed by joint pin 432. The adapter 404 or distal portion of arm 405 may include an internal bushing, bearing or other features to reduce friction during rotation or extend the life of the joint.

Fairing assembly 400 further comprises a releasable locking mechanism to selectively lock the joint so that the adapter 404, and hence fairing 402, is in a desired orientation relative to arm 405. In particular, the locking mechanism can lock the joint so that the fairing is in an aerodynamic position. According to one embodiment, the joint is releasable via a manual control, such that the operator can place the fairing adapter 404 at any desired orientation within a range by rotating it there.

In the illustrated embodiment, upwardly extending wall 428 includes a locking pin opening through which a locking pin 434 extends. A vertical surface of the distal portion of arm 405 includes a locking pin opening that aligns with the locking pin 434 when adapter 404 is in the orientation illustrated in FIG. 4 (e.g., when fairing 402 is in the aerodynamic position). When locking pin 434 aligns with the locking pin opening in arm 405, locking pin 434 can advance into the locking pin opening of arm 405 to lock the joint. The locking pin 434 can be retracted to release the joint. According to one embodiment, locking pin 434 is a pop pin that comprises an internal spring that asserts a force to advance the pin 434 and thus cause the joint to automatically lock when the pin opening in wall 428 aligns with the locking pin opening in arm 405, assuming a force is not being asserted to retract pin 434. Adapter 404, and hence fairing 402, may also be lockable in other positions relative to arm 405.

In the embodiment of FIG. 4, fairing 402 is movable from the aerodynamic position to an access position in front of arm 405. However, upwardly extending wall 428 limits or prevents rotation behind arm 405. In other embodiments, upwardly extending wall 428 could be placed to the other side of arm 405 so that the fairing could be rotated to an access position behind arm 405.

Figure 5A:
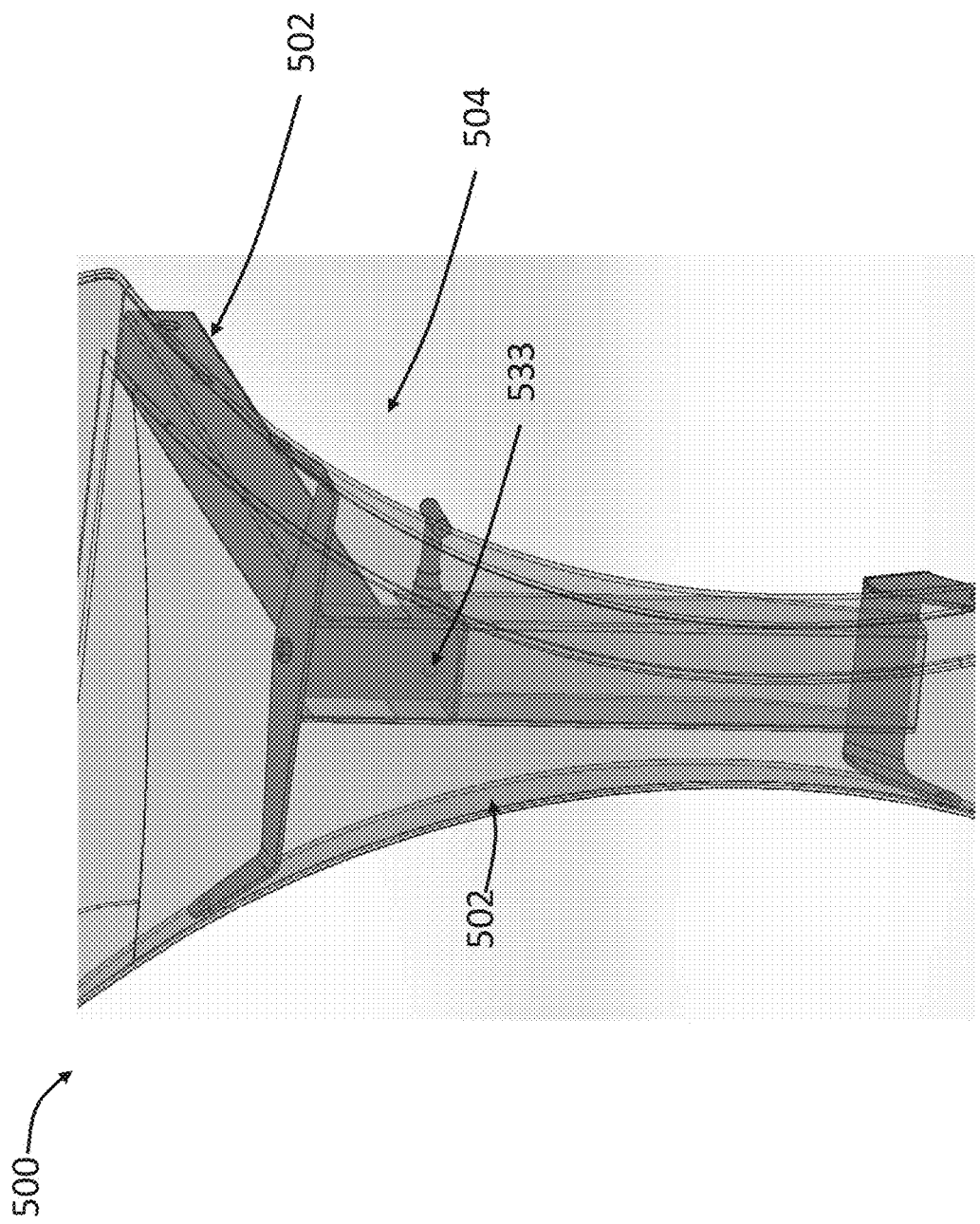
FIG. 5A is a diagrammatic representation of an outboard view another embodiment of a fairing assembly.
Figure 5B:
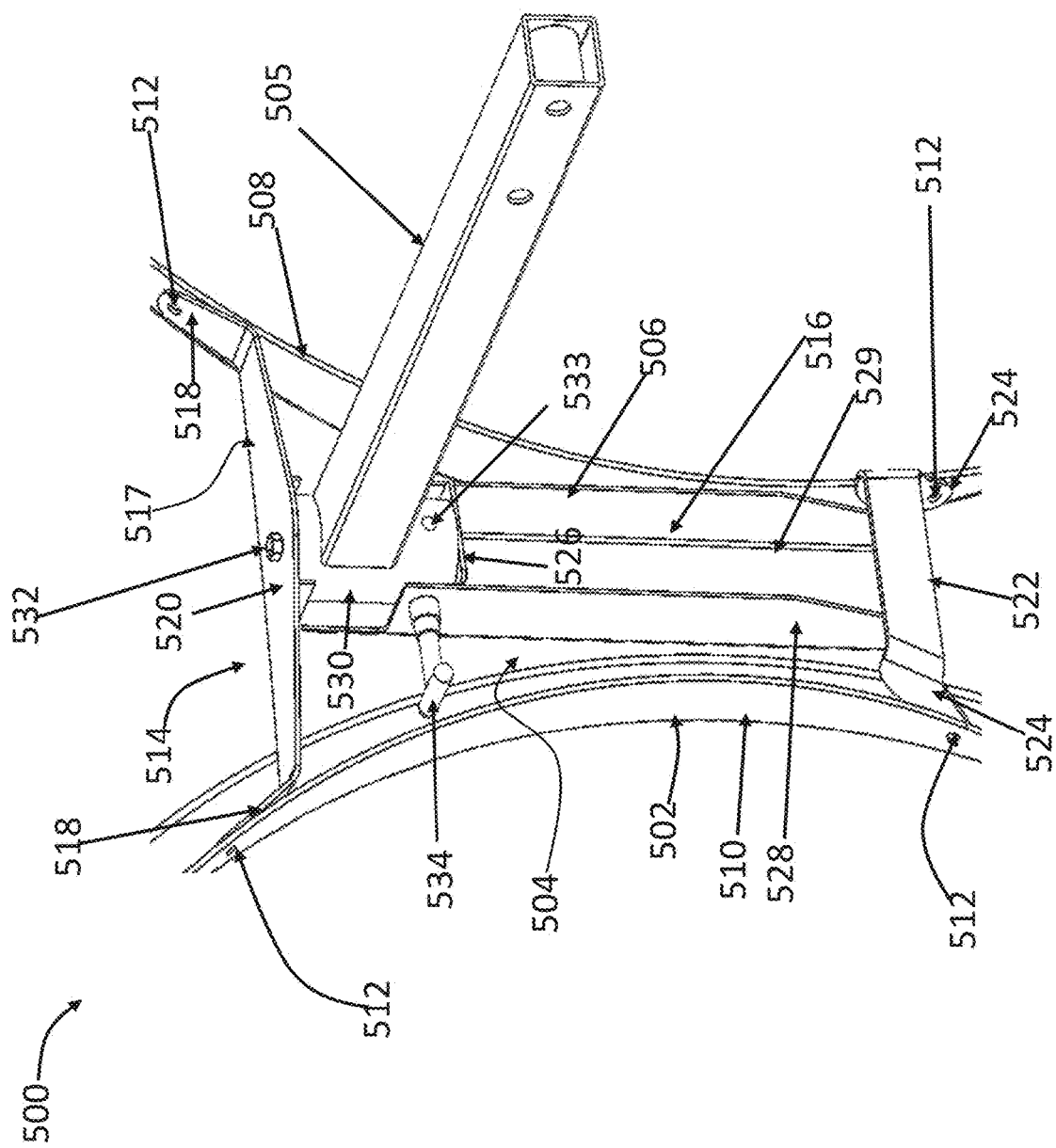
FIG. 5B is a diagrammatic representation of an inboard view of the embodiment of FIG. 5A.

FIG. 5A is an inboard oblique view of one embodiment of a fairing assembly 500 comprising a fairing 502 mounted to a fairing adapter 504 that is coupled to a support arm 505. FIG. 5B is an inboard oblique view of one embodiment of fairing assembly 500. In FIGS. 5A 5B, fairing 502 is in a first orientation relative to arm 505 corresponding to an aerodynamic position. Fairing 502 may be rotated to a first access position or a second access position.

Arm 505 attaches to a vehicle at a proximate end and supports a fairing 502 at a distal end. Support arm 505 may couple to a vehicle frame rail by a bracket assembly (not shown) and to fairing 502 by adapter 504. In the embodiment illustrated, fairing assembly 500 is configured such that arm 505 will extend parallel to the ground. In other embodiments, fairing assembly 500 can be configured such that arm 505 extends out and downward.

According to one embodiment, fairing 502 includes an inboard surface 506. A front wall 508 and rear wall 510 extend inboard from inboard surface 506. Fairing 502 couples to adapter 504 at connection points 512 using connection members (bolts, rivets, screws or other connection member).

Adapter 504 includes an upper portion 514 and a lower portion 516. Upper portion 514 includes a cross member 517 that extends between end walls 518 that abut the facing surfaces of front wall 508 and rear wall 510 of fairing 502. End walls 518 provide openings that can act as upper connection points 512. A portion 520 cross member 517 extends over the distal portion of arm 505.

Lower portion 516 includes a cross member 522 that extends between end walls 524 that abut the facing surfaces of front wall 508 and rear wall 510. End walls 524 provide openings that can act as lower connection points 512. Vertical walls 528, 529 of lower portion 516 extend upward to upper cross member 517. A lower joint plate 526 extends between the vertical walls 528, 529 of lower bracket 516 and under the distal portion of arm 505.

A cylindrical distal portion 530 of arm 505 fits in the gap between the portion 520 of upper cross member 517 and lower joint plate 526. Coaxial openings are provided in portion 520, plate 526 and the distal portion 530 of arm 505. A joint pin 532 passes through the openings to hold the adapter 504 and arm 505 together. The joint pin 532 is held in its position with the help of a collar (e.g., positioned under portion 526). According to one embodiment, the joint pin 532 is a bolt and the collar is a nut. Upper portion 514, lower portion 516, the distal portion 530 of arm 505 and pin 532 form a revolute joint such that adapter 504 can rotate about an origin formed by joint pin 532. The adapter 504 or distal portion 530 of arm 505 may include an internal bushing, or other features to reduce friction during rotation or extend the life of the joint.

Fairing assembly 500 further comprises a releasable locking mechanism to selectively lock the joint so that the adapter 504, and hence fairing 502, is in a desired orientation relative to arm 505. In particular, the locking mechanism can lock the joint so that the fairing is in an aerodynamic position. According to one embodiment, the joint is releasable via a manual control, such that the operator can place the fairing 502 at any desired orientation within a range by rotating it there. In some embodiments, the locking mechanism can be manually or automatically reengaged at other orientations to lock fairing in the desired orientation. For example, the locking mechanism may be engaged, in some embodiments, to lock fairing adapter in an orientation corresponding to a first access position of or a second access position.

In the illustrated embodiment, the radially outer surface of distal portion 530 includes a plurality of spaced locking pin openings 533 to receive a locking pin 534. Further, vertical wall 528 that extends upward past joint plate 526 has a pin opening positioned such that it can align with each of the spaced openings 533 as adapter 504 rotates about pin 532. When the locking pin 534 is aligned with a support arm locking pin opening 533, locking pin 534 can advance into the locking pin opening 533. The locking pin 534 can be retracted to release the joint. According to one embodiment, locking pin 534 is a pop pin that comprises an internal spring that asserts a force to advance the pin 534 and thus to cause the joint to automatically lock when the pin opening in wall 528 aligns with an opening 533, assuming a force is not being asserted to retract pin 534.

According to one embodiment, openings 533 are provided such that fairing adapter 504 can be locked with fairing 502 in the aerodynamic position of FIGS. 5A and 5B, a second orientation corresponding to a first access position and a third orientation corresponding to a second access position. Additional openings 533 may also be provided such that fairing adapter 504 can be locked in a range of orientations relative to arm 505. In other embodiments, the fairing is only lockable in the aerodynamic position, but not other positions. Further, in other embodiments, the fairing may only be rotatable from the aerodynamic position to one of in front of or behind the support arm.

Figure 6A:
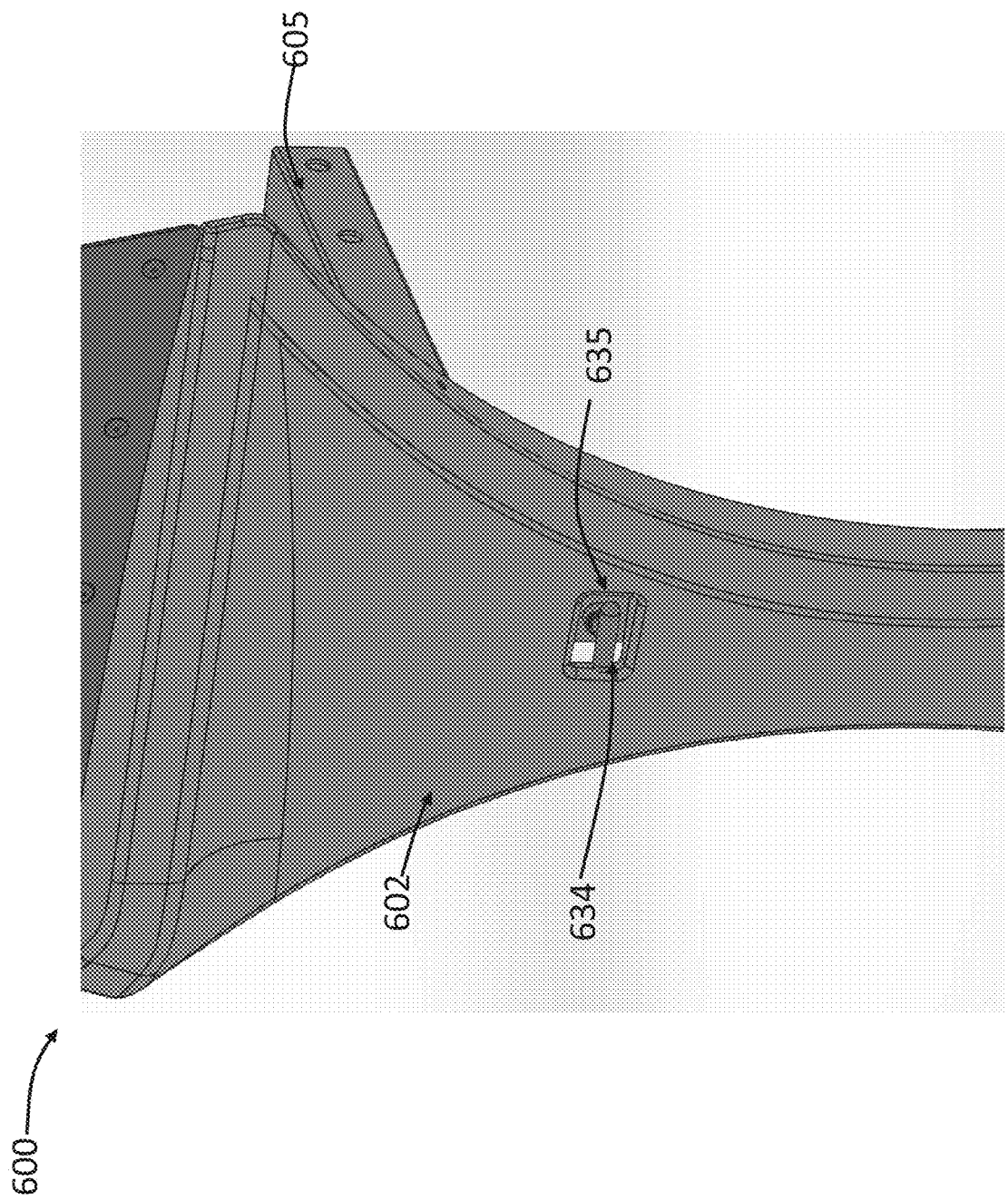
FIG. 6A is a diagrammatic representation of an outboard view of another embodiment of a fairing assembly.
Figure 6B:
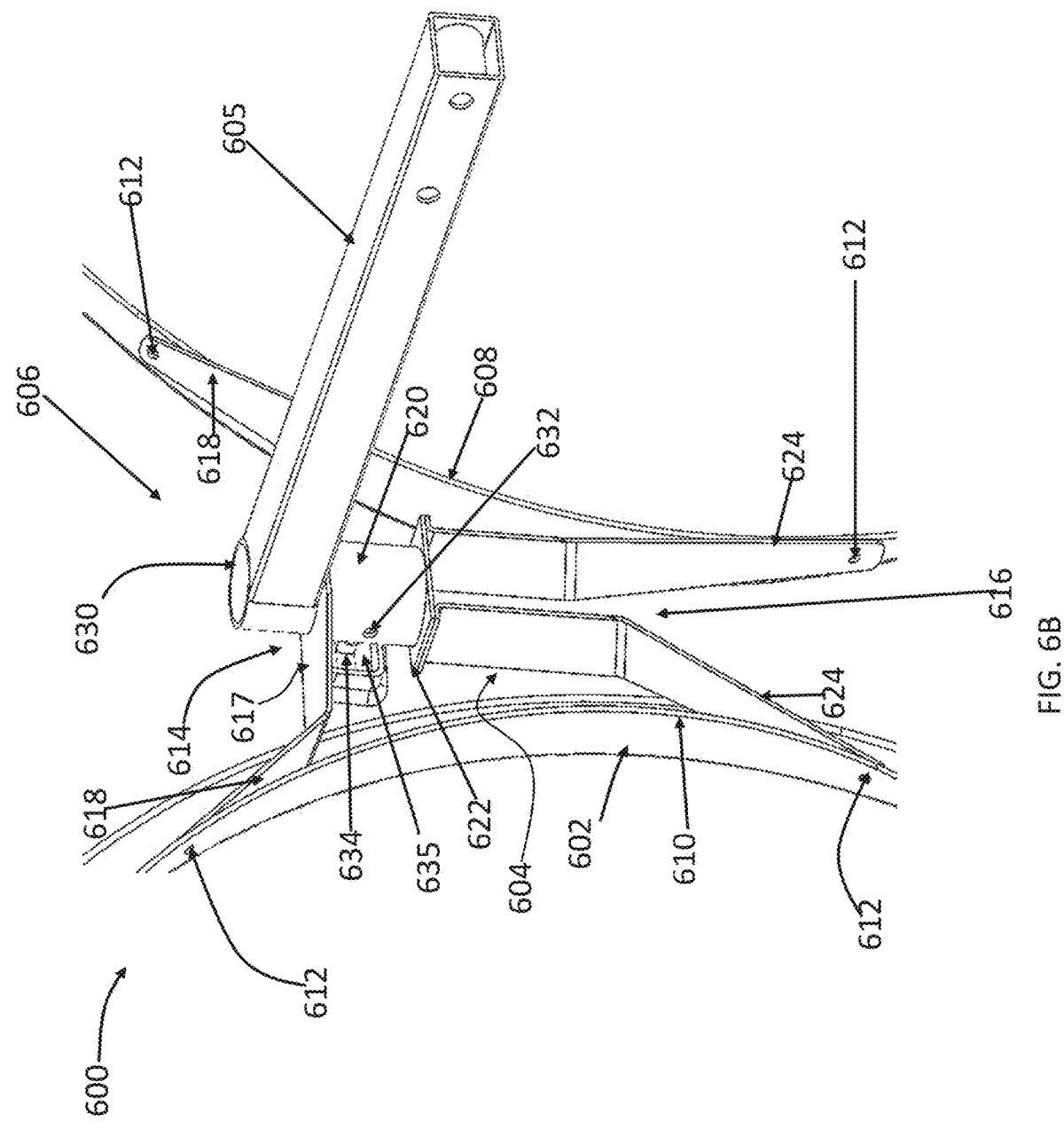
FIG. 6B is a diagrammatic representation of an inboard view of the embodiment of FIG. 6A.
Figure 6C:
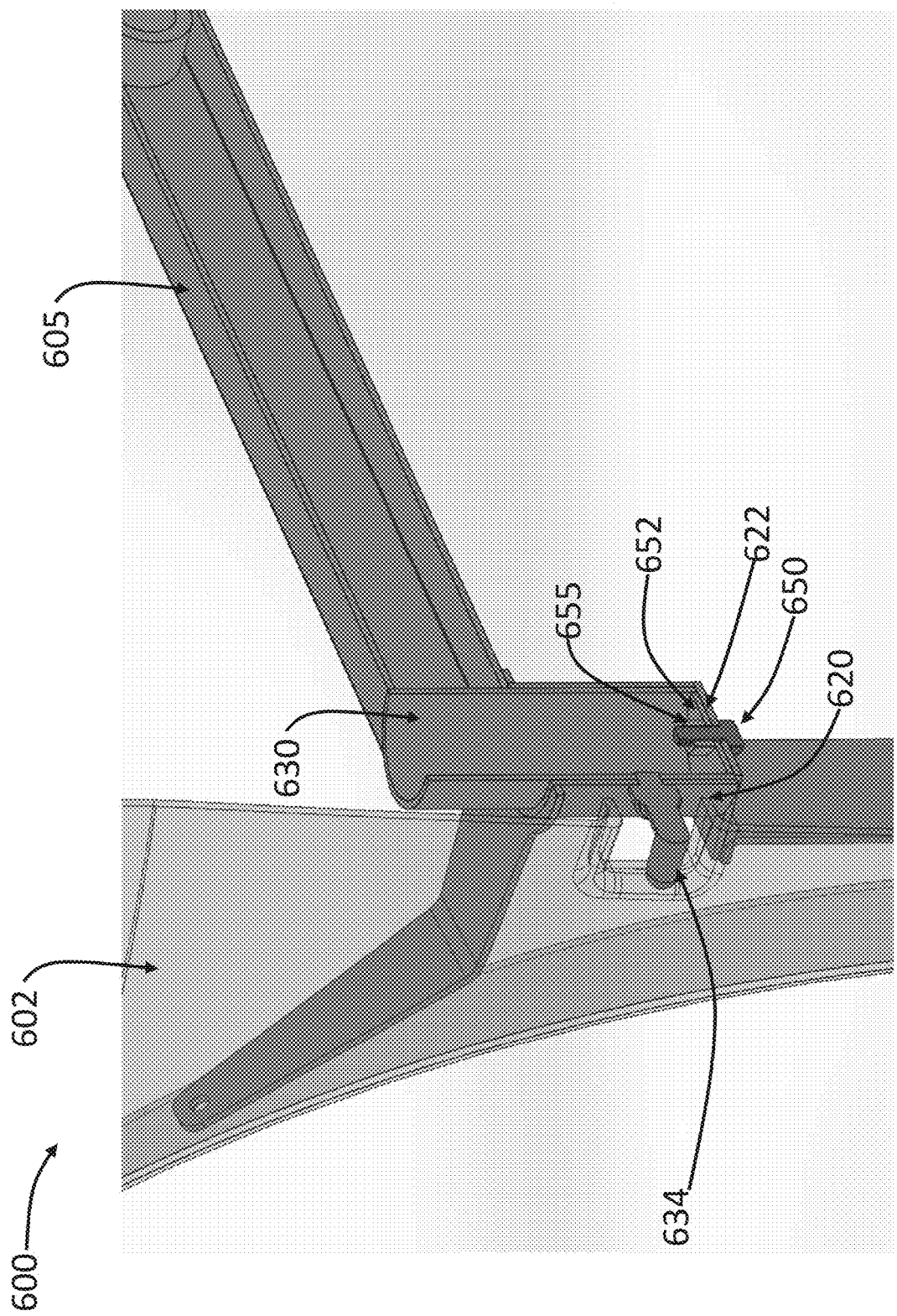
FIG. 6C is a diagrammatic representation of a cutaway view of the embodiment of FIG. 6A.

FIG. 6A is an outboard view of another embodiment of a fairing assembly 600. FIG. 6B is an inboard oblique view of one embodiment of fairing assembly 600. FIG. 6C is a partial cutaway, oblique view of one embodiment of fairing assembly 600. Fairing assembly 600 comprises a fairing 602 mounted to a fairing adapter 604 that is coupled to a support arm 605. In FIG. 6A, FIG. 6B and FIG. 6C, fairing 602 is in a first orientation relative to arm 605 corresponding to an aerodynamic position. Fairing 602 may be rotated to a first access position or a second access position.

Arm 605 attaches to a vehicle at a proximate end and supports a fairing 602 at a distal end. Support arm 605 may couple to a vehicle frame rail by a bracket assembly (not shown) and to fairing 602 by adapter 604. In the embodiment illustrated, fairing assembly 600 is configured such that arm 605 will extend parallel to the ground. In other embodiments, fairing assembly 600 can be configured such that arm 605 extends out and downward.

According to one embodiment, fairing 602 includes an inboard surface 606. A front wall 608 and rear wall 610 extend inboard from inboard surface 606. Fairing 602 couples to adapter 604 at connection points 612 using connection members (bolts, rivets, screws or other connection member).

Adapter 604 includes an upper portion 614 and a lower portion 616. Upper portion 614 includes a cross member 617 that extends between end walls 618 that abut the facing surfaces of front wall 608 and rear wall 610 of fairing 602.

End walls 618 provide openings that can act as upper connection points 612. Cross member 617 extends under the distal portion of arm 605.

Lower portion 616 includes a lower joint plate 622. Extensions 624 extend down from plate 622 and spread apart to abut the facing surfaces of front wall 608 and rear wall 610. Extensions 624 provide openings that can act as lower connection points 612. A cylindrical portion 620 extends from plate 622 to cross member 617.

As illustrated in FIG. 6C, distal portion 630 of arm 605 includes a portion that extends down through cross member 617 into the cylindrical portion 620 such that cylindrical portion 620 acts as a sleeve. A joint pin 650 extends through lower joint plate 622 and a lower wall 652 of distal portion 630. Joint pin 650 is held in its position with the help of a collar 655. Joint pin 650 forms an axis of rotation for a joint. According to one embodiment, the joint pin 650 is a bolt and the collar 655 is a nut. The distal portion 630 of arm 605, adapter 604 and joint pin 650 form a revolute joint such that adapter 604 can rotate about an origin formed by joint pin 650. Adapter 604 or distal portion 630 of arm 605 may include an internal bushing, or other features to reduce friction during rotation or extend the life of the joint.

Fairing assembly 600 further comprises a releasable locking mechanism to selectively lock the joint so that the adapter 604, and hence fairing 602, is in a desired orientation relative to arm 605. In particular, the locking mechanism can lock the joint so that the fairing is in an aerodynamic position. According to one embodiment, the joint is releasable via a manual control, such that the operator can place the fairing 602 at any desired orientation within a range by rotating it there. In some embodiments, the locking mechanism can be manually or automatically reengaged at other orientations to lock fairing in the desired orientation. For example, the locking mechanism may be engaged, in some embodiments, to lock fairing 602 in a first access position of or a second access position.

In the illustrated embodiment, fairing 602 includes an access opening 635 through which a locking pin 634 can be accessed. According to one embodiment, locking pin 634 is a pop pin that comprises an internal spring that asserts a force to advance the pin 634 and thus to cause the joint to automatically lock. Locking pin 634 can be captured in one of a plurality of spaced locking pin openings 632 to lock the adapter 604 in a desired orientation. Thus, in the embodiment illustrated, the operator can access and release pin 634 from the outboard side of fairing 602. In some cases it may be desirable to provide a cover for the access opening 635 to conceal the handle or to maintain a more aerodynamic profile of the fairing.

Figure 7:
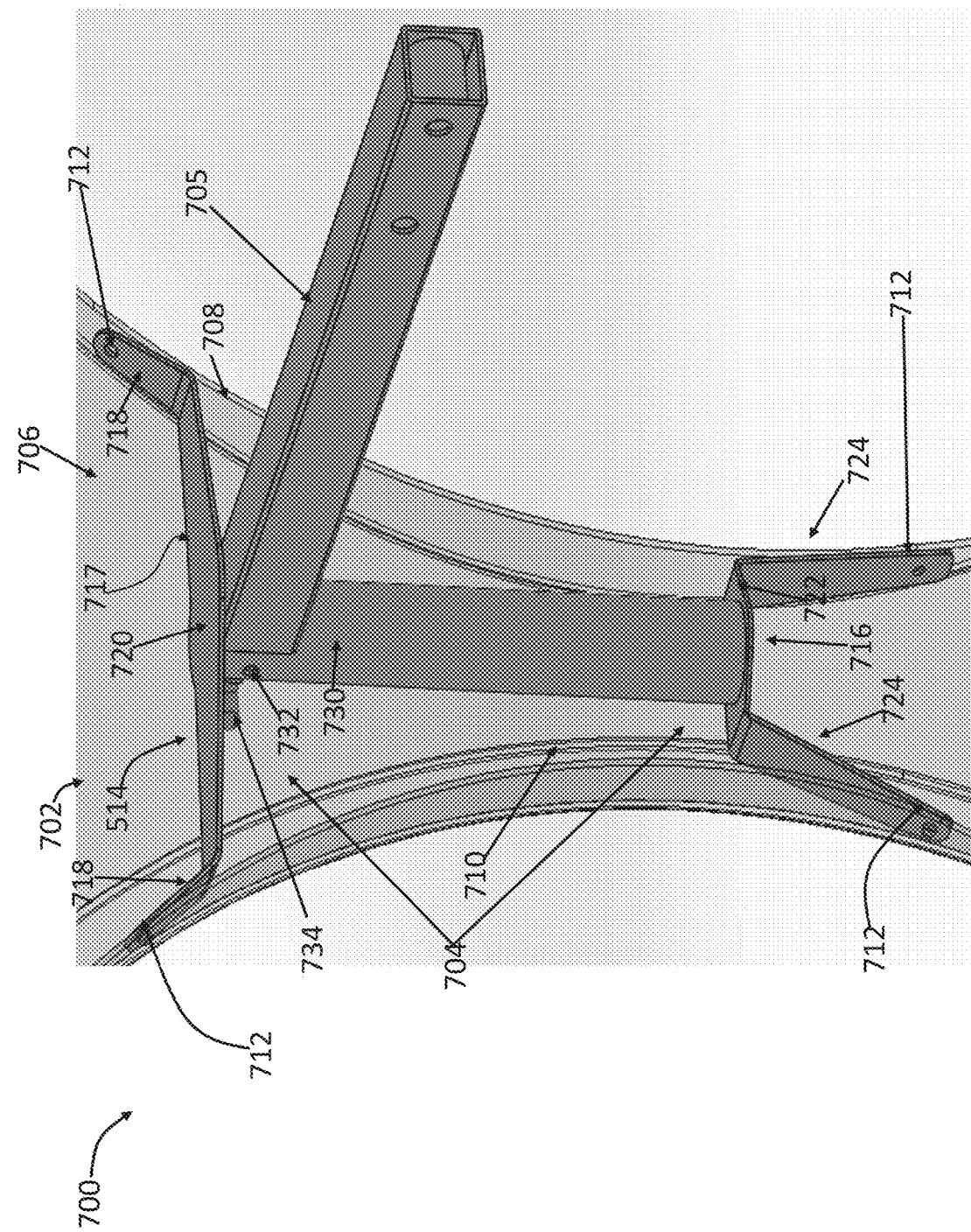
FIG. 7 is a diagrammatic representation of another embodiment of a fairing assembly.

FIG. 7 is an inboard oblique view of one embodiment of a fairing assembly 700 comprising a fairing 702 mounted to a fairing adapter 704 that is coupled to a support arm 705. In FIG. 7, fairing 702 is in a first orientation relative to arm 705 corresponding to an aerodynamic position. Fairing 702 may be rotated to a first access position or a second access position.

Arm 705 attaches to a vehicle at a proximate end and supports a fairing 702 at a distal end. Support arm 705 may couple to a vehicle frame rail by a bracket assembly (not shown) and to fairing 702 by adapter 704. In the embodiment illustrated, fairing assembly 700 is configured such that arm 705 will extend parallel to the ground. In other embodiments, fairing assembly 700 can be configured such that arm 705 extends out and downward.

According to one embodiment, fairing 702 includes an inboard surface 706. A front wall 708 and rear wall 710 extend inboard from inboard surface 706. Fairing 702 couples to adapter 704 at connection points 712 using connection members (bolts, rivets, screws or other connection member).

Adapter 704 includes an upper portion 714 and a lower portion 716. Upper portion 714 includes a cross member 717 that extends between end walls 718 that abut the facing surfaces of front wall 708 and rear wall 710 of fairing 702. End walls 718 provide openings that can act as upper connection points 712. Cross member 717 includes a portion 720 that extends over the distal portion of arm 705.

Lower portion 716 includes a cross member 722 that extends below the distal portion of arm 705. Extensions 724 extend down from cross member 722 and spread apart to abut the facing surfaces of front wall 708 and rear wall 710. Extensions 724 provide openings that can act as lower connection points 712.

A cylindrical distal portion 730 of arm 705 fits in the gap between portion 720 of upper cross member 717 and lower cross member 722. A downward extending portion may extend from the portion 720 into cylindrical distal portion 730 to help maintain portion 730 in place. Similar to as illustrated in FIG. 6C, a joint pin extends through lower joint plate 722 and a lower wall of distal portion 730. The joint pin is held in its position with the help of a collar. According to one embodiment, the joint pin is a bolt and the collar is a nut. The distal portion 730 of arm 705, adapter 704 and the joint pin form a revolute joint such that adapter 704 can rotate about an origin formed by the joint pin. Adapter 704 or distal portion 730 of arm 705 may include an internal bushing, or other features to reduce friction during rotation or extend the life of the joint.

Fairing assembly 700 further comprises a releasable locking mechanism to selectively lock the joint so that the adapter 704, and hence fairing 702, is in a desired orientation relative to arm 705. In particular, the locking mechanism can lock the joint so that the fairing is in an aerodynamic position. According to one embodiment, the joint is releasable via a manual control, such that the operator can place the fairing 702 at any desired orientation within a range by rotating it there. In some embodiments, the locking mechanism can be manually or automatically reengaged at other orientations to lock fairing in the desired orientation. For example, the locking mechanism may be engaged, in some embodiments, to lock fairing 702 in a first access position of or a second access position.

In the illustrated embodiment, fairing 702 includes an access opening through which a locking pin 734 can be accessed. According to one embodiment, locking pin 734 is a pop pin that comprises an internal spring that asserts a force to advance the pin 734 and thus to cause the joint to automatically lock. Thus, in the embodiment illustrated, the operator can access and release pin 734 from the outboard side of fairing 702.

In the illustrated embodiment, the radially outer surface of distal portion 730 includes a plurality of spaced locking pin openings 732 to receive locking pin 734.

According to one embodiment, openings 732 are provided such that fairing adapter 704 can be locked in an orientation with fairing 702 in the aerodynamic position of FIG. 7, a second orientation with fairing 702 in a first access position and a third orientation with fairing 702 in the second access position. Additional locking pin openings 732 may also be provided such that fairing 702 can be locked in a range of positions relative to arm 705. In other embodiments, the fairing is only lockable in the aerodynamic position, but not other positions. Further, in other embodiments, the fairing may only be rotatable from the aerodynamic position to one of in front of or behind the support arm.

Figure 8A:
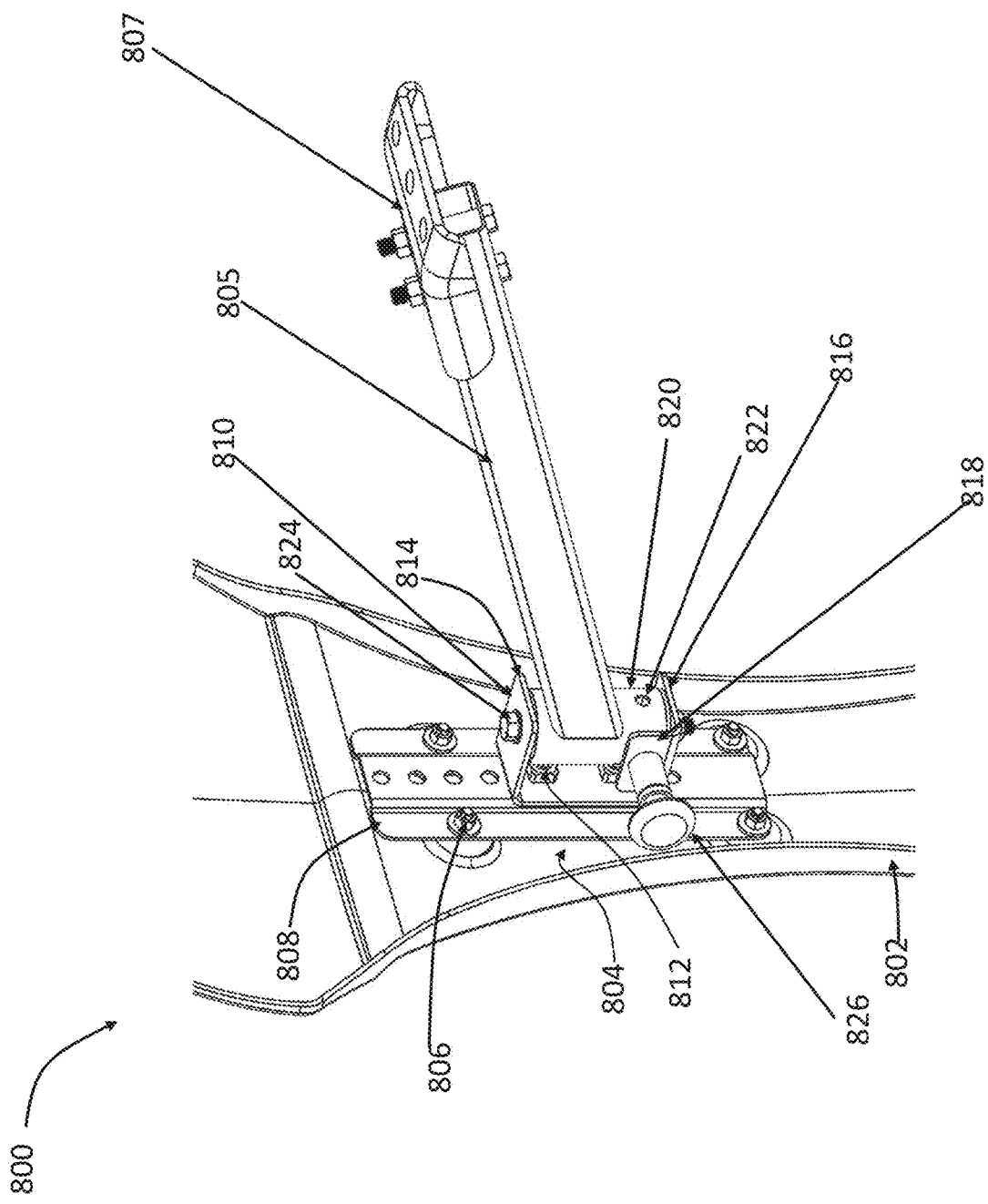
FIG. 8A is a diagrammatic representation of another embodiment of a fairing assembly.
Figure 8B:
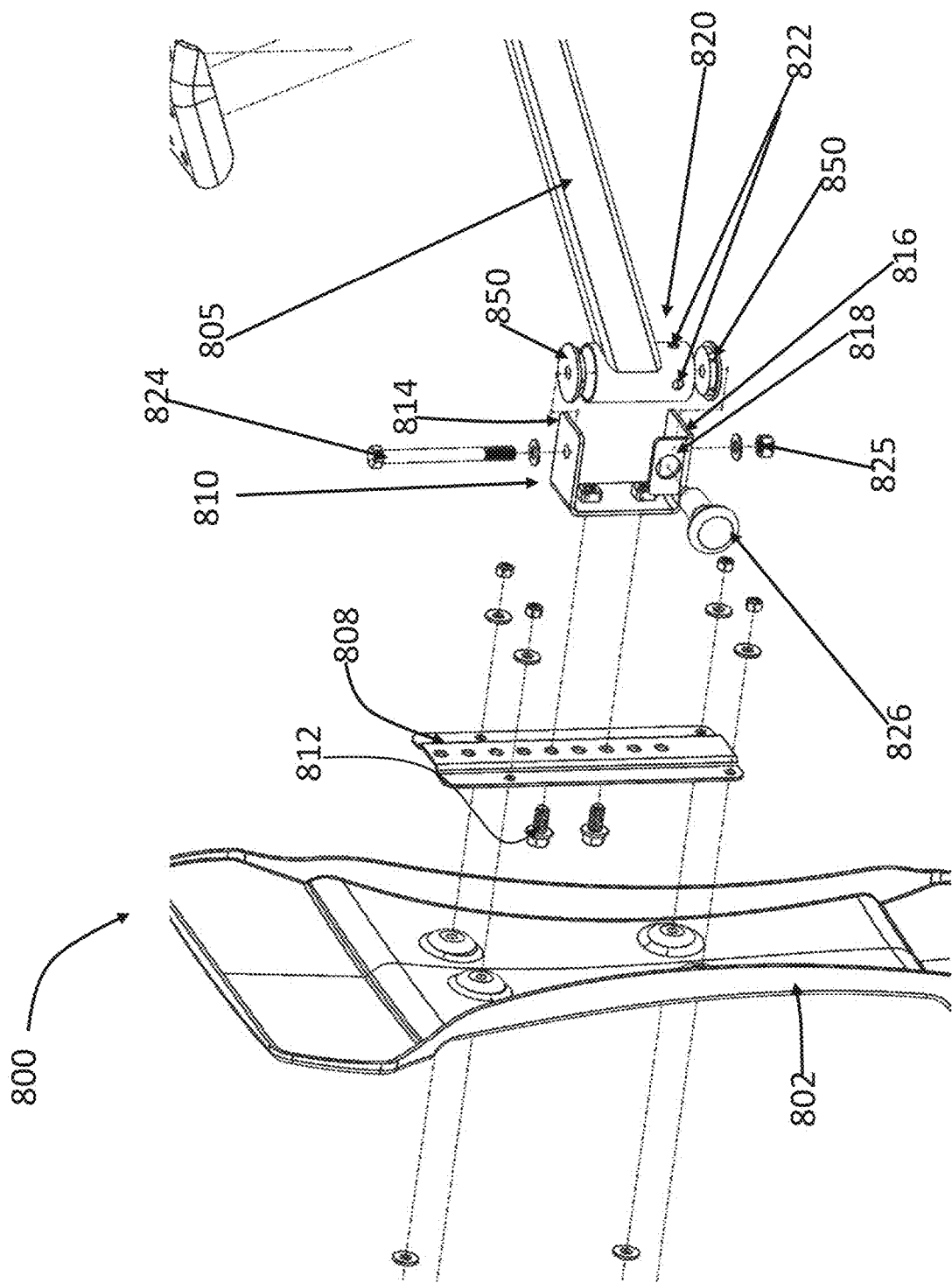
FIG. 8B is an exploded view of the embodiment of FIG. 8A.

FIG. 8A is an inboard oblique view of one embodiment of a fairing assembly 800. FIG. 8B is an exploded view of fairing assembly 800. Fairing assembly 800 comprises a fairing 802 mounted to a fairing adapter 804 that is coupled to a support arm 805. In FIG. 8A, fairing adapter 804 is in a first orientation relative to arm 805 corresponding to an aerodynamic position of fairing 802. Fairing 802 may be rotated to a first access position or a second access position.

Arm 805 attaches to a vehicle at a proximate end ("proximate" used to refer to being closer the vehicle or inboard end) and supports a fairing 802 at a distal end ("distal" used to refer to being further away from the vehicle or outboard end). Support arm 805 may couple to a vehicle frame rail by bracket assembly 807 and to fairing 802 by adapter 804. In the embodiment illustrated, bracket assembly 807 is similar to bracket assembly 207.

According to one embodiment, adapter 804 includes an end plate 808 and joint bracket 810. End plate 808 connects to the joint bracket 810 using one or more connection members 812 (bolts, rivets, screws or other connection member), welding or other coupling mechanism. In the illustrated embodiment, end plate 808 includes openings for connection members 812 such that the vertical position of end plate 808 can be adjusted related to joint bracket 810 during assembly, thus allowing the mounting height of the fairing 802 to be selected.

End plate 808 is angled relative to the long axis of arm 805 so that the outboard surface of end plate 808 is generally vertically aligned in a longitudinal plane or an angle to the longitudinal. End plate may have openings that can receive mounting hardware 806, such as bolts or other connection members, for mounting fairing 802 to adapter 804. The openings may be threaded or unthreaded. According to one embodiment, nuts may be welded or otherwise attached to the inboard side of end plate 808 to provide threads.

Joint bracket 810, according to one embodiment, is a c-bracket that forms a recess between an upper portion 814 (e.g., an upper horizontal plate) and a lower portion 816 (e.g., a lower horizontal plate). A cylindrical distal portion 820 of arm 805 fits in the gap between the upper portion 814 and lower portion 816. As illustrated in FIG. 8B, bushings 850 are disposed at the top and bottom of cylindrical portion 820. According to one embodiment, bushings 850 may be formed of plastic or another material selected to reduce friction during rotation or extend the life of the joint. Coaxial openings are provided in the joint bracket 810 (e.g., through the upper portion 814 and lower portion 816) and bushings 850. A joint pin 824 passes through the openings to hold the adapter 804 and arm 805 together. The joint pin 824 is held in its position with the help of a collar 825. According to one embodiment, the joint pin 824 is a bolt and the collar 825 is a nut. The distal portion 820 of arm 805, adapter 804 and joint pin 824 form a revolute joint such that adapter 804 can rotate about an origin formed by joint pin 824.

Fairing assembly 800 further comprises a releasable locking mechanism to selectively lock the joint so that the adapter 804, and hence fairing 802, is in a desired orientation relative to arm 805. In particular, the locking mechanism can lock the joint so that the fairing 802 is in an aerodynamic position. According to one embodiment, the joint is releasable via a manual control, such that the operator can place the fairing 802 at any desired orientation within a range by rotating it there. In some embodiments, the locking mechanism can be manually or automatically reengaged at other orientations to lock fairing in the desired orientation. For example, the locking mechanism may be engaged, in some embodiments, to lock fairing 802 in the first access position or second access position.

In the illustrated embodiment, the radially outer surface of distal portion 820 includes a plurality of spaced support arm locking pin openings 822 to receive a locking pin 826. Further, joint bracket 280 includes a wall 818 that extends upward from lower portion 816, the wall 818 having a pin opening through which locking pin 826 can pass. Locking pin 826 is positioned to align with spaced locking pin openings 822 as adapter 804 rotates about pin 824. When the locking pin opening through wall 818 aligns with a support arm locking pin opening 822, pin 826 can advance into the support arm locking pin opening 822 with which it is aligned to lock the joint. The locking pin 826 can be retracted to release the joint. According to one embodiment, locking pin 826 is a pop pin that comprises an internal spring that asserts a force to advance the pin 826 and thus cause the joint to automatically lock when the pin aligns with a support arm locking pin opening 822, assuming a force is not being asserted to retract pin 826.

According to one embodiment, support arm locking pin openings 822 are provided such that adapter 804 can be locked in a first orientation with fairing 802 in the aerodynamic position of FIG. 8A, a second orientation with fairing 802 in the first access position and a third orientation with fairing 802 in the second access position. Additional locking pin openings 822 may also be provided such that fairing 802 can be locked in a range of positions relative to arm 805. In other embodiments, the fairing adapter is only lockable in an orientation corresponding to the aerodynamic position, but not other positions. Further, in other embodiments, the fairing adapter may only be rotatable from the orientation corresponding to the aerodynamic position to one of in front of or behind the support arm. For example, in one embodiment, the joint may only allow rotation from FIG. 8A to one of a first access position or a second access position.

Figure 9:
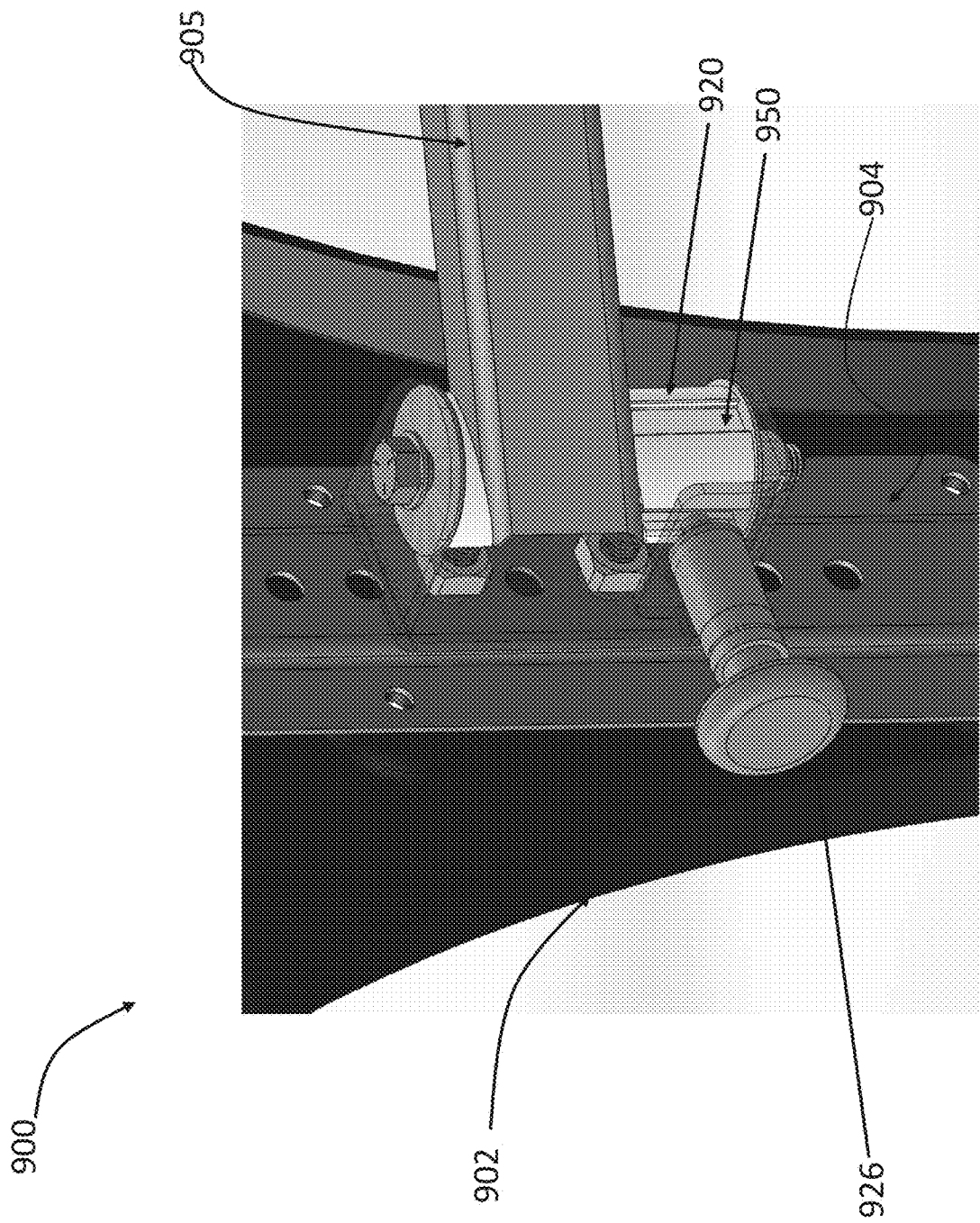
FIG. 9 is a diagrammatic representation of another embodiment of a fairing assembly.

FIG. 9 illustrates another embodiment of a fairing assembly 900 comprising a fairing 902, fairing adapter 904 and fairing arm 905. In FIG. 9, fairing adapter 904 is in a first orientation relative to arm 905 corresponding to an aerodynamic position of fairing 902. Fairing 902 may be rotated to a first access position or a second access position.

Arm 905 attaches to a vehicle at a proximate end ("proximate" used to refer to being closer the vehicle or inboard end) and supports a fairing 902 at a distal end ("distal" used to refer to being further away from the vehicle or outboard end). Support arm 905 may couple to a vehicle frame rail by a bracket assembly and to fairing 902 by adapter 904. The embodiment of FIG. 9 is similar to that of FIGS. 8A and 8B except, for example, that the distal portion 920 of arm 905 includes spaced slots 950 to capture the end of pin 926. The distal portion 920 may also be comprised of one or more sections that attach to arm 905. Other embodiments discussed above may also incorporate slots or other features as part of the locking mechanism.

Figure 10A:
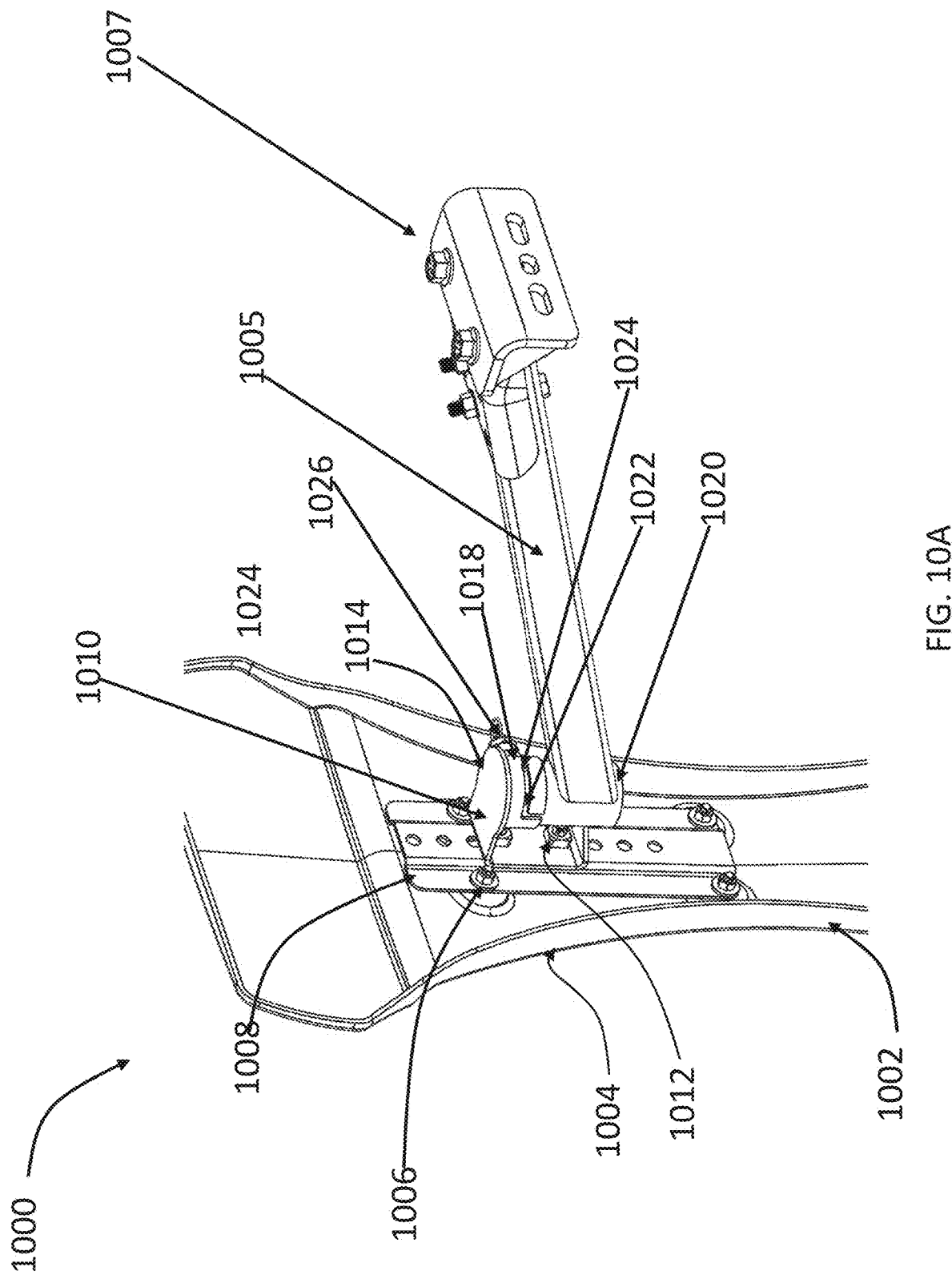
FIG. 10A is a diagrammatic representation of another embodiment of a fairing assembly.
Figure 10B:
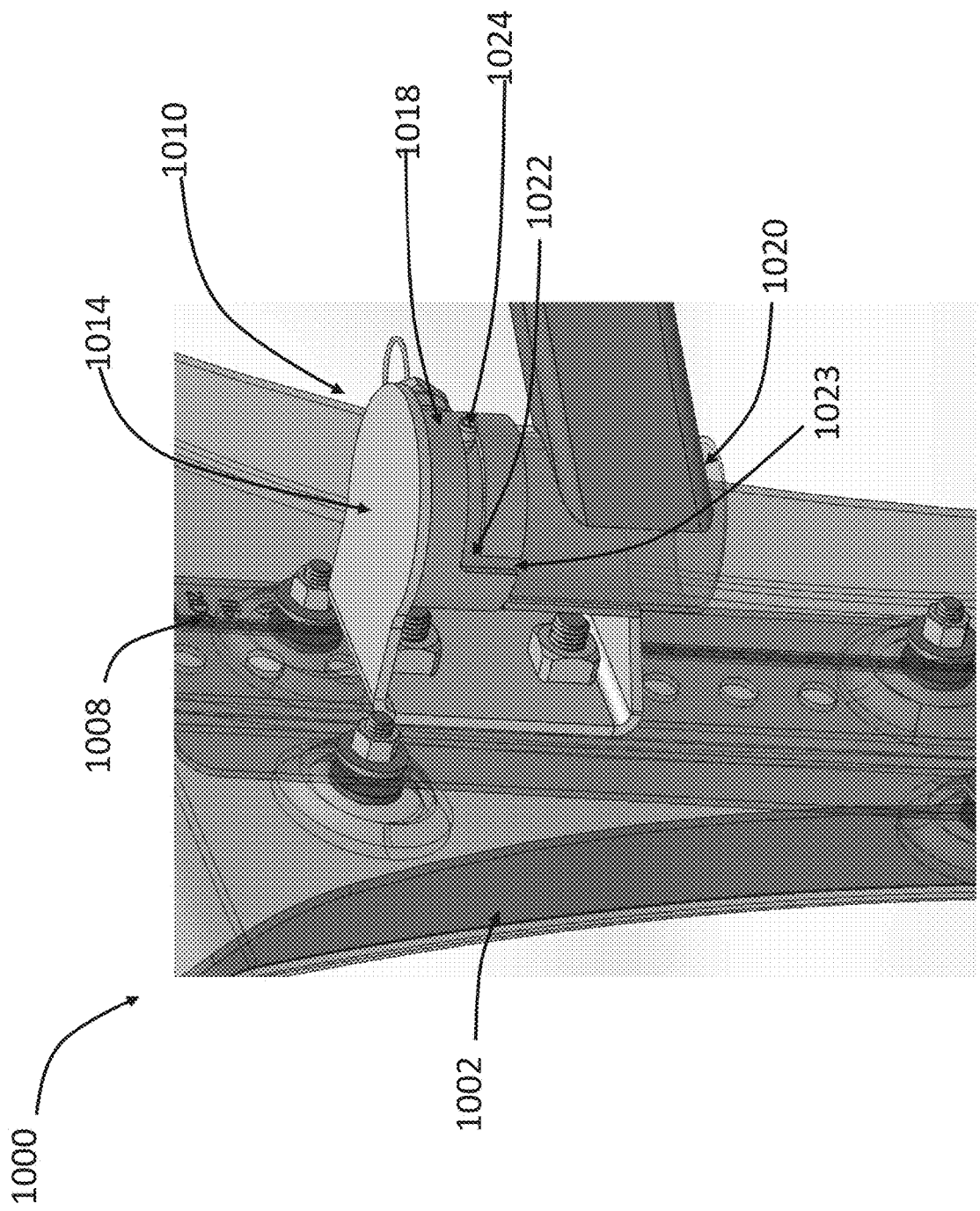
FIG. 10B is a diagrammatic representation of a portion of the fairing assembly of FIG. 10A.
Figure 10C:
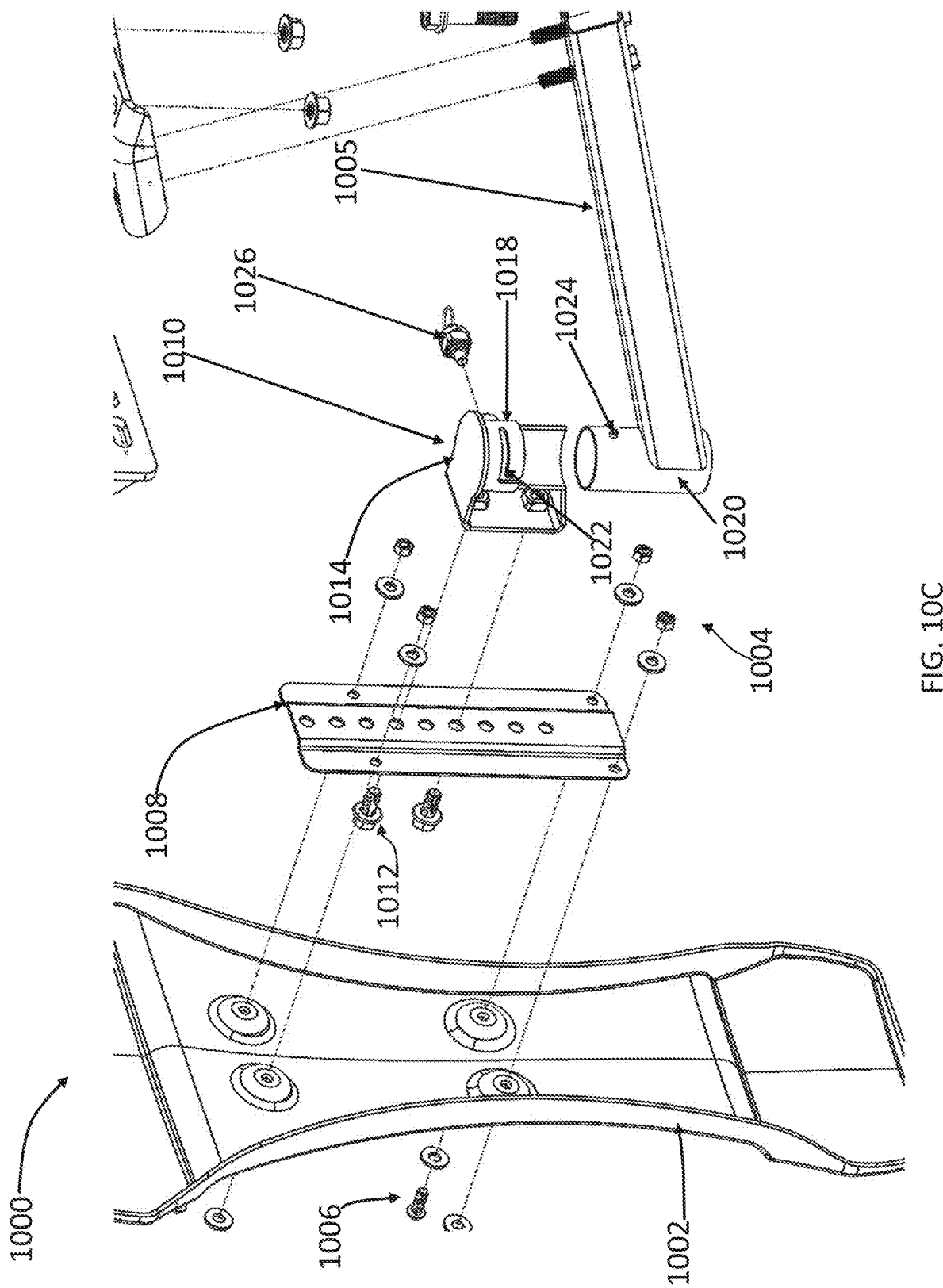
FIG. 10C is a diagrammatic representation of an exploded view of the embodiment of FIG. 10A.
Figure 10D:
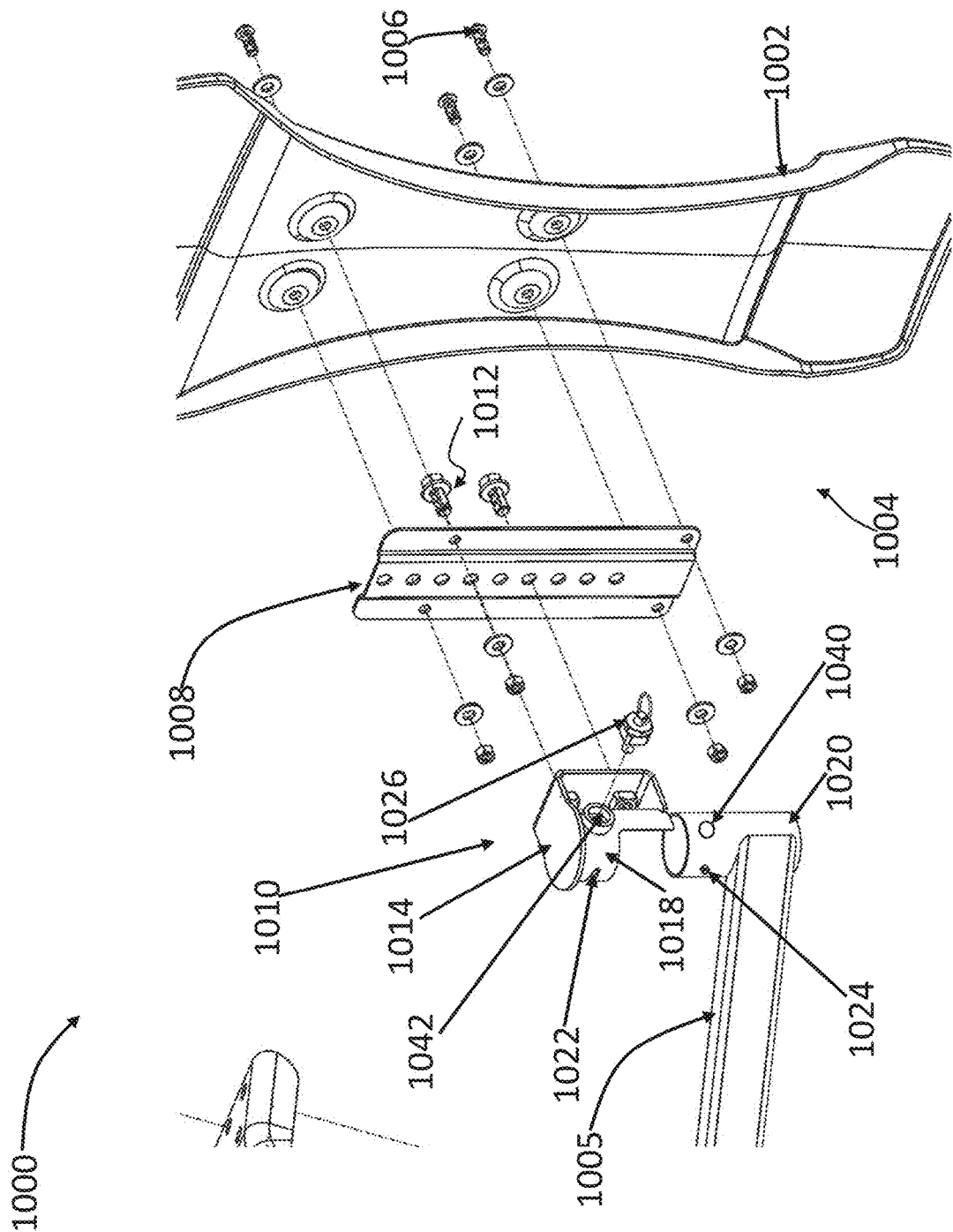
FIG. 10D is a diagrammatic representation of a second exploded view of the embodiment of FIG. 10A.

Various embodiments allow the fairing adapter, and hence the fairing, to be dismounted from the support arm without tools (toolless dismounting). FIG. 10A is an inboard oblique view of one embodiment of a fairing assembly 1000. FIG. 10B illustrates one embodiment of a joint between a support arm and fairing adapter in more detail. FIG. 10C is a first exploded view of fairing assembly 1000. FIG. 10D is a second exploded view of fairing assembly 1000.

Fairing assembly 1000 comprises a fairing 1002 mounted to a fairing adapter 1004 that is coupled to a support arm 1005. In FIG. 10A, fairing adapter 1004 is in a first orientation relative to arm 1005 corresponding to an aerodynamic position of fairing 1002. Fairing 1002 may be rotated and dismounted from support arm 1005.

Arm 1005 attaches to a vehicle at a proximate end and supports a fairing 1002 at a distal end. Support arm 1005 may couple to a vehicle frame rail by bracket assembly 1007 and to fairing 1002 by adapter 1004. In the embodiment illustrated, bracket assembly 1007 is similar to bracket assembly 207.

According to one embodiment, adapter 1004 includes an end plate 1008 and joint bracket 1010. End plate 1008 connects to the joint bracket 1010 using one or more connection members 1012 (bolts, rivets, screws or other connection member), welding or other coupling mechanism. In the illustrated embodiment, end plate 1008 includes openings for connection members 1012 such that the vertical position of end plate 1008 can be adjusted related to joint bracket 1010 during assembly, thus allowing the mounting height of the fairing 1002 to be selected.

End plate 1008 is angled relative to the long axis of arm 1005 so that the outboard surface of end plate 1008 is generally vertically aligned in a longitudinal plane or an angle to the longitudinal. End plate 1008 may have openings that can receive mounting hardware 1006, such as bolts or other connection members, for mounting fairing 1002 to adapter 1004. The openings may be threaded or unthreaded. According to one embodiment, nuts may be welded or otherwise attached to the inboard side of end plate 1008 to provide threads.

Joint bracket 1010, according to one embodiment, includes an upper portion 1014 (e.g., an upper horizontal plate) and a rounded wall 1018 extending down from upper portion 1014. A cylindrical distal portion 1020 of arm 1005 fits in an arm receiving area formed by upper portion 1014 and wall 1018.

According to one embodiment, the outer surface of distal portion 1020 is adjacent to the inner surface of wall 1018. Bracket 1010 is formed to define a guide path therein. For example, wall 1018 defines a guide slot 1022. At least one end of guide slot 1022 is open at the top or bottom of wall 1018 to form a guide path exit. For example, in FIG. 10B, guide slot 1022 is open at end 1023. Distal portion 1020 includes a protrusion 1024 that projects radially outward and is adapted to be received by guide slot 1022 and act as a guide pin. Bracket 1010 is rotatable relative to distal portion 1020 along the guide path from the aerodynamic orientation to a first access orientation. At the first access orientation, bracket 1010 can be translated vertically such that protrusion 1024 exits the guide path. In this manner, the fairing 1002 can be rotated and dismounted from the arm 1005.

Fairing assembly 1000 further comprises a releasable locking mechanism to selectively lock the joint so that the adapter 1004, and hence fairing 1002, is in a desired orientation relative to arm 1005. In particular, the locking mechanism can lock the joint so that the fairing 1002 is in an aerodynamic position. According to one embodiment, the joint is releasable via a manual control, such that the operator can place the fairing 1002 at any desired orientation within a range by rotating it there. In some embodiments, the locking mechanism can be manually or automatically reengaged at other orientations to lock fairing in the desired orientation.

The radially outer surface of distal portion 1020 includes a support arm locking pin opening 1040 to receive a locking pin 1026. Wall 1018 has a pin opening 1042 through which locking pin 1026 can pass. Locking pin 1026 is positioned to align with pin opening 1040 when adapter 1004 is rotated to the position illustrated in FIG. 10B. When the locking pin opening 1042 aligns with the support arm locking pin opening 1040, pin 1026 can advance into the support arm locking pin opening 1040 with which it is aligned to lock the joint. The locking pin 1026 can be retracted to release the joint. According to one embodiment, locking pin 1026 is a pop pin that comprises an internal spring that asserts a force to advance the pin 1026 and thus cause the joint to automatically lock when the pin 1026 aligns with support arm locking pin opening 1040, assuming a force is not being asserted to retract pin 1026.

In the illustrated embodiment, an operator may pull the locking pin 1026 to unlock the rotatable joint between adapter 1004 and arm 1005. The operator may then rotate the fairing 1020 and adapter 1004 along the guide path so that protrusion is aligned with the path exit (e.g., end 1033). The operator may then lift the fairing 1002 and adapter 1004 to dismount the fairing from the support arm 1005.

FIG. 21 illustrates an embodiment similar to that of FIGS. 10A-10D except that the cylindrical portion of the bracket 2110 fits in the distal end portion 2120 of the support arm. Further, the guide slot 2122 is formed in the distal end portion 2120 of the support arm. In this case, the joint bracket 2110 includes a protrusion that follows the guide slot 2122.

Figure 11:
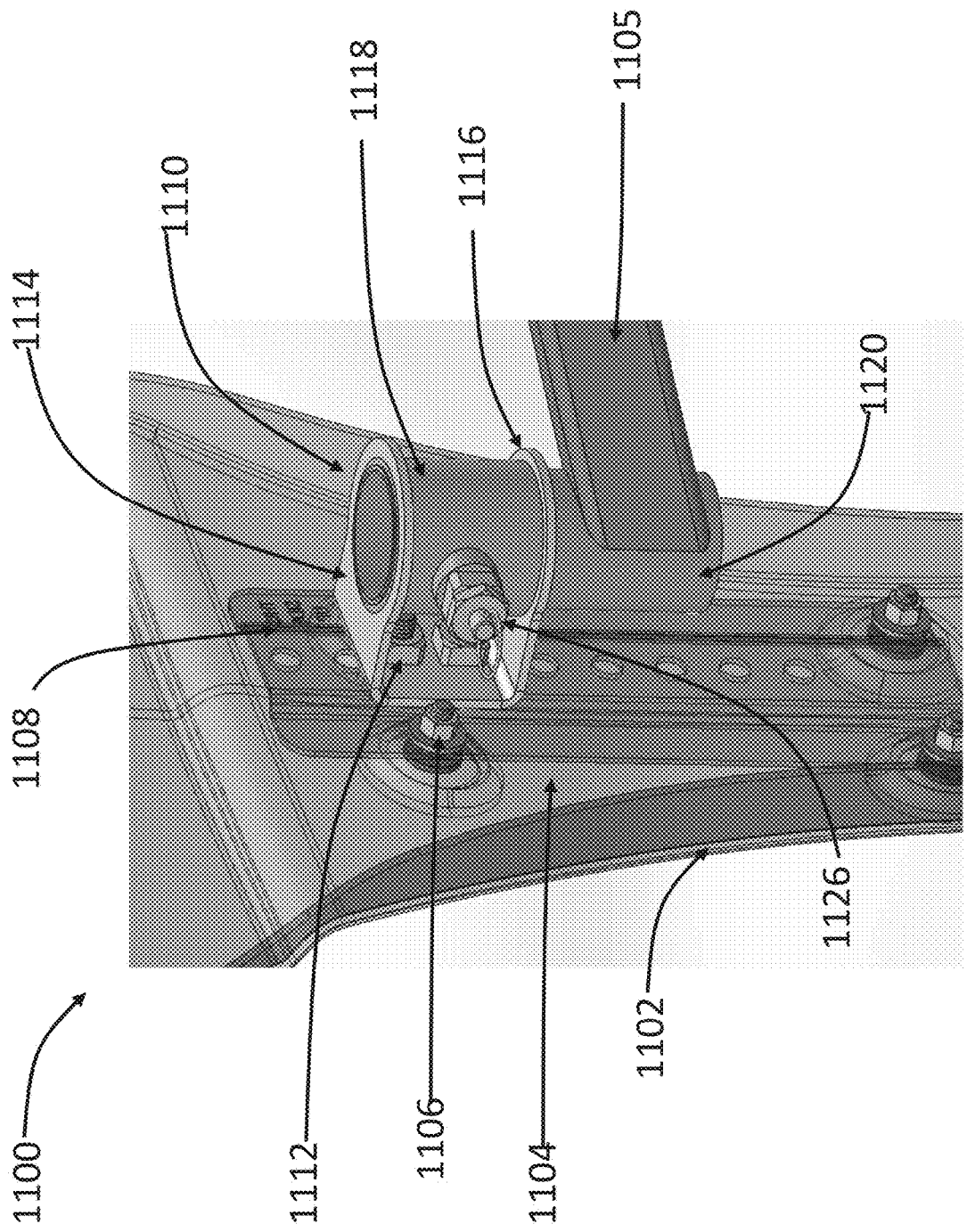
FIG. 11 is a diagrammatic representation of another embodiment of a fairing assembly.

FIG. 11 is an inboard oblique view of one embodiment of a fairing assembly 1100 that comprises a fairing 1102 mounted to a fairing adapter 1104 that is coupled to a support arm 1105. In FIG. 11, fairing adapter 1104 is in a first orientation relative to arm 1105 corresponding to an aerodynamic position of fairing 1102. Fairing 1102 may be rotated or dismounted from support arm 1105.

Arm 1105 attaches to a vehicle at a proximate end and supports a fairing 1102 at a distal end. Support arm 1105 may couple to a vehicle frame rail by a bracket assembly and to fairing 1102 by adapter 1104.

According to one embodiment, adapter 1104 includes an end plate 1108 and joint bracket 1110. End plate 1108 connects to the joint bracket 1110 using one or more connection members 1112 (bolts, rivets, screws or other connection member), welding or other coupling mechanism. In the illustrated embodiment, end plate 1108 includes openings for connection members 1112 such that the vertical position of end plate 1108 can be adjusted related to joint bracket 1110 during assembly, thus allowing the mounting height of the fairing 1102 to be selected.

End plate 1108 is angled relative to the long axis of arm 1105 so that the outboard surface of end plate 1108 is generally vertically aligned in a longitudinal plane or an angle to the longitudinal. End plate 1108 may have openings that can receive mounting hardware 1106, such as bolts or other connection members, for mounting fairing 1102 to adapter 1104. The openings may be threaded or non-threaded. According to one embodiment, nuts may be welded or otherwise attached to the inboard side of end plate 1108 to provide threads.

Joint bracket 1110, according to one embodiment, includes an upper portion 1114, a lower portion 1116 and a cylindrical wall portion 1118 extending between upper portion 1114 and lower portion 1016. A cylindrical distal portion 1120 of arm 1105 fits in an arm receiving area formed by upper portion 1114 and wall 1118.

Joint bracket 1110 defines an opening from lower portion 1116 to upper portion 1114 adapted to receive a cylindrical distal portion 1120 of arm 1105 (e.g., such that the outer surface of distal portion 1120 is adjacent to the inner surface of wall portion 1118. Bracket 1110 can be rotated about distal portion 1120 and can be lifted off of distal portion 1120 to dismount fairing 1102 from support arm 1105.

Fairing assembly 1100 further comprises a releasable locking mechanism to selectively lock the joint so that the adapter 1104, and hence fairing 1102, is in a desired orientation relative to arm 1105. In particular, the locking mechanism can lock the joint so that the fairing 1102 is in an aerodynamic position. According to one embodiment, the joint is releasable via a manual control, such that the operator can place the fairing 1102 at any desired orientation within a range by rotating it there. In some embodiments, the locking mechanism can be manually or automatically reengaged at other orientations to lock fairing in the desired orientation. For example, the locking mechanism may be engaged, in some embodiments, to lock fairing 1102 in the first access position or second access position.

According to one embodiment, the radially outer surface of distal portion 1120 includes one or more support arm locking pin openings to receive a locking pin. Further, wall 1118 has a pin opening through which locking pin 1126 can pass. Locking pin 1126 is positioned to align with pin opening(s) of distal end 1120. When the locking pin opening through wall 1118 aligns with a support arm locking pin opening, pin 1126 can advance into the support arm locking pin opening with which it is aligned to lock the joint. The locking pin 1126 can be retracted to release the joint. According to one embodiment, locking pin 1126 is a pop pin that comprises an internal spring that asserts a force to advance the pin 1126 and thus cause the joint to automatically lock when the pin aligns with a support arm locking pin opening, assuming a force is not being asserted to retract pin 1126.

According to one embodiment, support arm locking pin openings are provided such that adapter 1104 can be locked in a first orientation with fairing 1102 in the aerodynamic position of FIG. 11, a second orientation with fairing 1102 in the first access position and a third orientation with fairing 1102 in the second access position. Additional locking pin openings may also be provided such that fairing 1102 can be locked in a range of positions relative to arm 1105. In other embodiments, the fairing adapter is only lockable in an orientation corresponding to the aerodynamic position, but not other positions. Further, in other embodiments, the fairing adapter may only be rotatable from the orientation corresponding to the aerodynamic position to one of in front of or behind the support arm.

In the illustrated embodiment, an operator may pull the locking pin 1126 to unlock the rotatable joint between adapter 1104 and arm 1105. The operator may then rotate the fairing 1102 and adapter 1104 to a desired orientation. The operator may also lift the fairing 1102 and adapter 1104 to dismount the fairing 1102 from the support arm 1105.

FIG. 22 illustrates an embodiment similar to FIG. 11 in which a portion of joint bracket 2210 covers the top of the cylindrical distal portion 2220 of arm 2205.

In the foregoing embodiments, fairings were generally rotatable about a vertical axis of rotation. In addition or in the alternative, fairings may be rotatable about a horizontal axis of rotation.

Figure 12A:
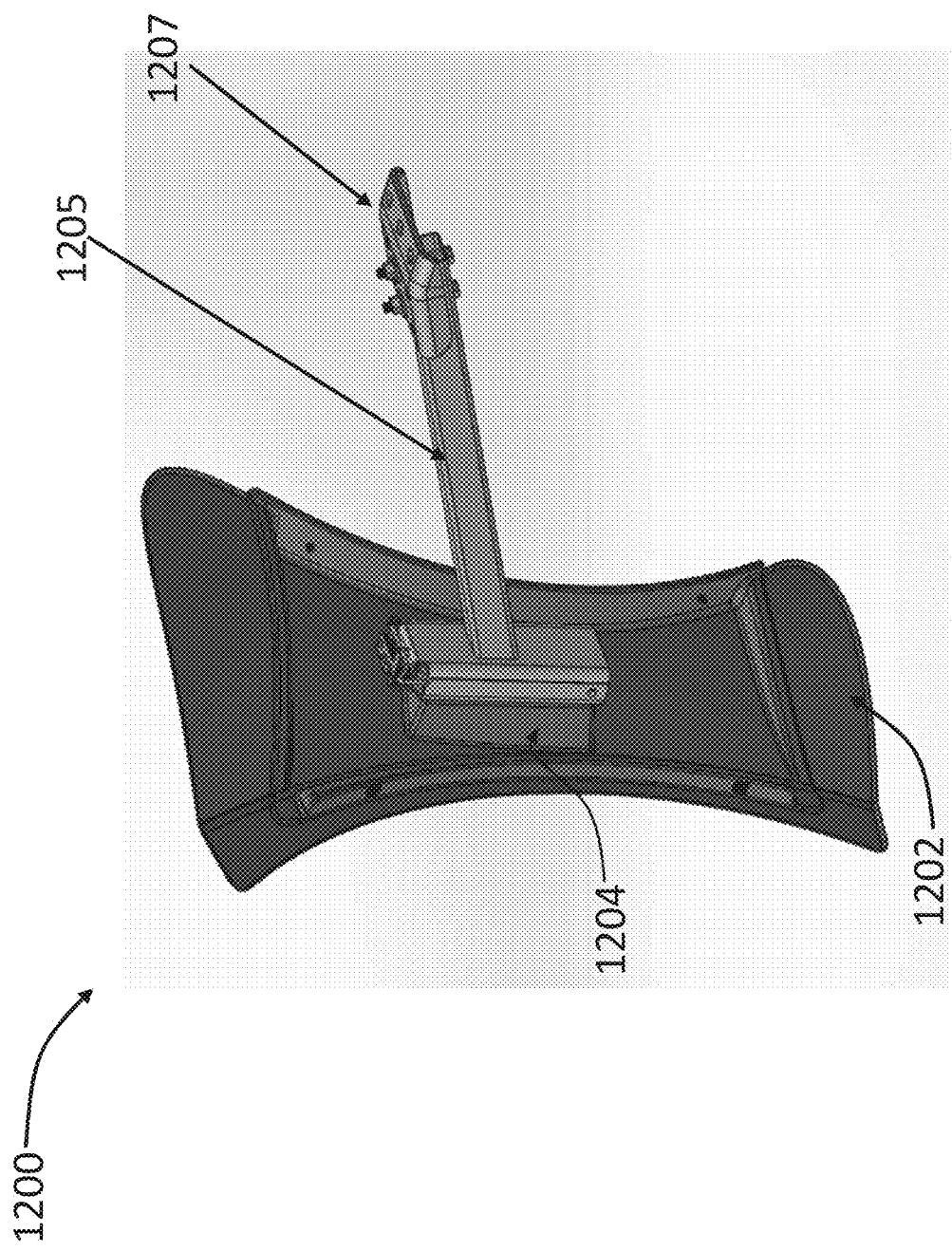
FIG. 12A is a diagrammatic representation of another embodiment of a fairing assembly.

FIG. 12A is an inboard oblique view of one embodiment of a fairing assembly 1200 that comprises a fairing 1202 mounted to a fairing adapter 1204 that is coupled to a support arm 1205. In FIG. 12A, fairing adapter 1204 is in a first orientation relative to arm 1205 corresponding to an aerodynamic position of fairing 1202. Fairing 1204 may be rotated to a second orientation such that fairing 1202 can be dismounted from support arm 1205.

Arm 1205 attaches to a vehicle at a proximate end and supports a fairing 1202 at a distal end. Support arm 1205 may couple to a vehicle frame rail by a bracket assembly 1207 and to fairing 1202 by adapter 1204.

Figure 12B:
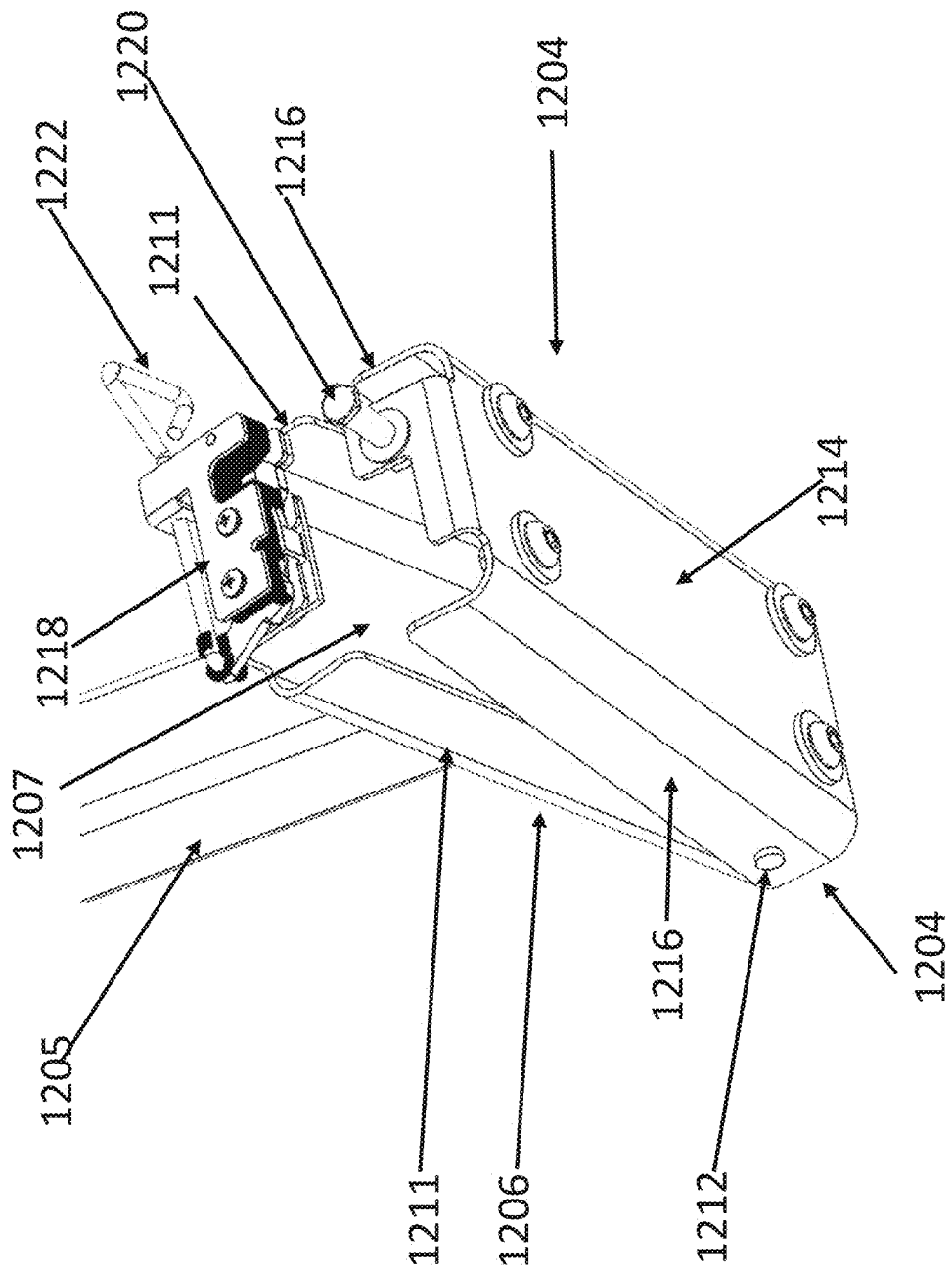
FIGS. 12B and 12C are diagrammatic representations of one embodiment of a system for mounting a fairing to support arm.
Figure 12C:
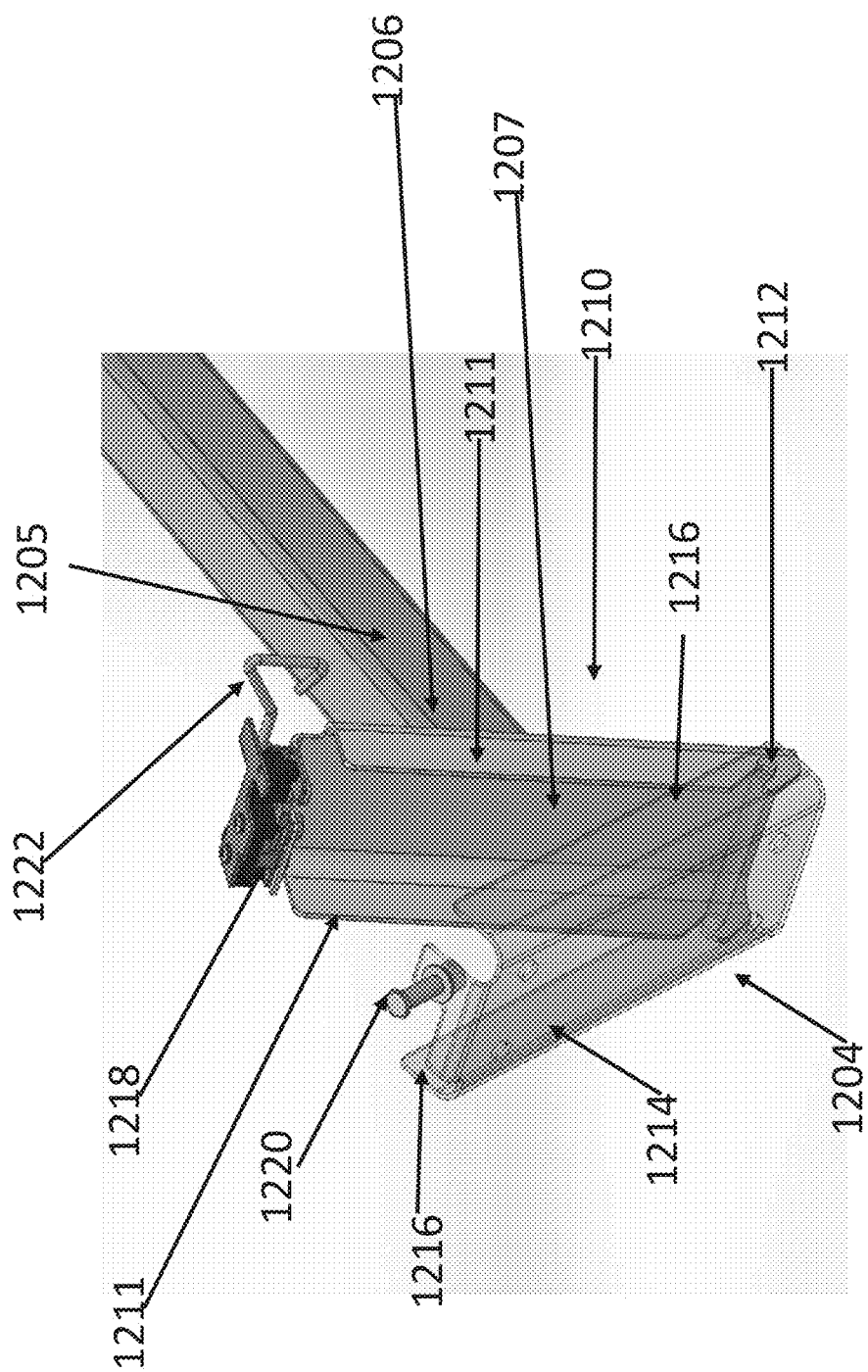

FIG. 12B illustrates one embodiment of a system for mounting a fairing to support arm 1205 in more detail. FIG. 12C further illustrates one embodiment of a system for mounting a fairing to support arm 1205 in more detail. In the illustrated embodiment, the distal end of support arm 1205 includes bracket 1206. Bracket 1206 includes a generally vertical plate 1207 and side walls 1211. The bottom portions of sidewalls 1211 define slots to receive a crossbar 1212 of adapter 1204. Bracket 1206 may be integral with or removable from support arm 1205.

Adapter 1204 includes an end plate 1214 and sidewalls 1216. End plate 1214 includes openings to receive hardware for mounting fairing 1202 to adapter 1204. In an orientation corresponding to an aerodynamic position of fairing 1202, the outboard surface of end plate 1214 is generally vertically aligned in a longitudinal plane or an angle to the longitudinal. Sidewalls 1216 are spaced slightly farther apart than sidewalls 1211. A crossbar 1212 spans between sidewalls 1216 and is positioned to be received by the slots in walls 1211.

Fairing assembly 1200 further comprises a releasable locking mechanism to selectively lock the joint so that the adapter 1204, and hence fairing 1202, is in a desired orientation relative to arm 1205. In particular, the locking mechanism can lock the joint so that the fairing 1202 is in an aerodynamic position. According to one embodiment, the joint is releasable via a manual control, such that the operator can rotate adapter 1204 away from bracket 1206 and then dismount adapter 1204 from bracket 1206. For example, in the embodiment illustrated, a locking mechanism 1218 is coupled to bracket 1206. Locking mechanism 1218 is adapted to capture a pin 1220 protruding up from adapter 1204. An operator can pull release pin 1222 to unlock the locking mechanism.

In operation, fairing 1202 can be coupled to adapter 1204. Bracket 1204 can be positioned with crossbar 1212 received in the slots of sidewalls 1211. Adapter 1204 can be rotated up until end plate 1214 is vertical and pin 1220 is captured by locking mechanism 1218. If the operator requires access to an area obstructed by fairing 1202, the operator can pull pin 1222 to release locking mechanism 1218. The operator may then rotate the fairing 1202 with adapter 1204 to a second orientation. In the second orientation, the operator may pull fairing 1202 with adapter 1204 away from bracket 1206 to dismount the fairing 1202 from the support arm 1205.

Figure 13:
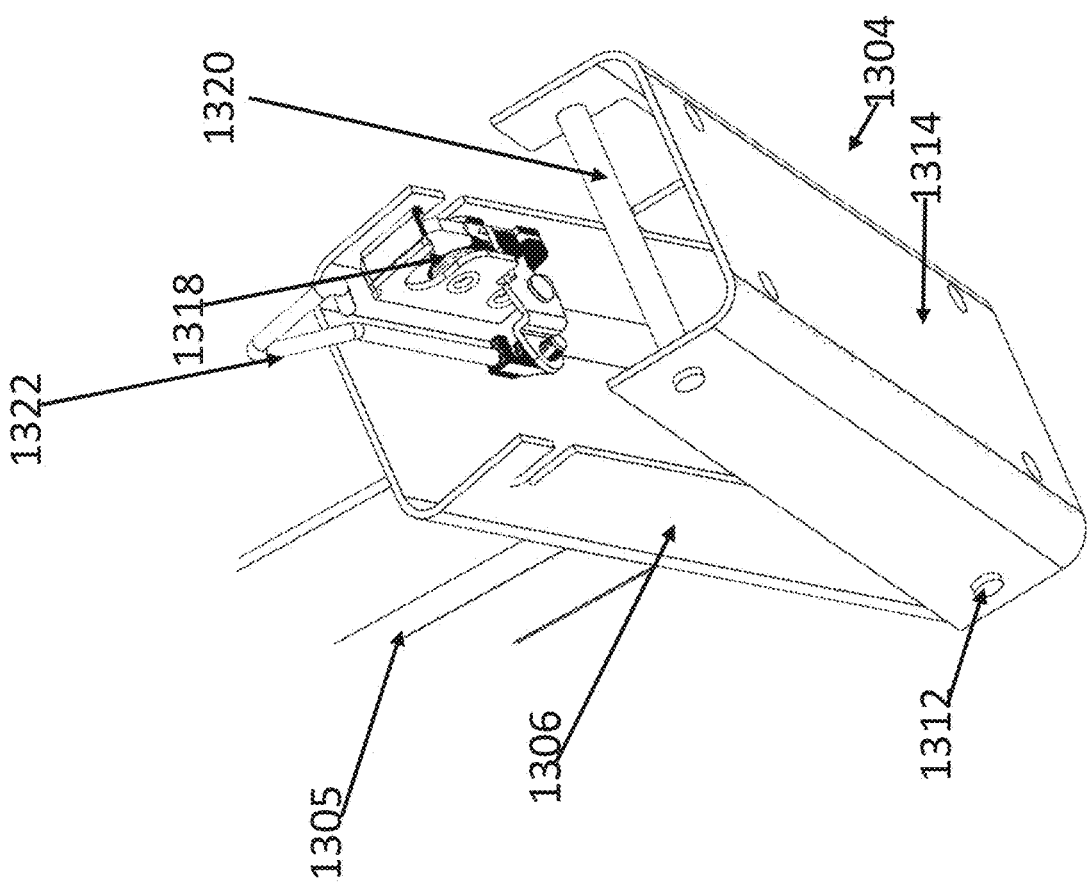
FIG. 13 is a diagrammatic representation of one embodiment of a system for mounting a fairing to support arm.

FIG. 13 illustrates another embodiment of a system for mounting a fairing to a support arm 1305. The embodiment of FIG. 13 is similar to that of FIG. 12 and includes a bracket 1306 and adapter 1304. Bracket 1306 may be integral with or removable from support arm 1305. In FIG. 13, the locking mechanism 1318 mounted to bracket 1306 captures an upper horizontal crossbar 1320 of adapter 1304. In operation, a fairing can be coupled to adapter 1304. Adapter 1304 can be positioned with a lower crossbar 1312 (e.g., similar to crossbar 1212) received in the slots of sidewalls of bracket 1306. Adapter 1304 can be rotated up until end plate 1314 is vertical and crossbar 1320 is captured by locking mechanism 1318. If the operator requires access to an area obstructed by the fairing, the operator can pull pin 1322 to release locking mechanism 1318. The operator may then rotate the fairing with adapter 1304 to a second orientation. In the second orientation, the operator may pull fairing with adapter 1304 away from bracket 1306 to dismount the fairing from the support arm 1305.

Figure 14:
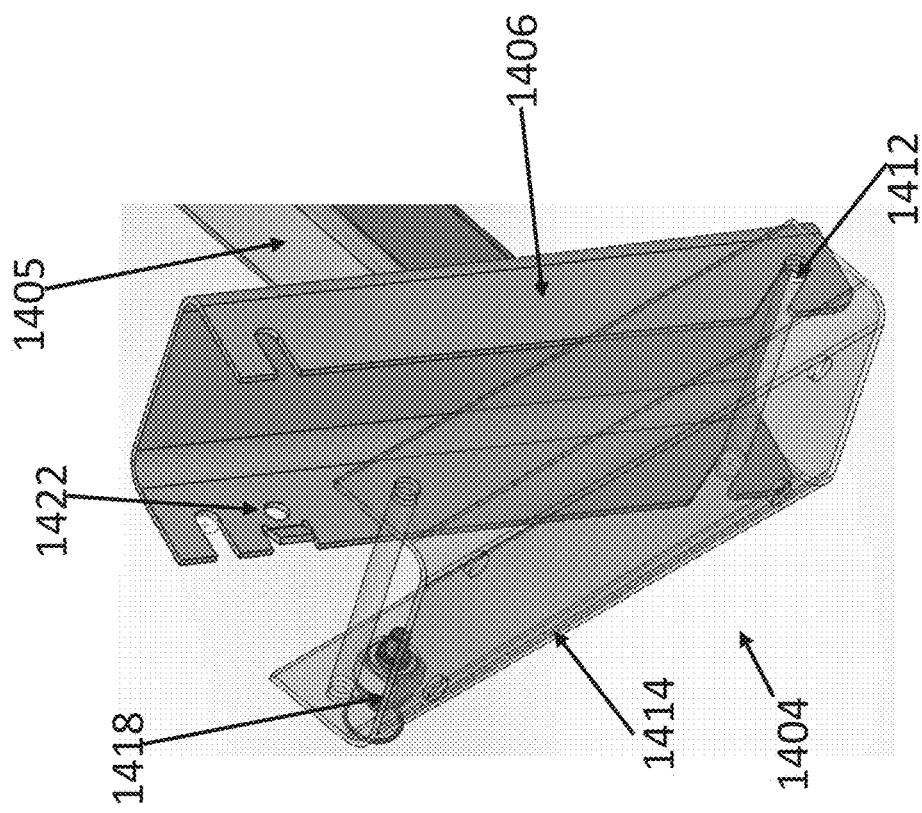
FIG. 14 is a diagrammatic representation of one embodiment of a system for mounting a fairing to support arm.

FIG. 14 illustrates another embodiment of a system for mounting a fairing to a support arm 1405. The embodiment of FIG. 14 operates similar to that of FIG. 12 except that a locking mechanism comprises a locking pin 1418 that advances into a locking pin opening 1422 of bracket 1406 to lock the fairing adapter in an orientation corresponding to an aerodynamic position. In operation, a fairing can be coupled to adapter 1404. Adapter 1404 can be positioned with a lower crossbar 1412 (e.g., similar to crossbar 1212) received in the slots of sidewalls of bracket 1406. Adapter 1404 can be rotated up until end plate 1414 is vertical and locking pin 1418 is captured by locking pin opening 1422. If the operator requires access to an area obstructed by the fairing, the operator can pull pin 1422 to release the locking mechanism. The operator may then rotate the fairing with adapter 1404 to a second orientation. In the second orientation, the operator may pull fairing with adapter 1404 away from bracket 1406 to dismount the fairing from the support arm 1405. Bracket 1406 may be integral with or removable from arm 1405.

FIG. 15 illustrates another embodiment of a system for mounting a fairing to a support arm 1505. The embodiment of FIG. 15 operates similar to that of FIG. 12 except that a locking mechanism comprises a locking pin 1518 that advances into a locking pin opening 1522 of adapter 1504 to lock the fairing adapter in an orientation corresponding to an aerodynamic position. In operation, a fairing can be coupled to adapter 1504. Adapter 1504 can be positioned with a lower crossbar 1512 (e.g., similar to crossbar 1212) received in the slots of sidewalls of bracket 1506. Adapter 1504 can be rotated up until end plate 1514 is vertical and locking pin 1518 is captured by locking pin opening 1522. If the operator requires access to an area obstructed by the fairing, the operator can pull pin 1522 to release the locking mechanism. The operator may then rotate the fairing with adapter 1504 to a second orientation. In the second orientation, the operator may pull fairing with adapter 1504 away from bracket 1506 to dismount the fairing from the support arm 1505. Bracket 1506 may be integral with or removable from arm 1505.

FIG. 16 illustrates another embodiment of a system for mounting a fairing to a support arm 1605. The embodiment of FIG. 16 operates similar to that of FIG. 15. In the embodiment of FIG. 16, adapter 1614 includes end plates 1604. End plates 1614 includes openings to receive hardware for mounting a fairing to adapter 1614. In an orientation corresponding to an aerodynamic position of the fairing, the outboard surfaces of end plates 1614 are generally vertically aligned in a longitudinal plane or an angle to the longitudinal. Sidewalls 1616 are spaced slightly closer than sidewalls 1611. A crossbar 1612 spans between and extends past sidewalls 1616 and is positioned to be received by the slots in walls 1611.

In operation, a fairing can be coupled to adapter 1604. Adapter 1604 can be positioned with a lower crossbar 1612 received in the slots of sidewalls 1611 of bracket 1606. Adapter 1604 can be rotated up until end plates 1614 is vertical and locking pin 1618 is captured by locking pin opening 1622. If the operator requires access to an area obstructed by the fairing, the operator can pull pin 1622 to release the locking mechanism. The operator may then rotate the fairing with adapter 1604 to a second orientation. In the second orientation, the operator may pull fairing with adapter 1604 away from bracket 1606 to dismount the fairing from the support arm 1605. Bracket 1606 may be integral with or removable from arm 1605.

Figure 17:
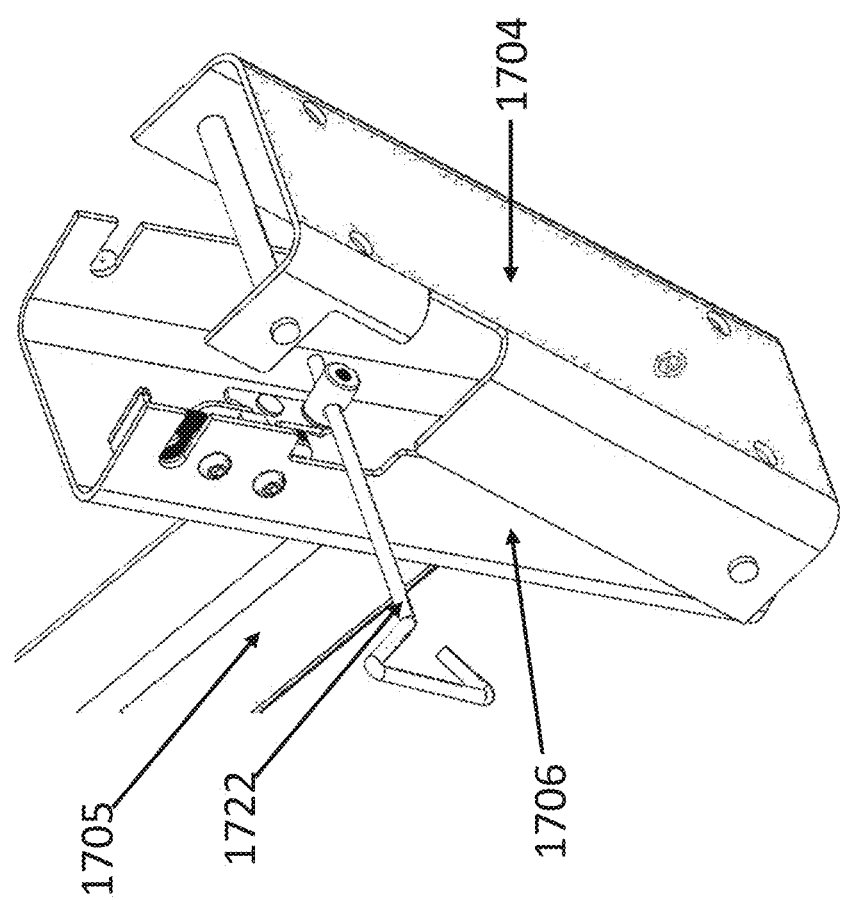
FIG. 17 is a diagrammatic representation of one embodiment of a system for mounting a fairing to support arm.

FIG. 17 illustrates an embodiment of a system for mounting a fairing to a support arm 1705. The system includes a bracket 1706 and adapter 1704. Bracket 1706 may be integral with or detachable from support arm 1705. The embodiment of FIG. 17 is similar to that of FIG. 13, but illustrates an alternative locking mechanism. In this case, the release pin 1722 extends from the side of the bracket 1706.

Figure 18:
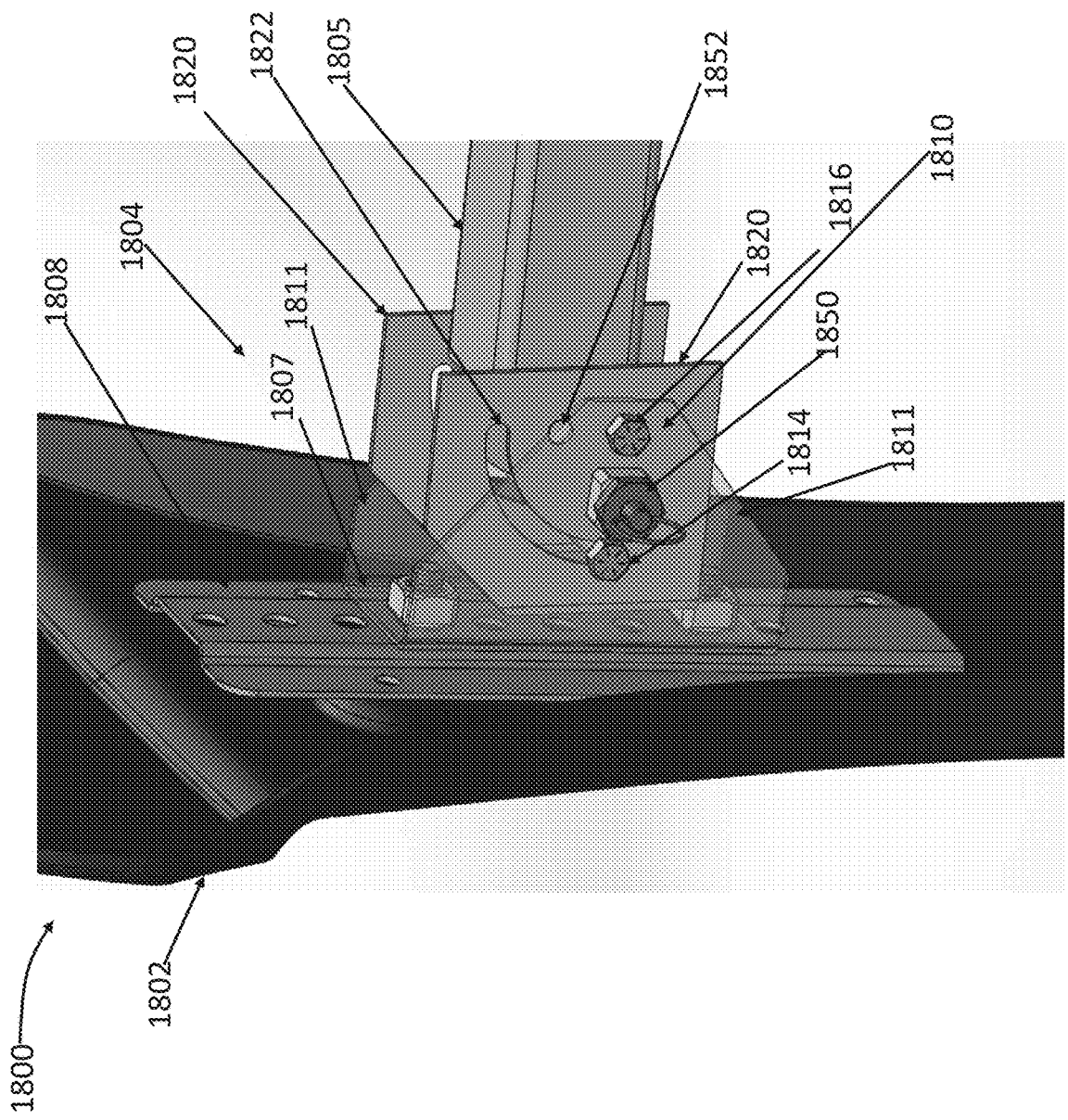
FIG. 18 is a diagrammatic representation of another embodiment of a fairing assembly.

FIG. 18 is an inboard oblique view of one embodiment of a fairing assembly 1800 comprising a fairing 1802 mounted to a fairing adapter 1804 that is coupled to a support arm 1805. In FIG. 18, fairing adapter 1804 is in a first orientation relative to arm 1805. This orientation can correspond to an aerodynamic position of fairing 1802. That is, the orientation of adapter 1804 relative to arm 1805 corresponds to the position that the fairing should be in as the vehicle is driven. Adapter 1804 is rotatable to at least one additional orientation that provides greater access to areas inboard of fairing 1802.

Arm 1805 attaches to a vehicle at a proximate end and supports a fairing 1802 at a distal end. Support arm 1805 may couple to a vehicle frame rail by a bracket assembly and to fairing 1802 by adapter 1804. In the embodiment illustrated, the distal portion of the support arm 1805 can comprise plates 1820 that define guide paths for an adapter 1804. For example, plates 1820 defines slots 1822. Plates 1820 may be integral with support arm 1805 or removable from support arm 1805.

According to one embodiment, adapter 1804 includes an end plate 1808 and joint bracket 1810. End plate 1808 connects to the joint bracket 1810 using one or more connection members (bolts, rivets, screws or other connection member), welding or other coupling mechanism. In the illustrated embodiment, end plate 1808 includes openings for connection members such that the vertical position of end plate 1808 can be adjusted related to joint bracket 1810 during assembly, thus allowing the mounting height of the fairing 1802 to be selected.

End plate 1808 is angled relative to the long axis of arm 1805 so that the outboard surface of end plate 1808 is generally vertically aligned in a longitudinal plane or an angle to the longitudinal. End plate may have openings that can receive mounting hardware, such as bolts or other connection members, for mounting fairing 1802 to adapter 1804. The openings may be threaded or non-threaded. According to one embodiment, nuts may be welded or otherwise attached to the inboard side of end plate 1808 to provide threads.

Joint bracket 1810 includes walls 1811 that extend inboard from end plate 1807. Walls 1811 are spaced farther apart than plates 1820 and overlap plates 1820. Members 1814, 1816 extend between walls 1811. According to one embodiment, members 1814, 1816 each comprises a bolt secured by a nut (not shown). In any case, member 1814 passes through guide slots 1822. Member 1814 acts as a follower. As such, adapter 1804 may be rotated as limited by the guide paths.

Fairing assembly 1800 may further comprise a releasable locking mechanism to selectively lock the joint so that the adapter 1804 is in a desired orientation relative to arm 1805. In particular, the locking mechanism can lock the joint so that a fairing coupled to adapter 1804 is in an aerodynamic position. According to one embodiment, the joint is releasable via a manual control, such that the operator can place the fairing at a desired orientation.

In the embodiment of FIG. 18, a locking pin passes 1850 through a wall 1811 and can be received by spaced locking pin openings 1852 in a plate 1820. According to one embodiment, locking pin 1850 is a pop pin. In operation, an operator wishing to access an area obstructed by a fairing 1802 mounted to adapter 1804 can pull locking pin 1850 to release the locking mechanism. The fairing adapter can be rotated about member 1816 along guide paths 1822.

Figure 19:
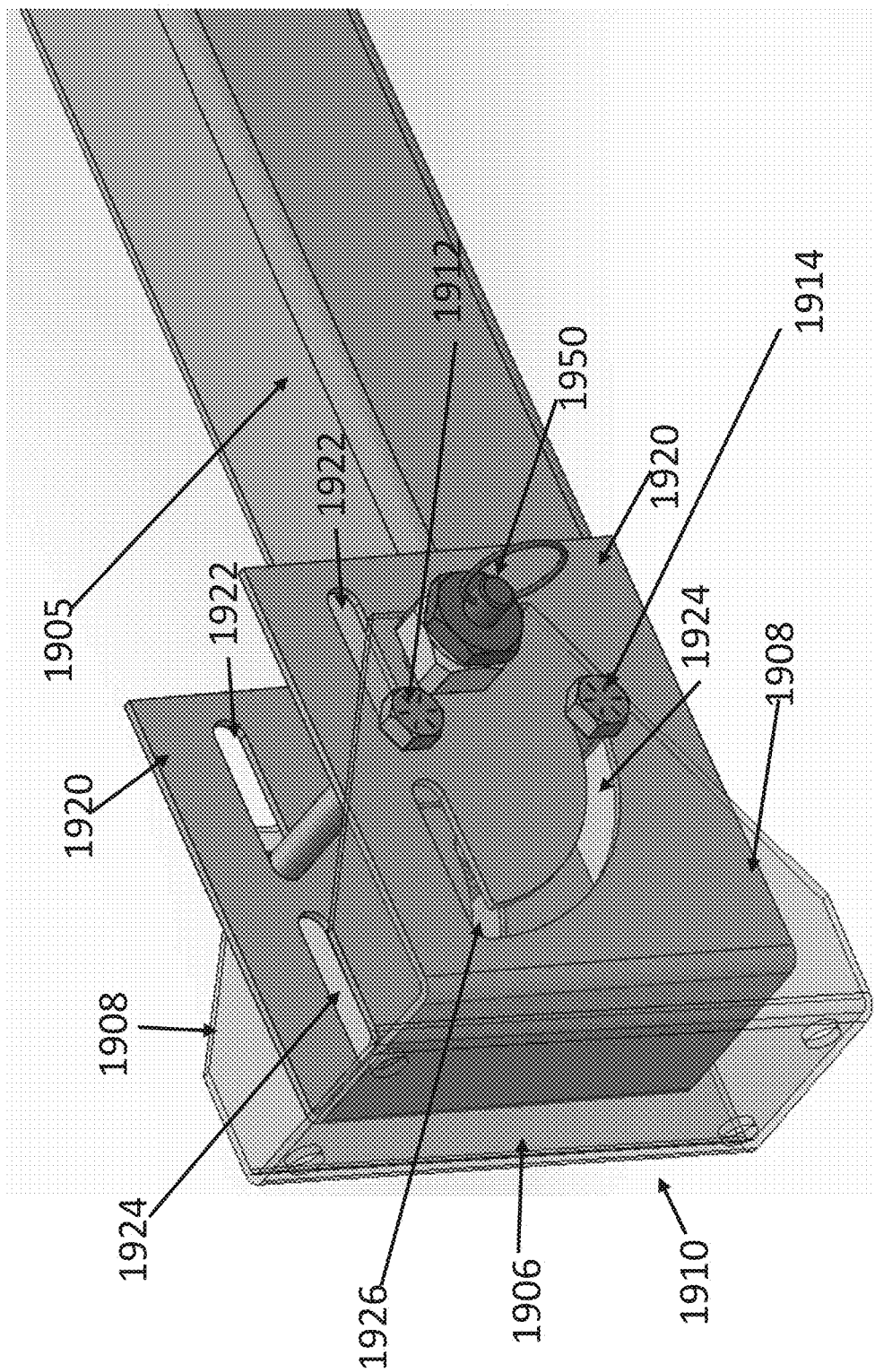
FIG. 19 is a diagrammatic representation of one embodiment of a joint bracket.

FIG. 19 illustrates another embodiment for a joint bracket. In the embodiment illustrated, the distal portion of the support arm can comprise plates 1920 that define guide paths for an adapter. For example, plates 1920 defines slots 1922 and 1924. Plates may be integral with support arm 1905 or removable from support arm 1905.

Joint bracket 1910 comprises an end plate 1906 and walls 1908 that extend inboard from endplate 1906. In an orientation corresponding to the fairing being in an aerodynamic position, end plate 1906 is angled relative to the long axis of arm 1905 so that the outboard surface of end plate 1906 is generally vertically aligned in a longitudinal plane or an angle to the longitudinal. End plate 1906 may have openings that can receive mounting hardware, such as bolts or other connection members, for mounting to an end plate (such as end plate 1808 of FIG. 18). The openings may be threaded or non-threaded.

Walls 1908 are spaced farther apart than plates 1920 and overlap plates 1920. Members 1912 and 1914 extend between walls 1908. According to one embodiment, members 1912, 1914 comprise bolts secured by nuts (not shown). In any case, member 1912 passes through guide slots 1922 and member 1914 passes through guide slots 1924. Members 1912 and 1914 act as followers. As such, joint bracket 1910 may be rotated and translated as limited by the guide paths. Other configurations can be incorporated into various other embodiments that utilize different directions of rotation or translation of the fairing. For example, in some embodiments, plates, guide paths and followers can be arranged so that the fairing can be rotated to one side and pushed inward.

A fairing assembly may further comprise a releasable locking mechanism to selectively lock the joint so that the adapter is in a desired orientation relative to arm 1905. In particular, the locking mechanism can lock the joint so that a fairing coupled to an adapter is in an aerodynamic position. According to one embodiment, the joint is releasable via a manual control, such that the operator can place the fairing at a desired orientation.

In the embodiment of FIG. 19, a locking pin passes 1950 through a wall 1908 and can be received by a locking pin opening in a plate 1920. According to one embodiment, locking pin 1950 is a pop pin. In operation, an operator wishing to access an area obstructed by a fairing can pull locking pin 1950 to release the locking mechanism. The fairing adapter can be rotated about member 1912 along guide paths 1922 until member 1914 reaches point 1926 at which point the fairing adapter can be translated vertically along guide paths 1922, 1924.

Figure 20:
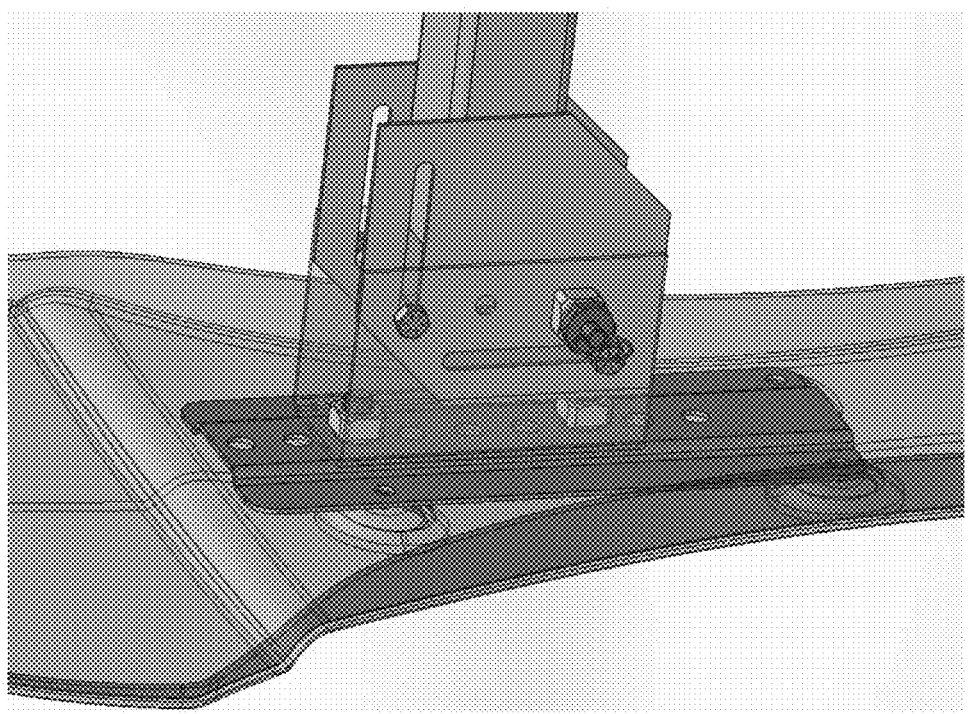
FIG. 20 is a diagrammatic representation of another embodiment of a joint bracket.

The skilled artisan will appreciate other embodiments of guide paths and joint brackets may be used. FIG. 20, for example illustrates another embodiment.

Figure 23:
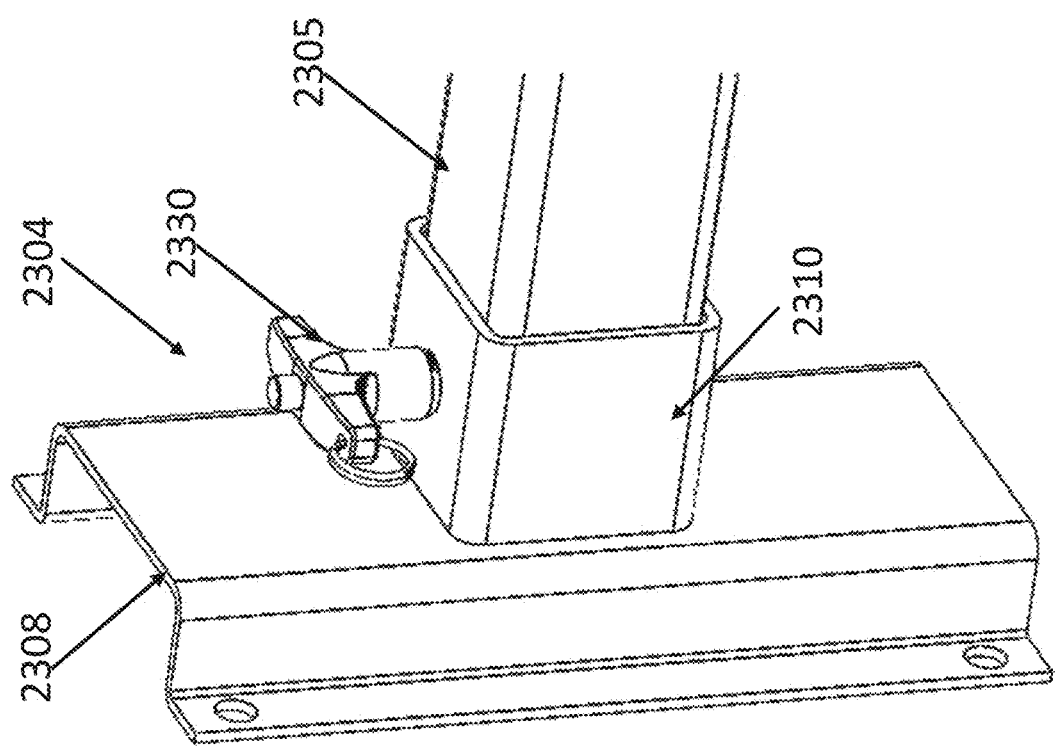
FIG. 23 is a diagrammatic representation of one embodiment of a system for mounting a fairing to support arm.

FIG. 23 illustrates another embodiment of an assembly for mounting a fairing to a support arm 2305. Arm 2305 attaches to a vehicle at a proximate end and supports a fairing at a distal end. Support arm 2305 may couple to a vehicle frame rail by a bracket assembly and to a fairing by adapter 2304.

Adapter 2304 includes an end plate portion 2308. End plate 2308 is angled relative to the long axis of arm 2305 so that the outboard surface of end plate 2308 is generally vertically aligned in a longitudinal plane or an angle to the longitudinal. End plate may have openings that can receive mounting hardware, such as bolts or other connection members, for mounting a fairing to adapter 2304.

Adapter 2304 also includes a portion 2310 that receives the distal end of arm 2305. A releasable locking mechanism can lock adapter 2304 to arm 2305. In the embodiment illustrated, the releasable locking mechanism comprises a pop pin 2330 that passes through adapter 2304 to be received in a locking pin opening in the outer surface of arm 2305. In operation, a user wishing to gain access to an area obstructed by a fairing may pull pin 2330 to release adapter 2304. The operator can then pull the fairing and adapter 2304 off of arm 2305.

Figure 24:
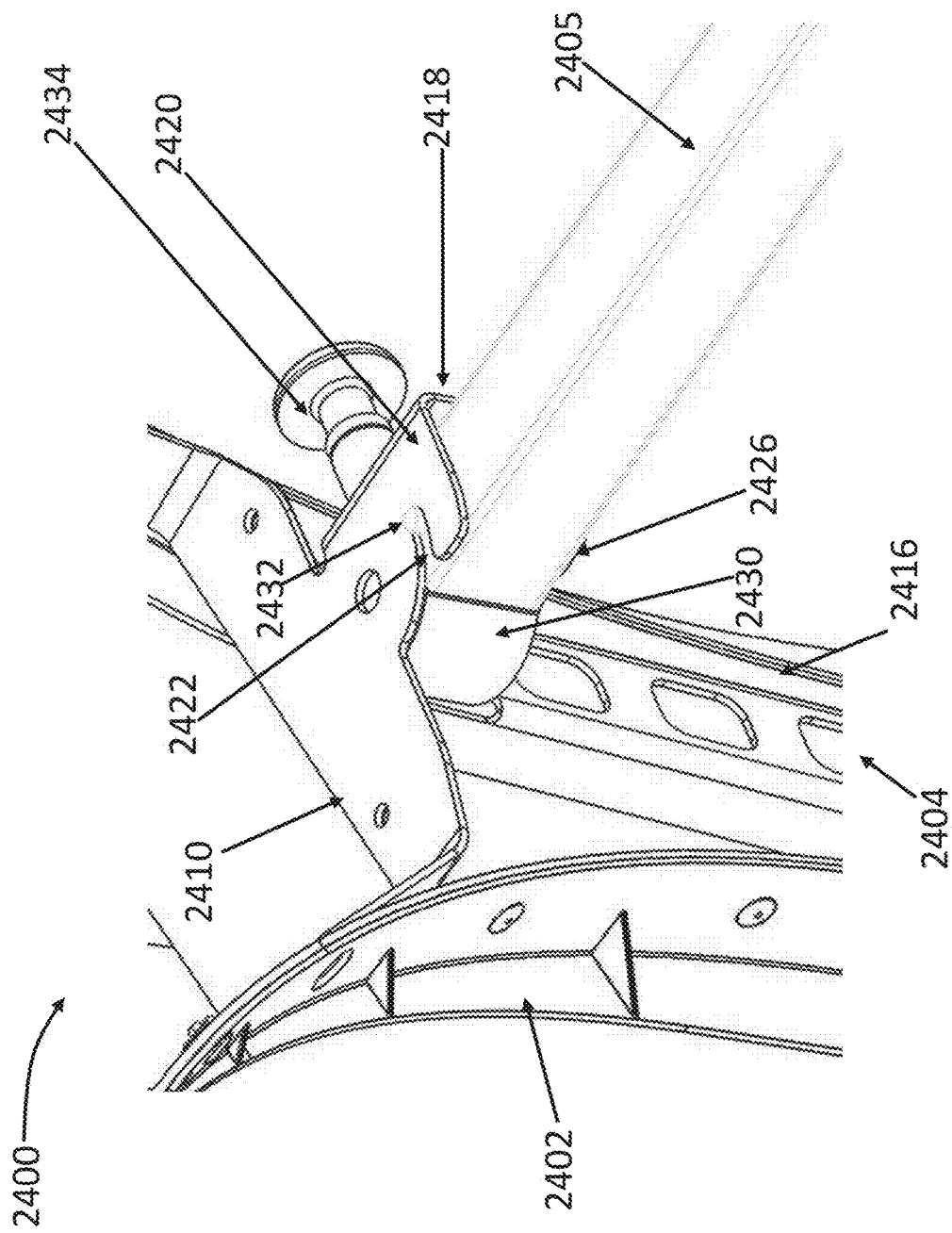
FIG. 24 is a diagrammatic representation of another embodiment of a fairing assembly.

In some embodiments, a guide path can be configured to be located on the top/bottom of the support arm. FIG. 24, for example, is an inboard oblique view of one embodiment of a fairing assembly 2400 comprising a fairing 2402 mounted to a fairing adapter 2404 that is coupled to a support arm 2405. In FIG. 24, fairing 2402 is in a first orientation relative to arm 2405 corresponding to an aerodynamic position. Arm 2405 attaches to a vehicle at a proximate end and supports a fairing 2402 at a distal end. Support arm 2405 may couple to a vehicle frame rail by a bracket assembly (not shown) and to fairing 2402 by adapter 2404. In the embodiment illustrated, fairing assembly 2400 is configured such that arm 2405 will extend parallel to the ground. In other embodiments, fairing assembly 2400 can be configured such that arm 2405 extends out and downward.

Adapter 2404 includes an upper joint bracket 2410 and a lower bracket 2416. Fairing 2402 may be coupled to adapter 2404 at attachment points similar as discussed above with respect to various embodiments including, but not limited to, the embodiment of FIG. 4. Joint bracket 2410 includes an upper portion (e.g., an upper horizontal plate) 2420 that extends over a portion of support arm 2405 and a lower portion (e.g., a lower horizontal plate) 2426 that extends under a portion of support arm 2405, and a wall 2418 that extends between upper portion 2420 and lower portion 2416. Upper portion 2420 and lower portion 2426 define guide paths (e.g., guide slot 2422 is illustrated) that are open at one end.

The distal portion 2430 of arm 2405 fits in the gap between the upper portion 2420 and lower portion 2426 of bracket 2410. Protrusions (e.g., protrusion 2432) project from the upper and lower surfaces of support arm 2405 and are received in the guide slots (e.g., guide slots 2422). The protrusions serve as guide pins. In the illustrated embodiments, joint bracket 2410 may be rotated as limited by the guide paths. The fairing 2402 may be rotated until the guide pins exit the guide slots at the open end, at which point the fairing 2402 may be dismounted from the support arm 2405, for example by pulling the fairing 2402 with adapter in an outboard direction.

Fairing assembly 2400 further comprises a releasable locking mechanism to selectively lock the joint so that the adapter 2404, and hence fairing 2402, is in a desired orientation relative to arm 2405. In particular, the locking mechanism can lock the joint so that the fairing is in an aerodynamic position. According to one embodiment, the joint is releasable via a manual control, such that the operator can place the fairing adapter 2404 at any desired orientation within a range by rotating it there.

In the illustrated embodiment, upwardly extending wall 2418 includes a locking pin opening through which a locking pin 2434 extends. A vertical surface of the distal portion 2430 of arm 2405 includes a locking pin opening that aligns with the locking pin 2434 when adapter 2404 is in the orientation illustrated in FIG. 24 (e.g., when fairing 2402 is in the aerodynamic position). When locking pin 2434 aligns with the locking pin opening in arm 2405, locking pin 2434 can advance into the locking pin opening of arm 2405 to lock the joint. The locking pin 2434 can be retracted to release the joint. According to one embodiment, locking pin 2434 is a pop pin that comprises an internal spring that asserts a force to advance the pin 2434 and thus cause the joint to automatically lock when the pin opening in wall 2418 aligns with the locking pin opening in arm 2405, assuming a force is not being asserted to retract pin 2434. Adapter 2404, and hence fairing 2402, may also be lockable in other positions relative to arm 2405.

The shape, size, materials, stiffness, and other characteristics of a fairing (e.g., fairing 110, 112, 116, 202, 302, 502, 602, 702, 802, 902, 1002, 1102, 1202, 1802 and other fairings) may be selected to provide desired aerodynamics; minimize splash/spray; provide clearance with wheels to prevent rubbing/damage; provide clearance from top (trailer) contact to prevent damage; clearance from bottom/road (ground) contact to prevent damage; universal fit to fit different trucks that have different wheel sizes/spacing, frame heights; rigidity or structure, especially to provide increased rigidity in areas of the rear fairing assembly that are used for mounting or that are unlikely to come into contact with the wheels, trailer, or ground, for example and increased flexibility and resiliency in areas that are likely to come into contact with the wheels, trailer, or ground, for example. A fairing may be curved and sized for use by itself or in combination with other fairing assemblies, quarter fenders, or wheel covers.

Fairings are preferably manufactured of one or more durable materials, such as polyurethane, which can absorb frequent impacts and deflections of the material. Preferred materials for manufacturing a fairing include plastics, metals, and composites. A deflectable, resilient, and wearable material such as TPO or polyurethane may be desired, especially for regions of the part that may contact a trailer, ground, or wheels. Some materials or manufacturing processes that may provide a part with a lower density, such as low density polyurethane, blow-molding, or rotational molding, for example, may be desired such that the part is less likely to cause additional damage if it is damaged or dislodged from the vehicle, for example.

A fairing may be mounted to a support arm in a manner that allows the fairing to rotate relative to the support arm. Support arms may use a spring or other attachment to allow deflection of a fairing assembly. According to one embodiment, a fairing support arm may have an adjustable length. For example, fairing adapters as described above may be used with adjustable length support arms in some embodiments. Embodiments of an adjustable length hanger may allow the hanger length to be set in any desired range, depending on vehicle. Adjustable and fixed length arms may use a spring attached and have a variety of form factors. In some embodiments the arms may be straight. In others, the arms may be angled at the end (e.g., "shorty" hangers). A support arm may mount to a vehicle frame in a manner that allows the position of the arm to be selectable.

According to one embodiment, an assembly base may include a connection system that accommodates various hole patterns in a frame rail or other portion of a vehicle so that the base may be used with different hole configurations. In another embodiment, the base may include an adapter that allows the base to be mounted in one or more positions or rotational orientations.

In some embodiments, a fairing assembly may be provided with mechanisms for controlling splash and spray while also reducing aerodynamic drag (for example, perforations, fluid atomizing features, fluid flow directing features such as ribs, fluid trapping or re-directing features, etc.). A fairing may be formed as a single body or it may be assembled, such as with a structural center portion for support with deflectable material attached to the outer edges of the center portion.

According to one embodiment, the fairing or fairing assembly may have a variety of shapes. For example, the leading edge of the fairing assembly or fairing may be straight or curved and the outer surface of the fairing may be flat, angled or curved outward, angled or curved inward or some combination thereof to promote desired aerodynamic flow. The fairing or fairing assembly may have a symmetric design to fit either side of the vehicle in a desired position, including positions that are angled inward or outward.

In some cases, it is possible that the most aerodynamic position for the fairing may change. As such, in some embodiments the aerodynamic position of the fairing may be set based on certain parameters of the vehicle (i.e. if the truck pulling a trailer one position is used, or if not, another position is recommended). Further, in other embodiments electronics or hydraulics may be used such that the fairing can be rotated through electronics, hydraulics, or otherwise. A control system may be provided that automatically positions the fairing in the most aerodynamic position based on factors such as vehicle speed, wind speed, wind direction, vehicle configuration, or otherwise.

Although the invention has been described with respect to specific embodiments thereof, these embodiments are merely illustrative, and not restrictive of the invention. The description herein of illustrated embodiments is not intended to be exhaustive or to limit the invention to the precise forms disclosed herein (and in particular, the inclusion of any particular embodiment, dimensions, feature or function is not intended to limit the scope to such embodiment, feature or function). Rather, the description is intended to describe illustrative embodiments, features and functions in order to provide a person of ordinary skill in the art context without limiting the invention to any particularly described embodiment, feature or function. While specific embodiments and examples are described herein for illustrative purposes only, various equivalent modifications are possible within the spirit and scope of this disclosure, as those skilled in the relevant art will recognize and appreciate. As indicated, these modifications may be made in light of the foregoing description of illustrated embodiments and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

As used herein, the terms "comprises," "comprising," "includes," "including," "has," "having" or any other variation thereof, are intended to cover a non-exclusive inclusion.

For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized.

Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like. Furthermore, any dimensions, materials or other such characteristics are provided by way of example and not limitation.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment," or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Furthermore, the characterization of any feature as "optional" herein is provided by example and is not intended to and should not be read to imply that other features not characterized as optional are not also optional in various embodiments.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A fairing assembly adapted to couple to a vehicle, the fairing assembly comprising:
    a support arm adapted to mount to a frame rail, the support arm having a long axis;
    a fairing adapter adapted to mount a fairing to the support arm, the fairing adapter rotatably coupled to the support arm and rotatable about an axis of rotation that is angled from the long axis of the support arm, the fairing adapter rotatable about the axis of rotation from a first orientation corresponding to an aerodynamic position to a second orientation corresponding to a first access position in which the fairing is at least partially behind the support arm or in which the fairing is at least partially in front of the support arm; and
    a releasable lock to lock the fairing adapter in the first orientation and releasable to allow the fairing adapter to rotate to the second orientation.

2. The fairing assembly of claim 1, further comprising the fairing, the fairing mounted to the fairing adapter and positionable in the aerodynamic position and the first access position.

3. The fairing assembly of claim 2, wherein the fairing is at least partially behind the support arm when in the first access position.

4. The fairing assembly of claim 2, wherein the fairing adapter is rotatable about the axis of rotation to a third orientation to rotate the fairing to a second access position in which the fairing is at least partially behind the support arm.

5. The fairing assembly of claim 1, wherein the fairing adapter comprises a vertical end plate.

6. The fairing assembly of claim 5, wherein the fairing adapter comprises a joint bracket mountable to the vertical end plate in a plurality of positions.

7. The fairing assembly of claim 1, wherein the fairing adapter is dismountable from the support arm in the second orientation.

8. The fairing assembly of claim 1, wherein the axis of rotation is a horizontal axis.

9. The fairing assembly of claim 1, wherein the axis of rotation is a vertical axis.

10. A fairing assembly adapted to couple to a vehicle, the fairing assembly comprising:
    a support arm adapted to mount to a frame rail;
    a set of side plates coupled to the support arm;
    a fairing adapter adapted to mount a fairing to the support arm, the fairing adapter comprising:
        an end plate; and
        a set of adapter sidewalls extending inboard relative to the end plate, the set of adapter sidewalls overlapping the set of side plates;
    a first member extending between the set of adapter sidewalls and defining an axis of rotation, the fairing adapter rotatable about the axis of rotation from a first orientation corresponding to an aerodynamic position to a second orientation corresponding to a first access position; and a releasable lock to lock the fairing adapter in the first orientation and releasable to allow the fairing adapter to rotate to the second orientation.

11. The fairing assembly of claim 10, further comprising the fairing, the fairing mounted to the fairing adapter and positionable in the aerodynamic position and the first access position.

12. The fairing assembly of claim 10, further comprising a crossbar extending between the set of adapter sidewalls and spaced from the first member, wherein the set of side plates comprises slots to receive the crossbar when the fairing adapter is in the first orientation and wherein the releasable lock is adapted to capture the crossbar in the slots and releasable to allow the crossbar to exit the slots.

13. The fairing assembly of claim 12, further comprising a bracket portion coupled to the support arm, the bracket portion comprising a vertical plate and the set of side plates, the set of side plates extending outboard from the vertical plate.

14. The fairing assembly of claim 10, further comprising a second member that extends between the set of adapter sidewalls, wherein the set of side plates defines a set of guide paths through which the second member extends, wherein the second member acts as a follower to follow the set of guide paths as the fairing adapter rotates from the first orientation to the second orientation.

15. The fairing assembly of claim 10, wherein the support arm has a long axis and wherein the axis of rotation is angled from the long axis.

16. The fairing assembly of claim 10, wherein the axis of rotation is a horizontal axis.

17. A fairing assembly adapted to couple to a vehicle, the fairing assembly comprising:
- a support arm adapted to mount to a frame rail;
- a fairing adapter adapted to mount a fairing to the support arm, the fairing adapter rotatably coupled to the support arm and rotatable about a vertical axis of rotation from a first orientation corresponding to an aerodynamic position to a second orientation corresponding to a first access position in which the fairing is at least partially behind the support arm or in which the fairing is at least partially in front of the support arm; and
- a releasable lock to lock the fairing adapter in the first orientation and releasable to allow the fairing adapter to rotate to the second orientation.

18. The fairing assembly of claim 17, further comprising the fairing, the fairing mounted to the fairing adapter and positionable in the aerodynamic position and the first access position.

19. The fairing assembly of claim 18, wherein the fairing is at least partially behind the support arm when in the first access position.

20. The fairing assembly of claim 17, wherein the fairing adapter is rotatable about the vertical axis of rotation to a third orientation to rotate the fairing to a second access position in which the fairing is at least partially behind the support arm.

* * * * *